US012402101B2

(12) United States Patent
Ryu et al.

(10) Patent No.: US 12,402,101 B2
(45) Date of Patent: Aug. 26, 2025

(54) PAGING CAUSE INDICATION

(71) Applicant: Ofinno, LLC, Reston, VA (US)

(72) Inventors: Jinsook Ryu, Oakton, VA (US); Esmael Hejazi Dinan, McLean, VA (US); Kyungmin Park, Vienna, VA (US); Peyman Talebi Fard, Vienna, VA (US); Weihua Qiao, Herndon, VA (US); Jayshree Bharatia, Plano, TX (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/425,649

(22) Filed: Jan. 29, 2024

(65) Prior Publication Data
US 2024/0172178 A1 May 23, 2024

Related U.S. Application Data

(63) Continuation of application No. 17/876,094, filed on Jul. 28, 2022, now Pat. No. 11,889,465, which is a
(Continued)

(51) Int. Cl.
*H04W 68/00* (2009.01)
*H04W 60/04* (2009.01)
*H04W 76/10* (2018.01)
*H04W 76/20* (2018.01)
*H04W 84/04* (2009.01)

(52) U.S. Cl.
CPC ......... *H04W 68/005* (2013.01); *H04W 60/04* (2013.01); *H04W 76/10* (2018.02); *H04W 76/20* (2018.02); *H04W 84/042* (2013.01)

(58) Field of Classification Search
CPC ... H04W 68/005; H04W 60/04; H04W 76/10; H04W 76/20; H04W 84/042
See application file for complete search history.

(56) References Cited

U.S. PATENT DOCUMENTS 7,440,763 B2  10/2008  Lundsjo et al.
9,210,688 B2  12/2015  Kanamarlapudi et al.
(Continued)

FOREIGN PATENT DOCUMENTS

CN  101115292 A  1/2008
CN  101483889 A  7/2009
(Continued)

OTHER PUBLICATIONS

3GPP TS 38.331 V15.8.0 (Jan. 2020); Technical Specification; 3rd Generation Partnership Project; Technical Specification Group Radio Access Network; NR; Radio Resource Control (RRC) protocol specification (Release 15).
(Continued)

*Primary Examiner* — Diane D Mizrahi
(74) *Attorney, Agent, or Firm* — Sachin Kandhari; Kavon Nasabzadeh; Jacob L. Mangan

(57) ABSTRACT

A wireless device sends a first request to a mobility management function via a base station. The first request includes a paging cause indication in a paging message. A first paging message is received by the wireless device and comprises a first paging cause indication. Based on the first paging message, a second request for a connection setup is sent.

20 Claims, 43 Drawing Sheets

Related U.S. Application Data continuation of application No. 17/381,938, filed on Jul. 21, 2021, now Pat. No. 11,412,478, which is a continuation of application No. PCT/US2020/022169, filed on Mar. 11, 2020.

(60) Provisional application No. 62/816,414, filed on Mar. 11, 2019.

(56) References Cited

U.S. PATENT DOCUMENTS

| | | | |
|---|---|---|---|
| 9,379,739 | B2 | 6/2016 | Chen et al. |
| 9,686,736 | B2 | 6/2017 | Baratam et al. |
| 10,433,368 | B2 | 10/2019 | Chien et al. |
| 10,524,189 | B2 | 12/2019 | Hong et al. |
| 11,064,547 | B2 | 7/2021 | Adjakple et al. |
| 11,121,743 | B2 | 9/2021 | Zhang et al. |
| 11,184,838 | B2 | 11/2021 | Park et al. |
| 11,259,269 | B2 | 2/2022 | Chun |
| 11,284,352 | B2 * | 3/2022 | Ryu ............... H04W 52/0261 |
| 11,330,499 | B2 | 5/2022 | Chun et al. |
| 11,412,478 | B2 | 8/2022 | Ryu et al. |
| 2009/0303971 | A1 | 12/2009 | Kim et al. |
| 2013/0217422 | A1 | 8/2013 | Zakaria et al. |
| 2013/0244656 | A1 | 9/2013 | Heo et al. |
| 2014/0051466 | A1 | 2/2014 | Yu |
| 2014/0057639 | A1 | 2/2014 | Nanjaiah |
| 2014/0274006 | A1 | 9/2014 | Mutya et al. |
| 2014/0295835 | A1 | 10/2014 | Lamazure |
| 2015/0004973 | A1 | 1/2015 | Gude et al. |
| 2015/0056988 | A1 | 2/2015 | Goel et al. |
| 2016/0057724 | A1 | 2/2016 | Horn et al. |
| 2016/0183156 | A1 | 6/2016 | Chin et al. |
| 2017/0055141 | A1 | 2/2017 | Kim et al. |
| 2020/0305118 | A1 | 9/2020 | Ryu et al. |
| 2021/0127351 | A1 | 4/2021 | Stojanovski |
| 2021/0392616 | A1 | 12/2021 | Stojanovski |
| 2022/0078742 | A1 | 3/2022 | Tiwari et al. |
| 2022/0116908 | A1 | 4/2022 | Chun |
| 2022/0159628 | A1 | 5/2022 | Bangolae et al. |
| 2022/0201638 | A1 | 6/2022 | Arrobo Vidal et al. |

FOREIGN PATENT DOCUMENTS

| | | |
|---|---|---|
| CN | 102573065 A | 7/2012 |
| CN | 108632999 A | 10/2018 |
| CN | 113785634 A | 12/2021 |
| EP | 3 914 000 A1 | 11/2021 |
| KR | 10-2005-0047439 A | 5/2005 |
| WO | 2013/134533 A1 | 9/2013 |
| WO | 2018/005419 A1 | 1/2018 |
| WO | 2019/034659 A1 | 2/2019 |
| WO | 2021/066562 A1 | 4/2021 |

OTHER PUBLICATIONS

Korean Office Action, mailed Jul. 20, 2023, in KR Patent Application No. 2021-7032277.
S2-180365; 3GPP TSG-SA2 Meeting #125; Gothenburg, Sweden, Jan. 21-26, 2018; CR-Form-v11.2; Draft Change Request; 23.501 CR CRNum rev—Current version: 15.0.0; Title: Miscellaneous editorial corrections (capitalization, messages, procedures etc.).
3GPP TS 22.173 V16.1.0 (Sep. 2018); Technical Specification; 3rd Generation Partnership Project; Technical Specification Group Services and System Aspects; IP Multimedia Core Network Subsystem (IMS) Multimedia Telephony Service and supplementary services; Stage 1; (Release 16).
3GPP TS 23.228 V15.3.0 (Sep. 2018); Technical Specification; 3rd Generation Partnership Project; Technical Specification Group Services and System Aspects; IP Multimedia Subsystem (IMS); Stage 2; (Release 15).
3GPP TS 23.401 V15.6.0 (Dec. 2018); Technical Specification; 3rd Generation Partnership Project; Technical Specification Group Services and System Aspects; General Packet Radio Service (GPRS) enhancements for Evolved Universal Terrestrial Radio Access Network (E-UTRAN) access; (Release 15).
3GPP TS 23.501 V15.4.0 (Dec. 2018); Technical Specification; 3rd Generation Partnership Project; Technical Specification Group Services and System Aspects; System Architecture for the 5G System; Stage 2; (Release 15).
3GPP TS 23.502 V15.4.1 (Jan. 2019); Technical Specification; 3rd Generation Partnership Project; Technical Specification Group Services and System Aspects; Procedures for the 5G System; Stage 2; (Release 15).
3GPP TS 24.301 V15.5.0 (Dec. 2018); Technical Specification; 3rd Generation Partnership Project; Technical Specification Group Core Network and Terminals; Non-Access-Stratum (NAS) protocol for Evolved Packet System (EPS); Stage 3; (Release 15).
3GPP TS 24.501 V15.2.1 (Jan. 2019); Technical Specification; 3rd Generation Partnership Project; Technical Specification Group Core Network and Terminals; Non-Access-Stratum (NAS) protocol for 5G System (5GS); Stage 3; (Release 15).
3GPP TS 29.244 V15.4.0 (Dec. 2018); Technical Specification; 3rd Generation Partnership Project; Technical Specification Group Core Network and Terminals; Interface between the Control Plane and the User Plane Nodes; Stage 3; (Release 15).
3GPP TS 29.274 V15.6.0 (Dec. 2018); Technical Specification; 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3; (Release 15).
3GPP TS 29.518 V15.2.0 (Dec. 2018); Technical Specification; 3rd Generation Partnership Project; Technical Specification Group Core Network and Terminals; 5G System; Access and Mobility Management Services; Stage 3; (Release 15).
3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).
3GPP TS 38.413 V15.2.0 (Dec. 2018); Technical Specification; 3rd Generation Partnership Project; Technical Specification Group Radio Access Network; Ng-Ran; Ng Application Protocol (NGAP); (Release 15).
3GPP TS 38.415 V15.2.0 (Dec. 2018); Technical Specification; 3rd Generation Partnership Project; Technical Specification Group Radio Access Network; NG-RAN; PDU Session User Plane Protocol; (Release 15).
C4-150097; 3GPP TSG CT4 Meeting #68; Sorrento, Italy; Feb. 2-6, 2015; CR-Form-v11.1; Change Request; 29.274 CR 1565; rev -; Current version: 13.0.0; Title: Paging Policy Indication in Downlink Data Notification message.
R2-115375; 3GPP TSG-RAN WG2 #75bis; Zhuhai, China Oct. 10-14, 2011; Agenda Item: 04.1; Source: Ericsson; Title: Dual-SIM Dual-Standby UEs and their impact on the RAN; Document for: Discussion, Decision.
S2-144682; (revision of S2-143930); SA WG2 Meeting #106; Nov. 17-21, 2014, San Francisco, California, USA; CR-Form-v11.1; Change Request; 23.401 CR 2731; rev 7; Current version: 13.0.0; Title: Paging policy differentiation for IMS voice.
S2-164763; (revision of S2-163492); SA WG2 Meeting #116-BIS; 29 Aug.-Sep. 2, 2016, Sanya, P. R. China; Source: Intel, Huawei; Title: IMS paging type differentiation for PS domain; Document for: Discussion / Approval; Agenda Item: 6.28; Work Item / Release: TEI14 / Rel-14.
S2-174243; SA WG2 Meeting #122; Jun. 26-30, 2017, San Jose Del Cabo, Mexico; Source: Qualcomm Incorporated, Oppo, China Unicom, Vivo; Title: Avoidance of paging collisions to minimize outage of services; Document for: Discussion; Agenda Item: TEI15; Work Item / Release: Rel-15.
S2-1812346; SA WG2 Meeting #129-BIS; Nov. 26-30, 2018, West Palm Beach, FL, US; CR-Form-v11.1; Change Request; 23.401 CR 3484; rev -; Current version: 16.0.0; Title: Paging cause introduction.

(56) References Cited

OTHER PUBLICATIONS

S2-1812349; SA WG2 Meeting #129-BIS; Nov. 26-30, 2018, West Palm Beach, FL, US; CR-Form-v11.1; Change Request; 23.501 CR 0729; rev -; Current version: 15.3.0; Title: Paging cause introduction.
S2-1812350; SA WG2 Meeting #129-BIS; Nov. 26-30, 2018, West Palm Beach, FL, US; CR-Form-v11.1; Change Request; 23.502 CR 0858; rev -; Current version: 15.3.0; Title: Paging cause introduction.
S2-1813349; (was S2-1813346); SA WG2 Meeting #129bis; Nov. 26-30, 2018, West Palm Beach, USA; Source:Intel, Verizon, AT&T, Sony, Samsung, Charter Communications, China Mobile, Lenovo, Motorola Mobility, NEC, vivo, Oppo, KPN, ETRI, InterDigital, Convida Wireless; Title: New SID: Study on system enablers for multi-SIM devices; Document for: Approval; Agenda Item: 7.1.
S1-190494; 3GPP TSG-SA WG1 Meeting #85; Tallinn, Estonia, Feb. 18-22, 2019; (revision of S1-190110, 247, 439); Source: Intel; Title: New SID: Study on Support for Multi-USIM devices; Document for: Approval; Agenda Item: 4.
S2-1900688; (revision of S2-1900332); SA WG2 Meeting #130; Jan. 21-25, 2019, Kochi, India; Source: Intel; Title: Revised SID: Study on system enablers for multi-SIM devices; Document for: Approval; Agenda Item: 7.1; Work Item / Release: FS_MUSIM / Rel-16.
Paging Policy Differentiation; P-GW Administration guide, StarOS Release 20; total p. 6; retrieved Feb. 20, 2019.
3GPP TS 23.501 V15.4.0 (Dec. 2018); 3rd Generation Partnership Project; Technical Specification Group Services and System Aspects; System Architecture for the 5G System; Stage 2; (Release 15).
3GPP TS 23.502 V15.4.1 (Jan. 2019); 3rd Generation Partnership Project; Technical Specification Group Services and System Aspects; Procedures for the 5G System; Stage 2; (Release 15).
S2-175390; SA WG2 Meeting #122bis; Aug. 21-25, 2017, Sofia Antipolis, France; Source: Ericsson; Title: RRC Inactive state notification support in TS 23.502; Document for: Approval; Agenda Item: 6.5.7; Work Item / Release: 5G_ph1 / Rel-15.
S2-176995; SA WG2 Meeting #123; Oct. 23-27, 2017, Ljubljana, Slovenia; Source: Ericsson; Title: Finalizing the UE Reachability Procedure with RRC Inactive handling (OI#13); Document for: Approval; Agenda Item: 6.5.7.5; Work Item / Release: 5GS_ph1 / Rel-15.
S2-177410; SA WG2 Meeting #123; Oct. 23-27, 2017 Ljubljana, Slovenia; Source: Huawei, HiSilicon; Title: TS 23.501: LADN handling in RRC inactive state; Document for: Approval; Agenda Item: 6.5.7.5; Work Item / Release: 5GS_Ph1 / Rel-15.
S2-1812349; SA WG2 Meeting #129-BIS; Nov. 26-30, 2018, West Palm Beach, FL, US; Change Request 23.501; CR 0729; rev -; Current version: 15.3.0; Title: Paging cause introduction.
S2-186370; SA WG2 Meeting #128; Jul. 2-6, 2018, Vilnius, Lithuania; Source: Intel, Qualcomm Inc., Lenovo, Motorola Mobility; Title: Enhancements to Dual Registration mode of operation; Document for: Approval; Agenda Item: 7.1; Work Item / Release: TEI16.
International Search Report and Written Opinion for International Application No. PCT/US2020/022169, mailed on Oct. 5, 2020.
C1-212402; 3GPP TSG-CT WG1 Meeting #129-e; Electronic meeting, Apr. 19-23, 2021; CR-Form-v12.1; Change Request; 24.301; CR 3503; rev 1; Current version: 17.2.0; Title: Paging Cause feature for EPS.
3GPP TS 24.501 V17.5.0 (Dec. 2021); Technical Specification; 3rd Generation Partnership Project; Technical Specification Group Core Network and Terminals; Non-Access-Stratum (NAS) protocol for 5G System (5GS); Stage 3; (Release 17).
3GPP TS 38.413 V16.8.0 (Dec. 2021); Technical Specification; 3rd Generation Partnership Project; Technical Specification Group Radio Access Network; NG-RAN; NG Application Protocol (NGAP); (Release 16).
C1-216047; 3GPP TSG-CT WG1 Meeting #132-e; E-meeting, Oct. 11-15, 2021; (revison of C1-215591); CR-Form-v12.1; Change Request; 24.501; CR 3589; rev 1; Current version: 17.4.1; Title: Paging timing collision control support in 5GS.
C1-216937; 3GPP TSG-CT WG1 Meeting #133-e; E-meeting, Nov. 11-19, 2021; CR-Form-v12.1; Change Request; 24.301; CR 3559; rev 6; Current version: 17.4.1; Title: MUSIM capability negotiation in EPC.
Third Generation Partnership Project (3GPPTM); Draft Meeting Report for TSG SA WG1 meeting: 85; Tallinn, Estonia, Feb. 18, 2019 to Feb. 22, 2019.
R3-22xxxx; 3GPP TSG-RAN WG3 #114bis-e; Jan. 17-26, 2022; Online; Agenda Item: 3; Source: RAN3 Chair; Title: Agenda; Document for: Approval.
R3-220364; 3GPP TSG-RAN WG3#114bis-e; E-meeting, Jan. 17-26, 2022; CR-Form-v12.1; Change Request; 38.413; CR 0724; rev; Current version: 16.8.0; Title: Support for Multi-USIM devices.
R3-220618; 3GPP TSG-RAN WG3 Meeting #114bis-e; Online, Jan. 17-26, 2022; CR-Form-v12.1; Change Request; 38.423; CR 0729; Rev; Current version: 16.8.0; Title: Support of MUSIM in XnAP.
R3-220677; 3GPP TSG-RAN WG3 Meeting #114-bis-e; E-meeting, Jan. 17-26, 2022; CR-Form-v12.1; Change Request; 38.473; CR 0852; rev -; Current version: 16.8.0; Title: Support for Multi-SIM devices.
S1-190113; 3GPP TSG-SA WG1 Meeting #85; Tallin, Estonia, Feb. 18-22, 2019; CR-Form-v11.2; Change Request; 22.101; CR 0556; rev -; Current version: 16.1.0; Title: Service requirements for enabling Multi-USIM devices support.
S1-190116; 3GPP TSG-SA WG1 Meeting #85; Tallin, Estonia, Feb. 18-22, 2019; CR-Form-v11.2; Change Request; 22.278; CR 0267; rev -; Current version: 16.1.0; Title: General Service requirements for enabling Multi-USIM devices support.
S1-190156; 3GPP TSG-SA WG1 Meeting #85; Tallinn, Estonia, Feb. 18-22, 2019; Title: Use cases for multi-USIM devices; Agenda Item: 4 [MUSIM]; Source: Qualcomm Incorporated.
Office Action, mailed Aug. 3, 2022, in Chinese Patent Application No. 2020800205645.
S2-186954; SA WG2 Meeting #S2-128; Jul. 2-6, 2018, Vilnius, Lithuania; Title: [Draft] Paging cause from RAN to UE; Release: Rel-16; Work Item: 5GS_ph1, TEI16.
3GPP TR 23.761 V0.3.0 (Jan. 2021); Technical Report; 3rd Generation Partnership Project; Technical Specification Group Services and System Aspects; Study on system enablers for devices having multiple Universal Subscriber Identity Modules (USIM) (Release 17).
Chinese Office Action mailed Jun. 4, 2025 in CN Patent Application No. 2023103475656.
S2-181868; SA WG2 Meeting #126; Feb. 26-Mar. 2, 2018, Montreal, Canada; Source: Qualcomm Incorporated, Intel; Title: Paging cause to the UE; Document for: Discussion/Approval; Agenda Item: 6.5.1; Work Item / Release: 5GS_Ph1/Rel.15.
S2-186954; SA WG2 Meeting #S2-128; Jul. 2-6, 2018, Vilnius, Lithuania; Title: [Draft] Paging cause from RAN to UE; Release: Rel-16; Work Item: 5GS_ph1, TEI16.

* cited by examiner

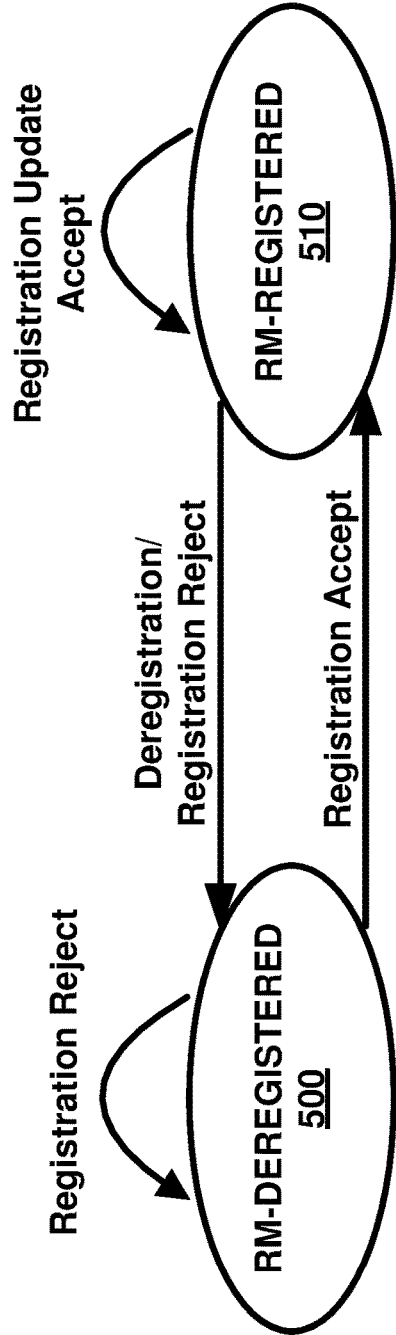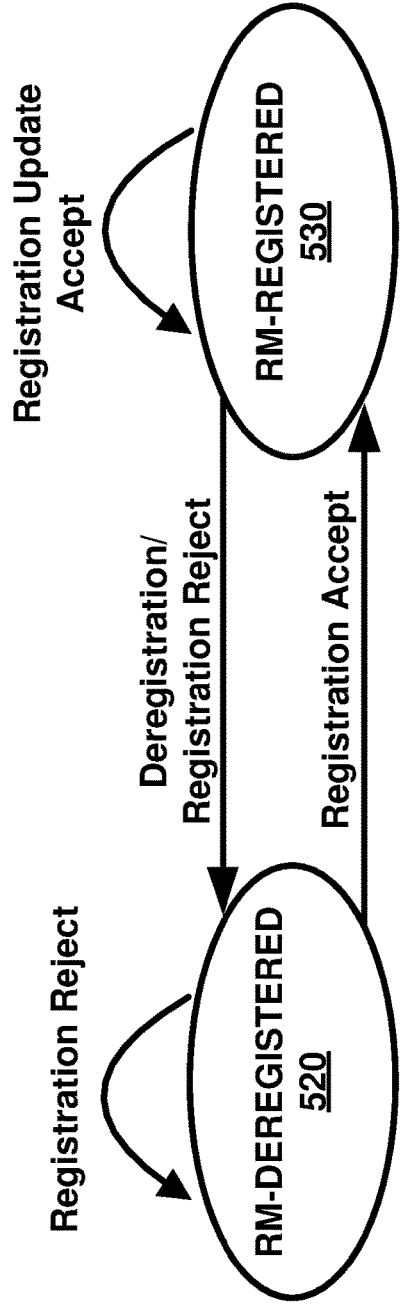

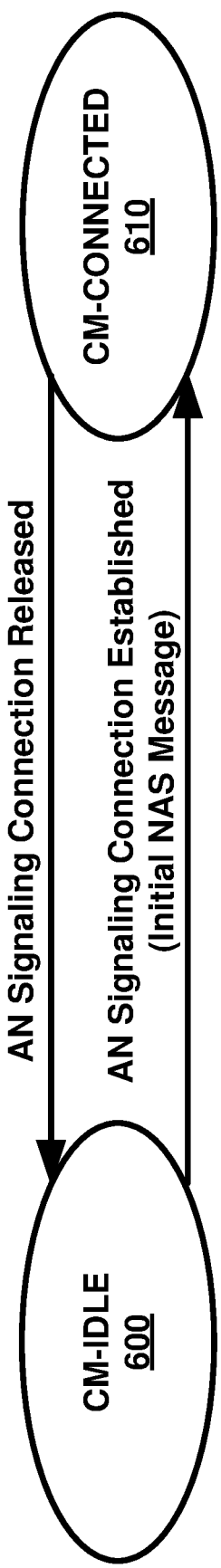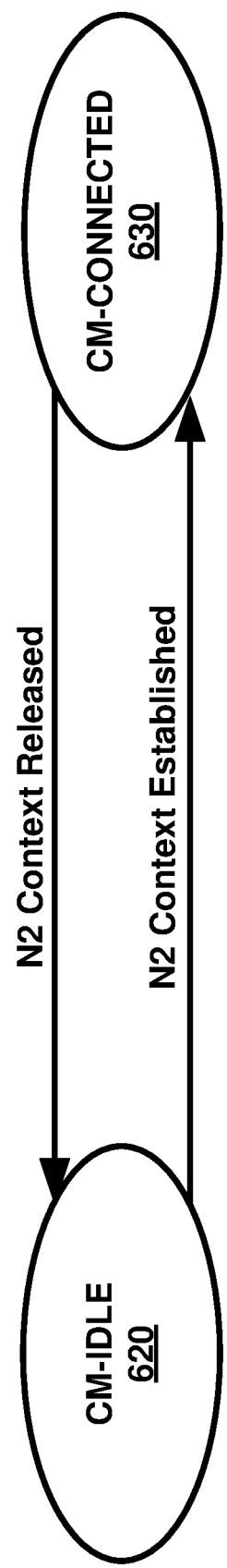
FIG. 6A CM State Transition in UE
FIG. 6B CM State Transition in AMF Call flow for RRC state transition Simultaneous registration to 3GPP and Non-3GPP access technology (non-roaming case)

Downlink PDU session information transfer

| Bits | | | | | | | | Number of Octects |
|---|---|---|---|---|---|---|---|---|
| 7 | 6 | 5 | 4 | 3 | 2 | 1 | 0 | |
| PDU Type (=0) | | | | Spare | | | | 1 |
| PPP | RQI | QoS Flow Identifier | | | | | | 1 |
| PPI | | | Spare | | | | | 0 or 1 |
| Padding | | | | | | | | 0-3 |

Downlink PDU session information format

Downlink NAS transport

| Information element | Presence |
|---|---|
| Message Type | Mandatory |
| AMF UE NGAP ID | Mandatory |
| RAN UE NGAP ID | Mandatory |
| Old AMF | Optional |
| RAN paging priority | Optional |
| NAS-PDU | Mandatory |
| NAS PDU type | Optional |
| Allowed NSSAI | Optional |

Downlink non-access stratum (NAS) transport

| Bits | | | | | | | | Number of Octects |
|---|---|---|---|---|---|---|---|---|
| 7 | 6 | 5 | 4 | 3 | 2 | 1 | 0 | |
| PDU Type (=0) | | | | Spare | | | | 1 |
| PPP | RQI | QoS Flow Identifier | | | | | | 1 |
| PPI | | | Paging cause value | | | | | 0 or 1 |
| Padding | | | | | | | | 0-3 |

Downlink PDU session information format

FIG. 31

Event: Connectivity-State-Report

A NF subscribes to this event to receive the current connectivity state of a UE or a group of UEs, and report for updated connectivity state of a UE or any UE in the group when AMF becomes aware of a connectivity state change of the UE.

UE Type: One UE, Group of UEs

Report Type: One-Time Report, Continuous Report

Input: UE ID(s)

Notification: UE ID, most recent connectivity state (IDLE/CONNECTED) with access type

FIG. 33A

Event: RRC Connectivity-State-Report

A NF subscribes to this event to receive the current RRC state of a UE or a group of UEs, and report for updated connectivity state of a UE or any UE in the group when AMF becomes aware of a RRC connectivity state change of the UE.

UE Type: One UE, Group of UEs

Report Type: One-Time Report, Continuous Report

Input: UE ID(s)

Notification: UE ID, most recent RRC state (RRC-CONNECTED/RRC-INACTIVE/RRC-IDLE) for 3GPP access

FIG. 33B

PAGING CAUSE INDICATION

CROSS-REFERENCE TO RELATED APPLICATIONS

This application is a continuation of U.S. patent application Ser. No. 17/876,094, filed Jul. 28, 2022, which is a continuation of U.S. patent application Ser. No. 17/381,938, filed Jul. 21, 2021, which is a continuation of International Application No. PCT/US2020/022169, filed Mar. 11, 2020, which claims the benefit of U.S. Provisional Application No. 62/816,414, filed Mar. 11, 2019, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 31 illustrates an example embodiment of a present disclosure.

FIG. 33A illustrates an example embodiment of a present disclosure.

FIG. 33B illustrates an example embodiment of a present disclosure.

DETAILED DESCRIPTION OF EMBODIMENTS

Example embodiments of the present invention enable implementation of enhanced features and functionalities in 4G/5G systems. Embodiments of the technology disclosed herein may be employed in the technical field of 4G/5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
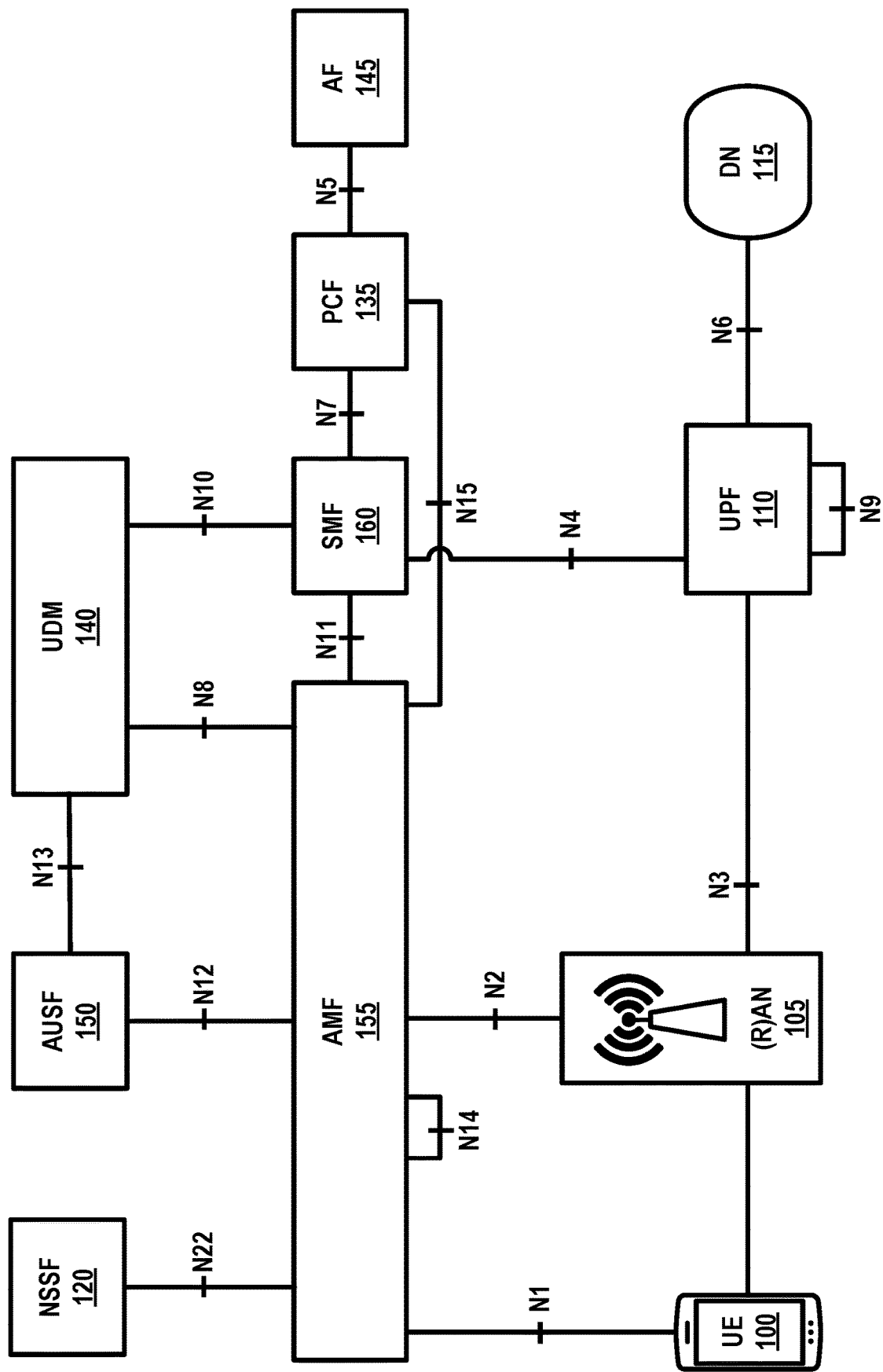
FIG. 1 is a diagram of an example 5G system architecture as per an aspect of an embodiment of the present disclosure.
Figure 2:
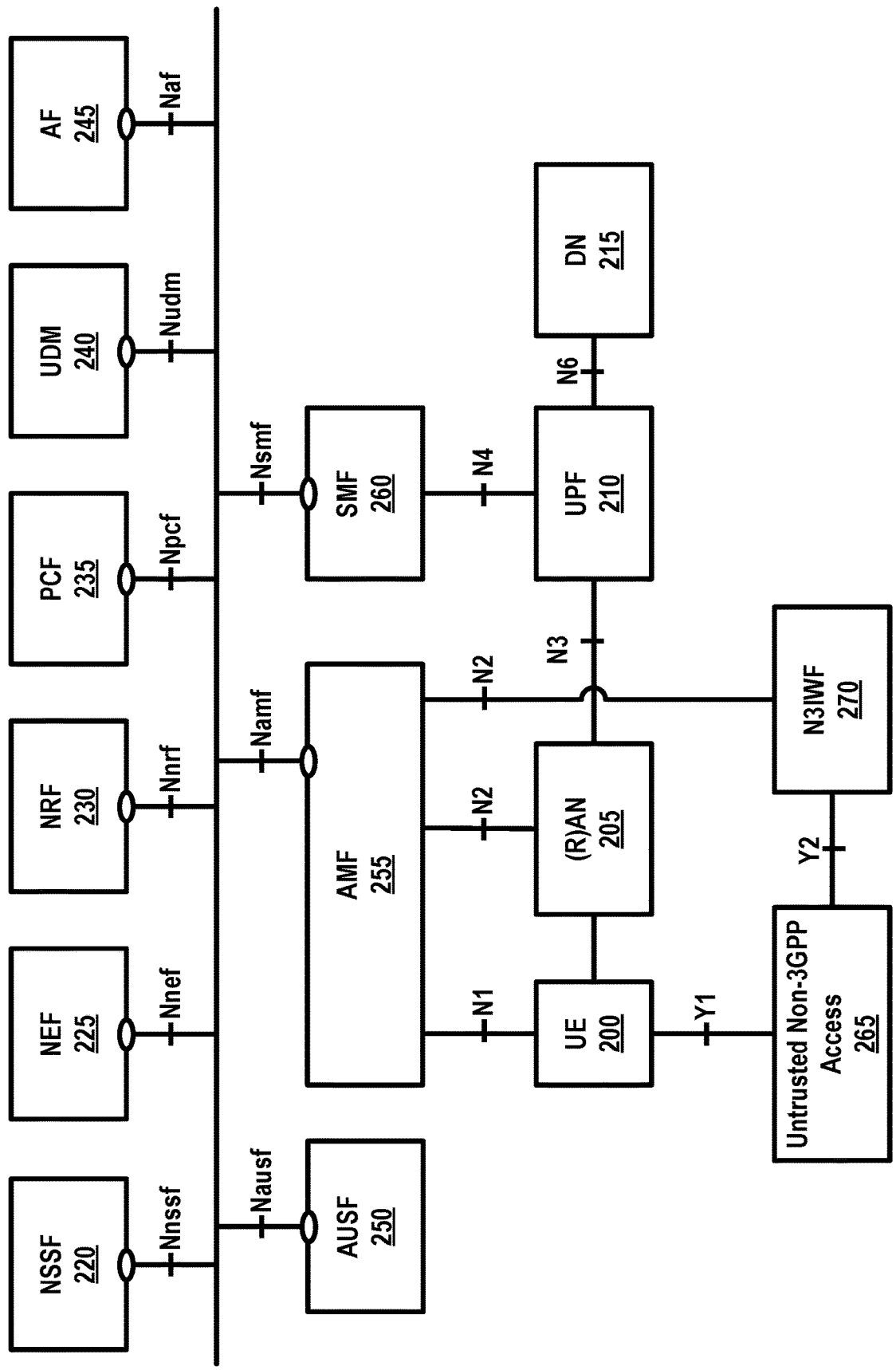
FIG. 2 is a diagram of an example 5G System architecture as per an aspect of an embodiment of the present disclosure.

The following acronyms are used throughout the present disclosure:
- 5G 5th generation mobile networks
- 5GC 5G Core Network
- 5GS 5G System
- 5G-AN 5G Access Network
- 5QI 5G QoS Indicator
- ACK Acknowledgement
- AF Application Function
- AMF Access and Mobility Management Function
- AN Access Network
- CDR Charging Data Record
- CCNF Common Control Network Functions
- CIoT Cellular IoT
- CN Core Network
- CP Control Plane
- DDN Downlink Data Notification
- DL Downlink
- DN Data Network
- DNN Data Network Name
- DRX Discontinuous Reception
- F-TEID Fully Qualified TEID
- gNB next generation Node B
- GPSI Generic Public Subscription Identifier
- GTP GPRS Tunneling Protocol
- GUTI Globally Unique Temporary Identifier
- HPLMN Home Public Land Mobile Network
- IMSI International Mobile Subscriber Identity
- LADN Local Area Data Network
- LI Lawful Intercept
- MEI Mobile Equipment Identifier
- MICO Mobile Initiated Connection Only
- MME Mobility Management Entity
- MO Mobile Originated
- MSISDN Mobile Subscriber ISDN
- MT Mobile Terminating
- N3IWF Non-3GPP InterWorking Function
- NAI Network Access Identifier
- NAS Non-Access Stratum
- NB-IoT Narrow Band IoT
- NEF Network Exposure Function
- NF Network Function
- NGAP Next Generation Application Protocol
- NR New Radio
- NRF Network Repository Function
- NSI Network Slice Instance
- NSSAI Network Slice Selection Assistance Information
- NSSF Network Slice Selection Function
- OCS Online Charging System
- OFCS Offline Charging System
- PCF Policy Control Function
- PDU Packet/Protocol Data Unit
- PEI Permanent Equipment Identifier
- PLMN Public Land Mobile Network
- PRACH Physical Random Access CHannel
- RAN Radio Access Network
- QFI QoS Flow Identity
- RM Registration Management
- S1-AP S1 Application Protocol
- SBA Service Based Architecture
- SEA Security Anchor Function
- SCM Security Context Management
- SI System Information
- SIB System Information Block
- SMF Session Management Function
- SMS Short Message Service
- SMSF SMS Function
- S-NSSAI Single Network Slice Selection Assistance information
- SUCI Served User Correlation ID
- SUPI Subscriber Permanent Identifier
- TEID Tunnel Endpoint Identifier
- UE User Equipment
- UL Uplink
- UL CL Uplink Classifier
- UPF User Plane Function
- VPLMN Visited Public Land Mobile Network Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
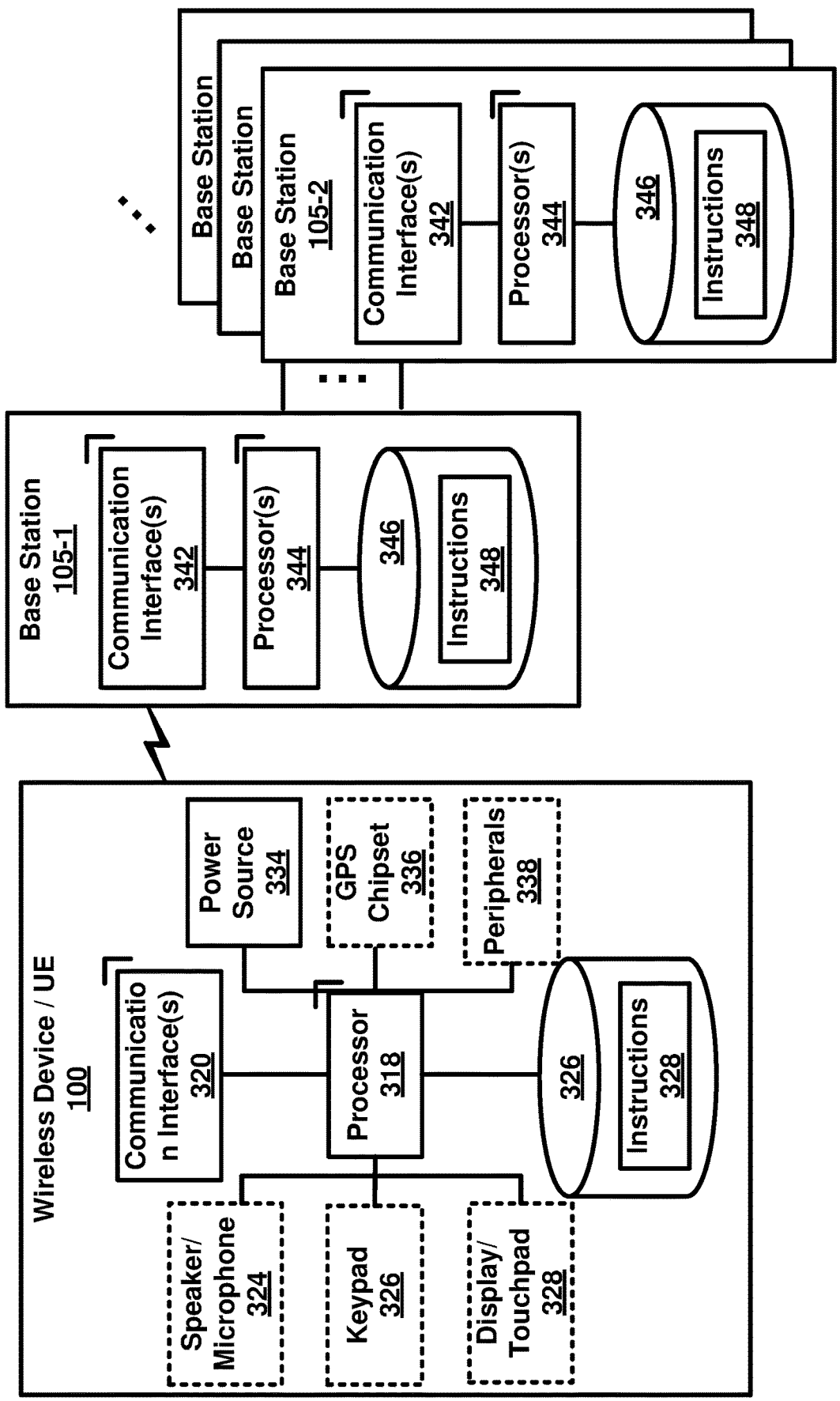
FIG. 3 is a system diagram of an example wireless device and a network node in a 5G system as per an aspect of an embodiment of the present disclosure.
Figure 4:
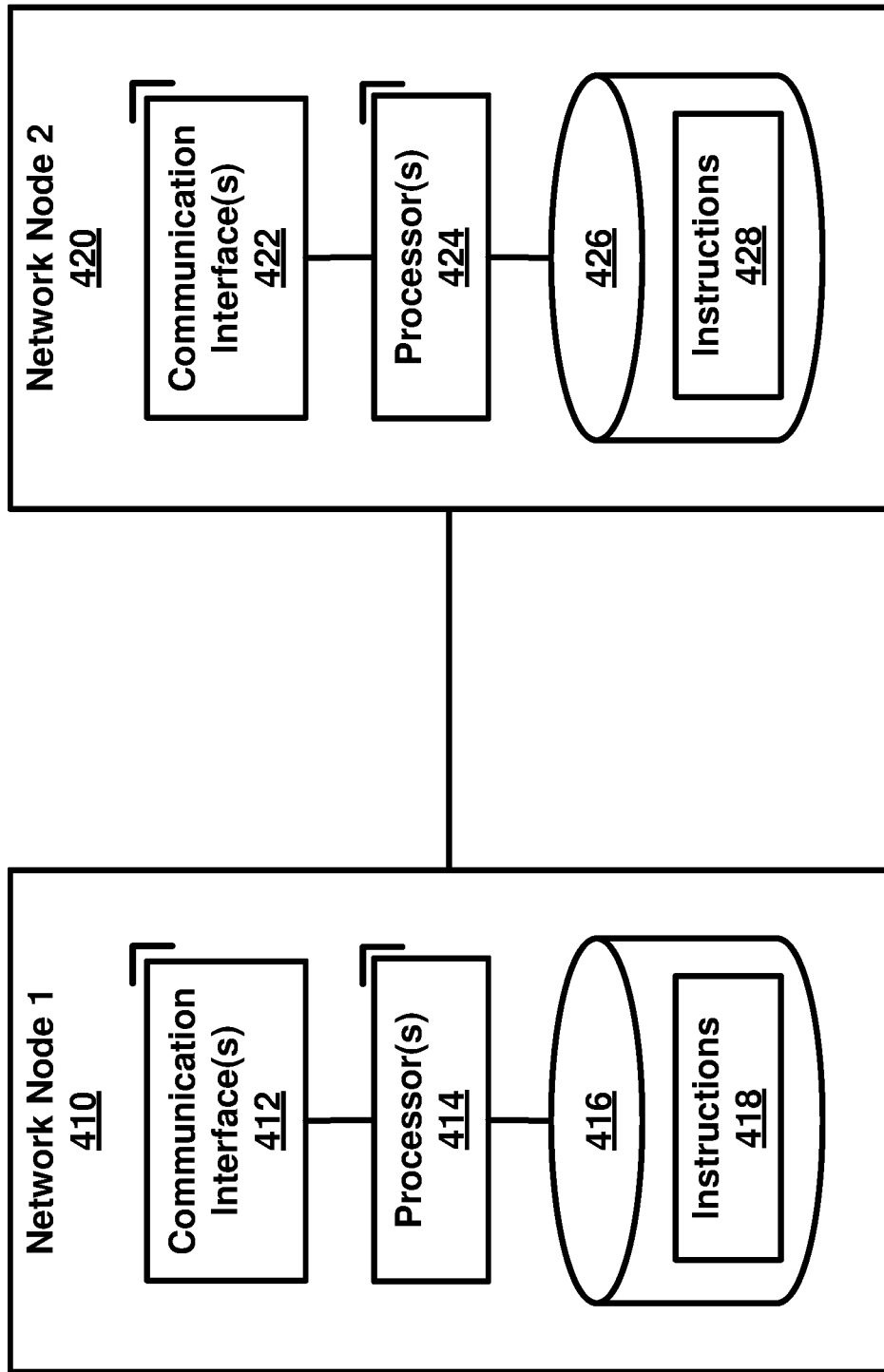
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function (AF), AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
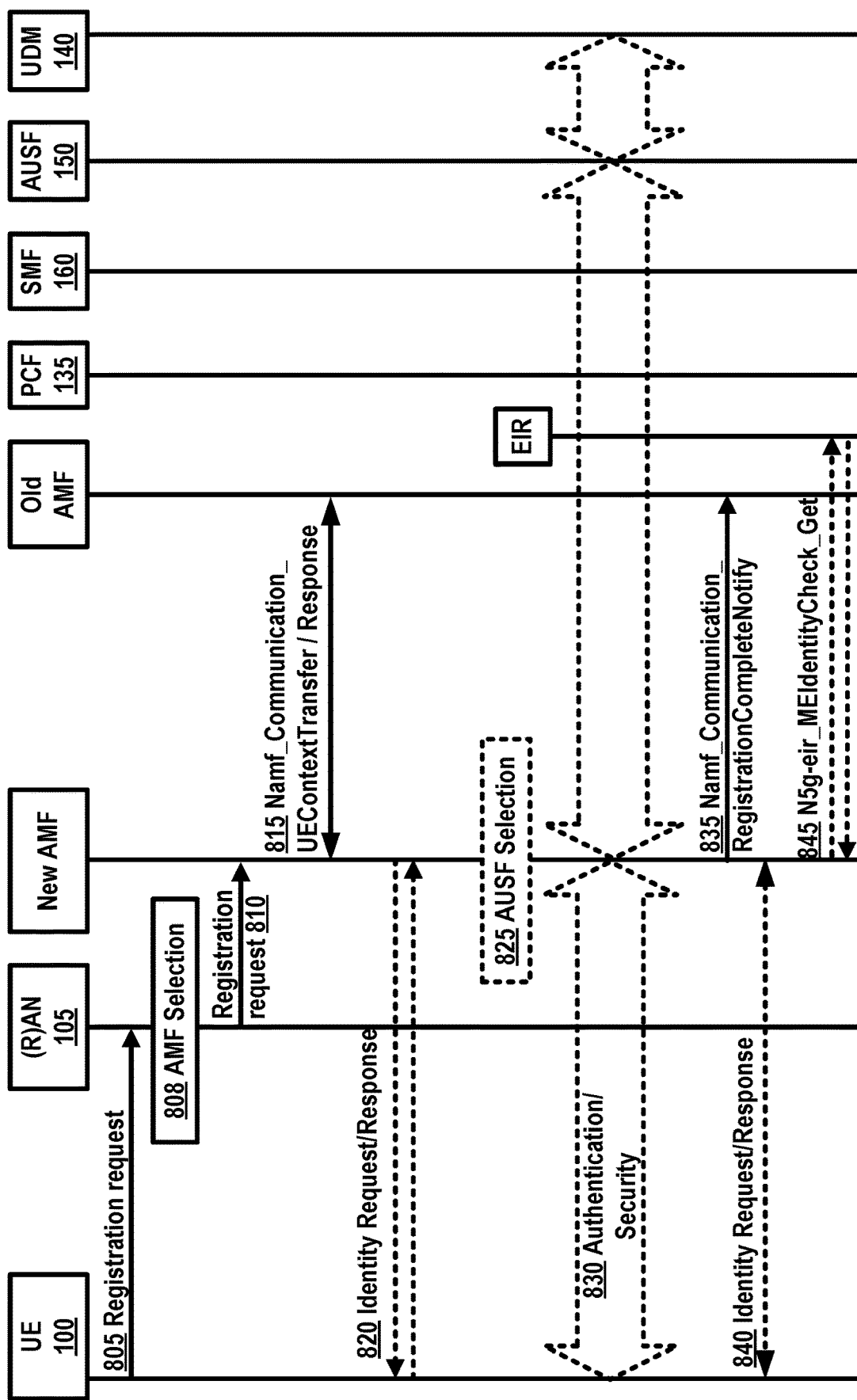
FIG. 8 is an example call flow as per an aspect of an embodiment of the present disclosure.
Figure 9:
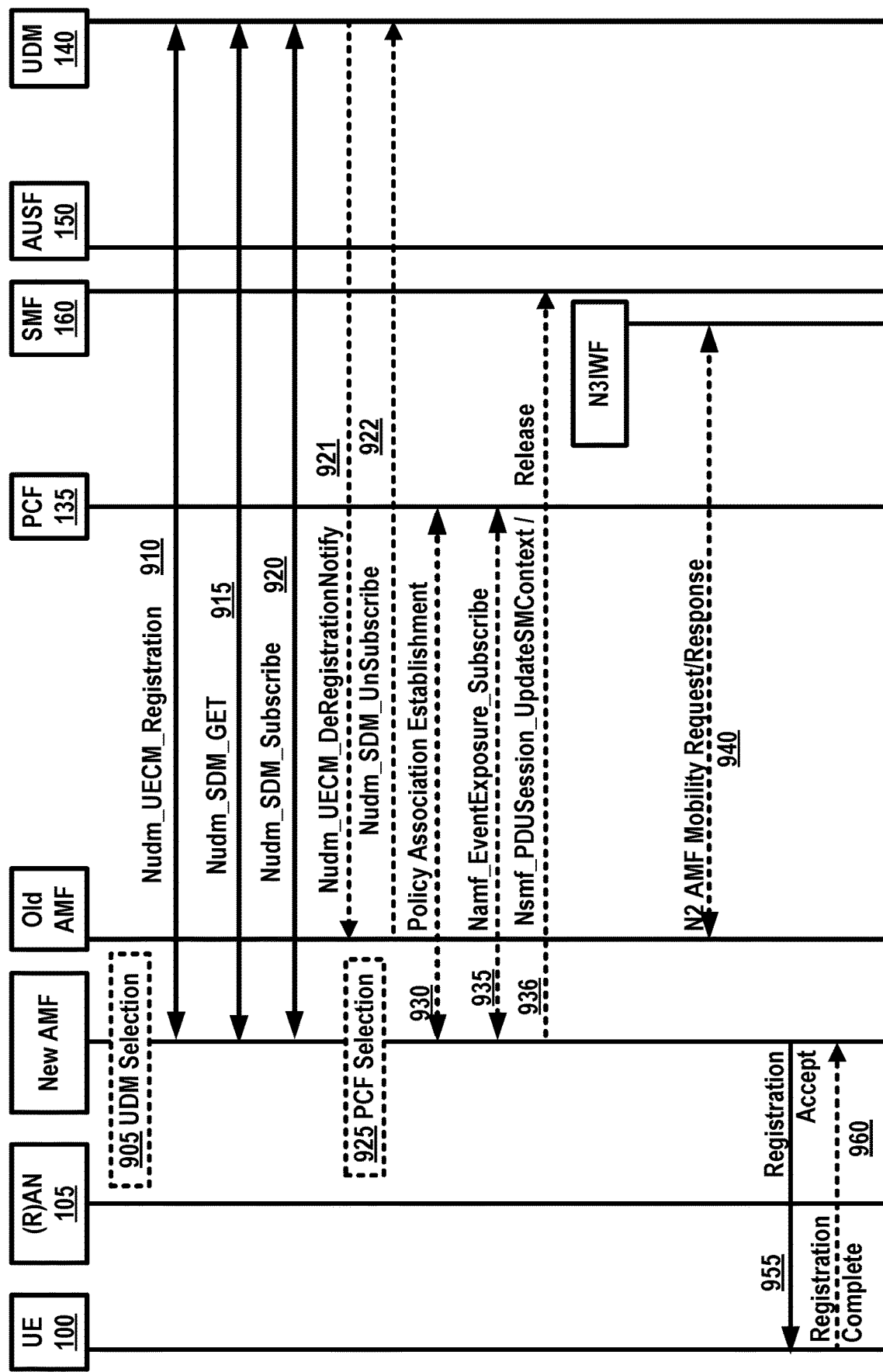
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
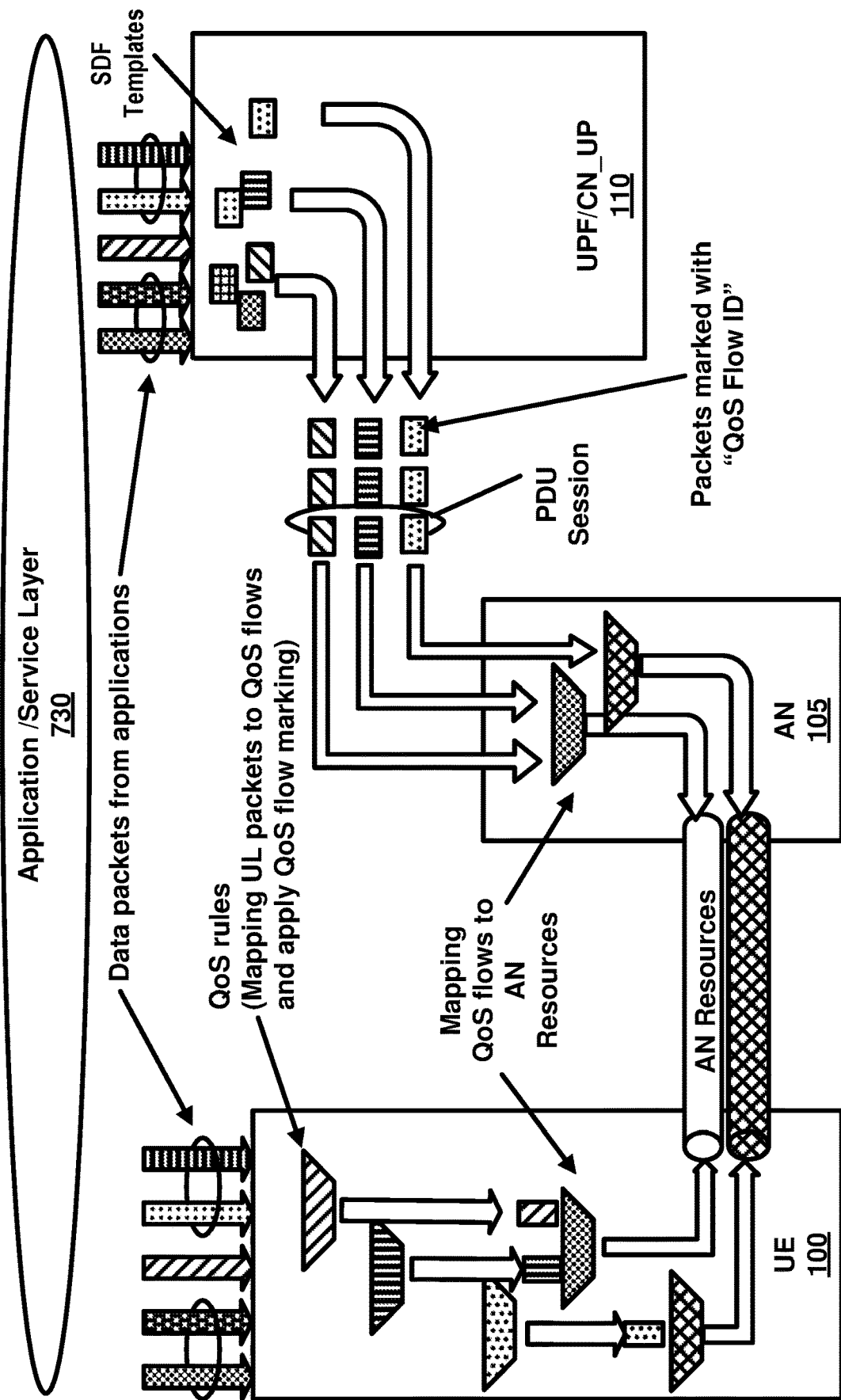
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QOS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QOS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (e.g. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (e.g., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (e.g. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentity-Check_Get service operation 845.

In an example, the new AMF 155, based on the SUPI, may select 905 a UDM 140. The UDM 140 may select a UDR instance. In an example, the AMF 155 may selects a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
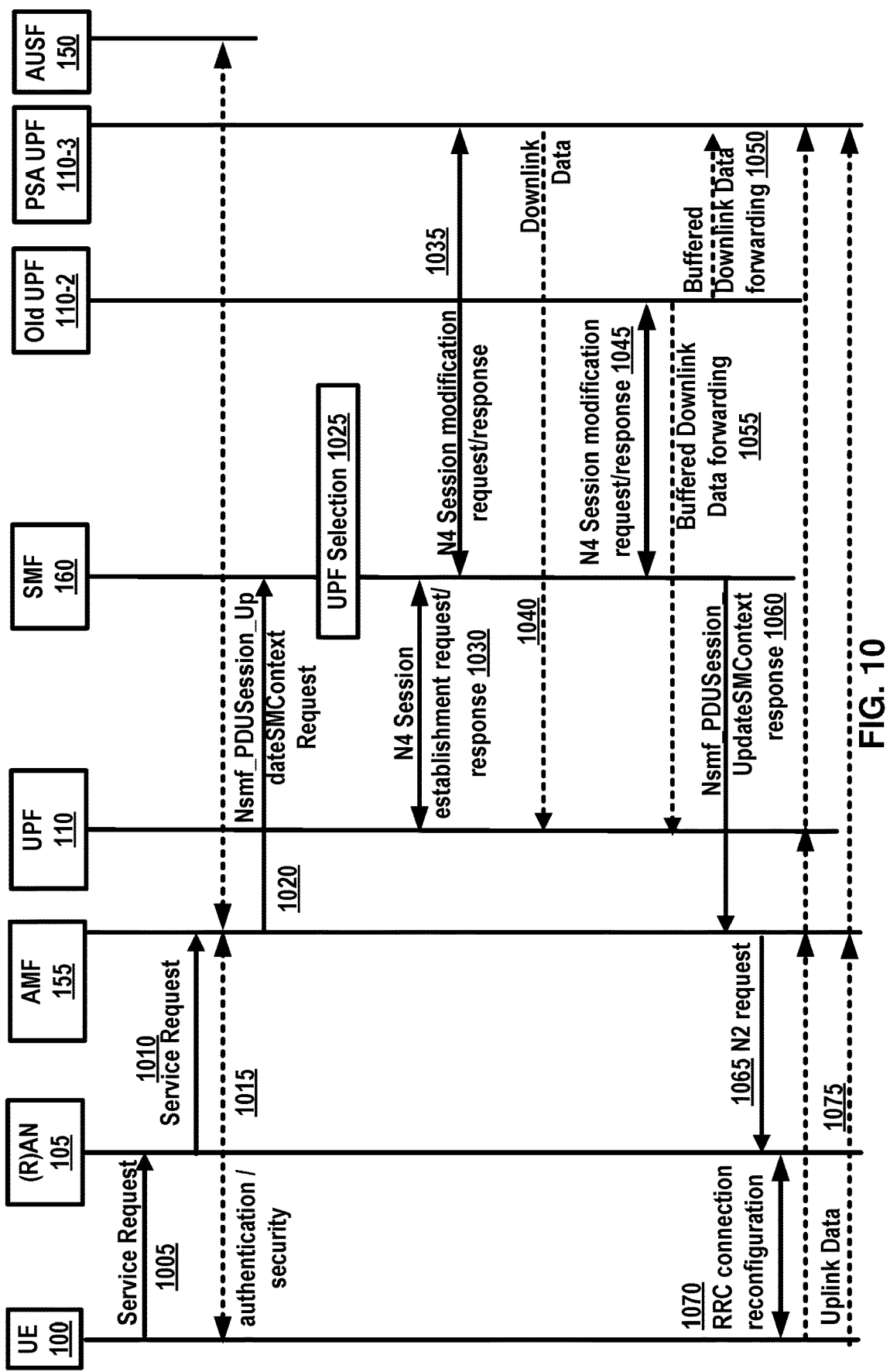
FIG. 10 is an example call flow as per an aspect of an embodiment of the present disclosure.
Figure 11:
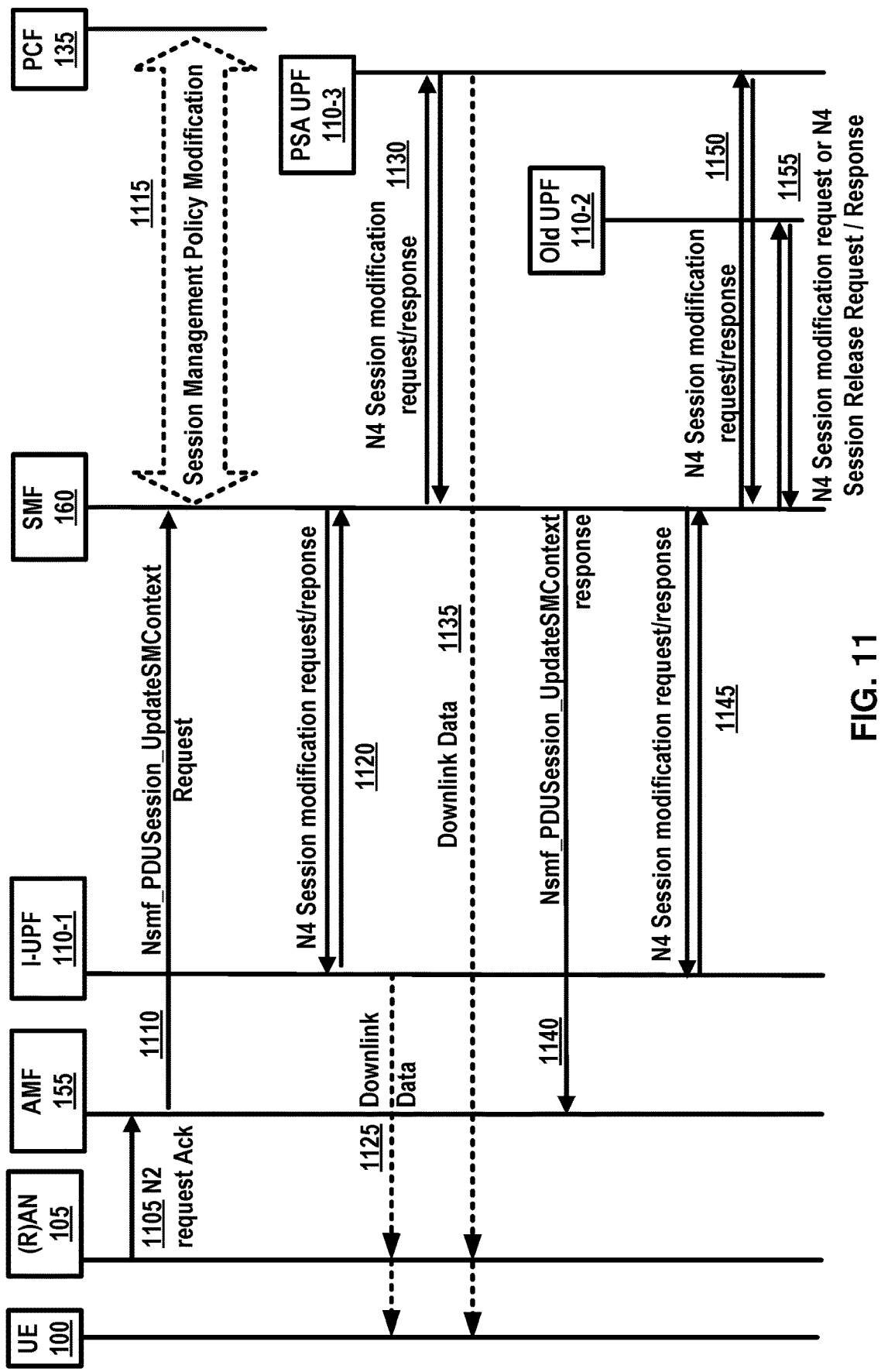
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(s) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (e.g. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105.

In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
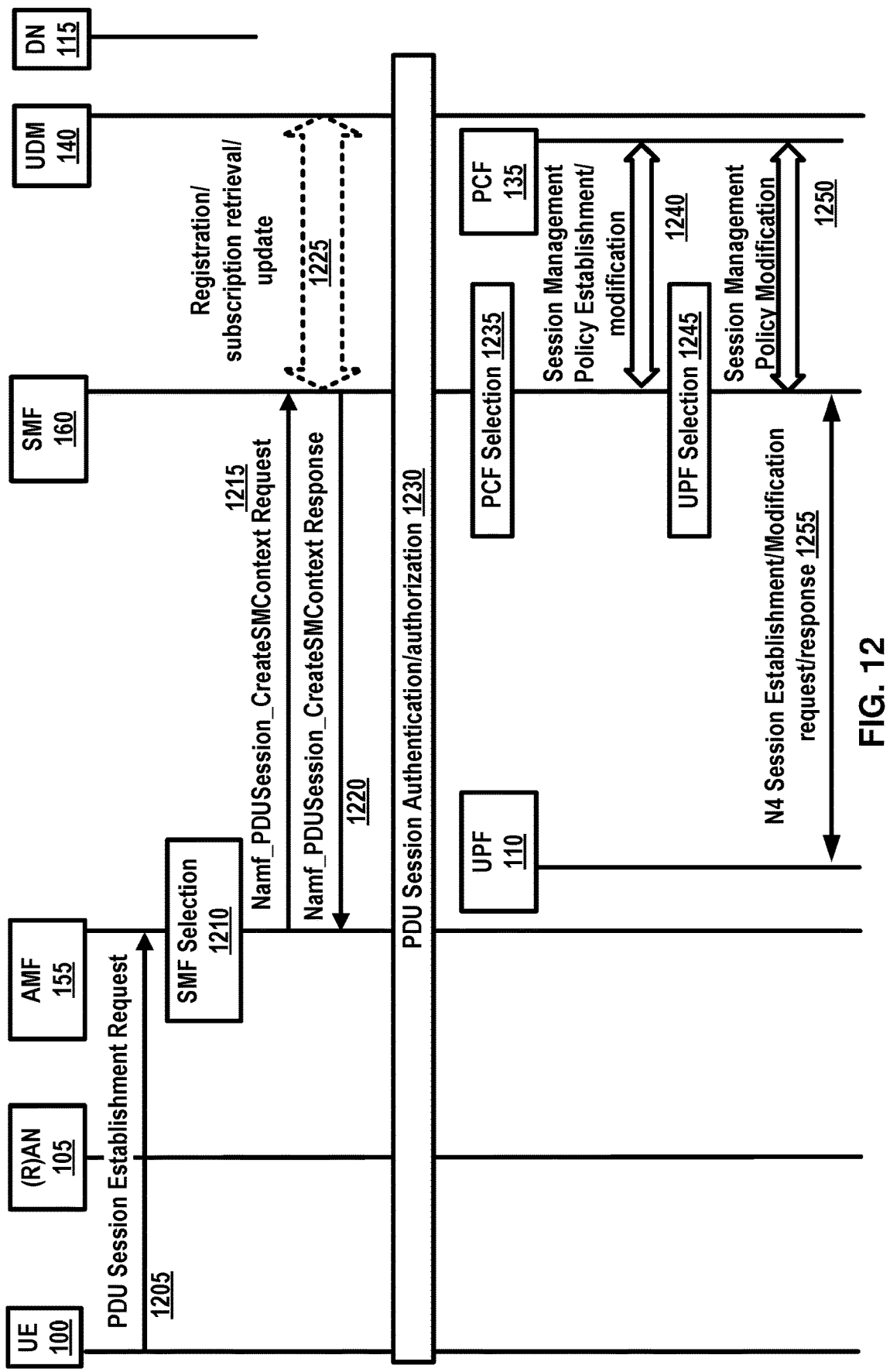
FIG. 12 is an example call flow as per an aspect of an embodiment of the present disclosure.
Figure 13:
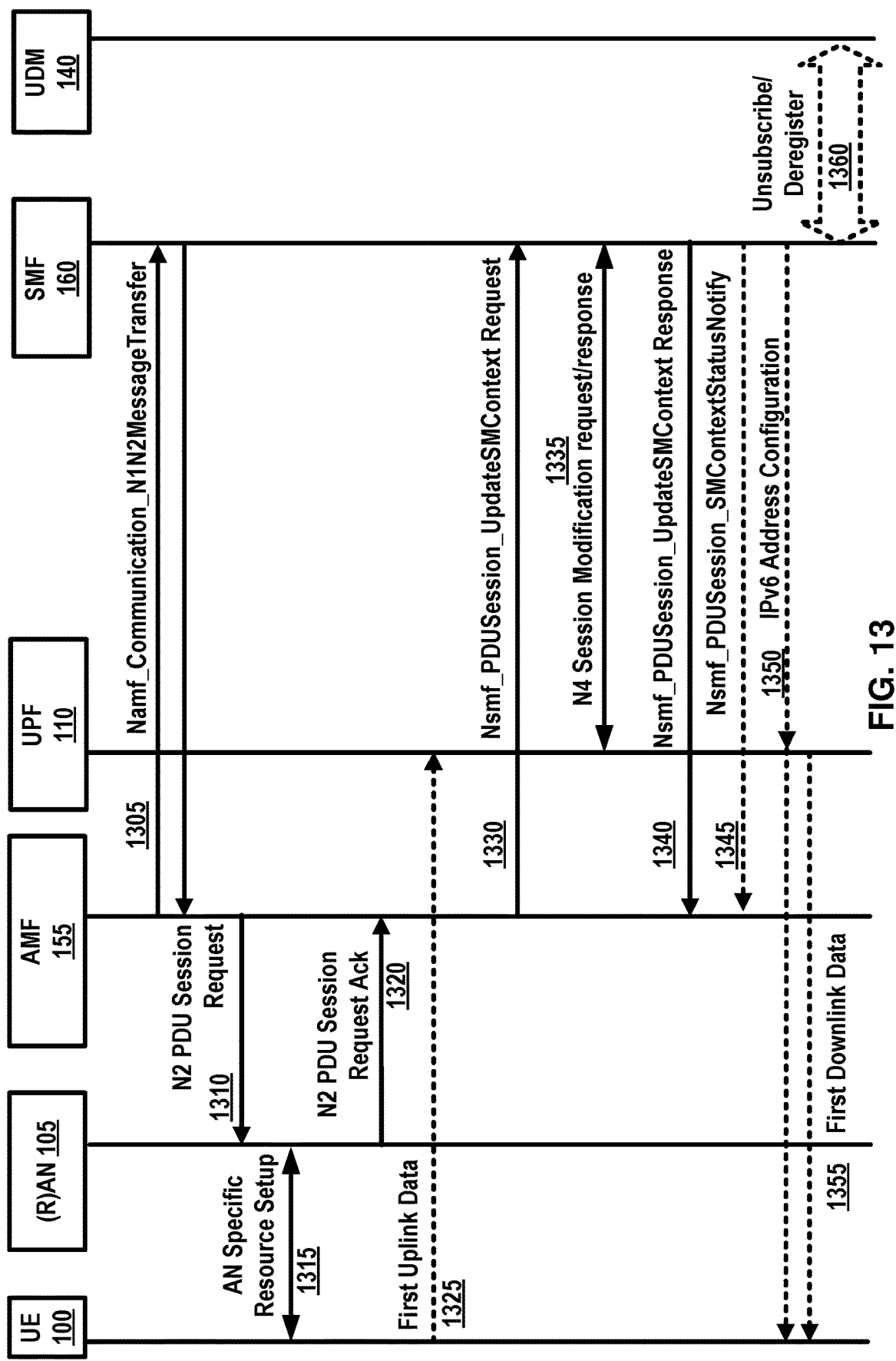
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPV6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPV6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QOS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_ Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_ SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPV6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
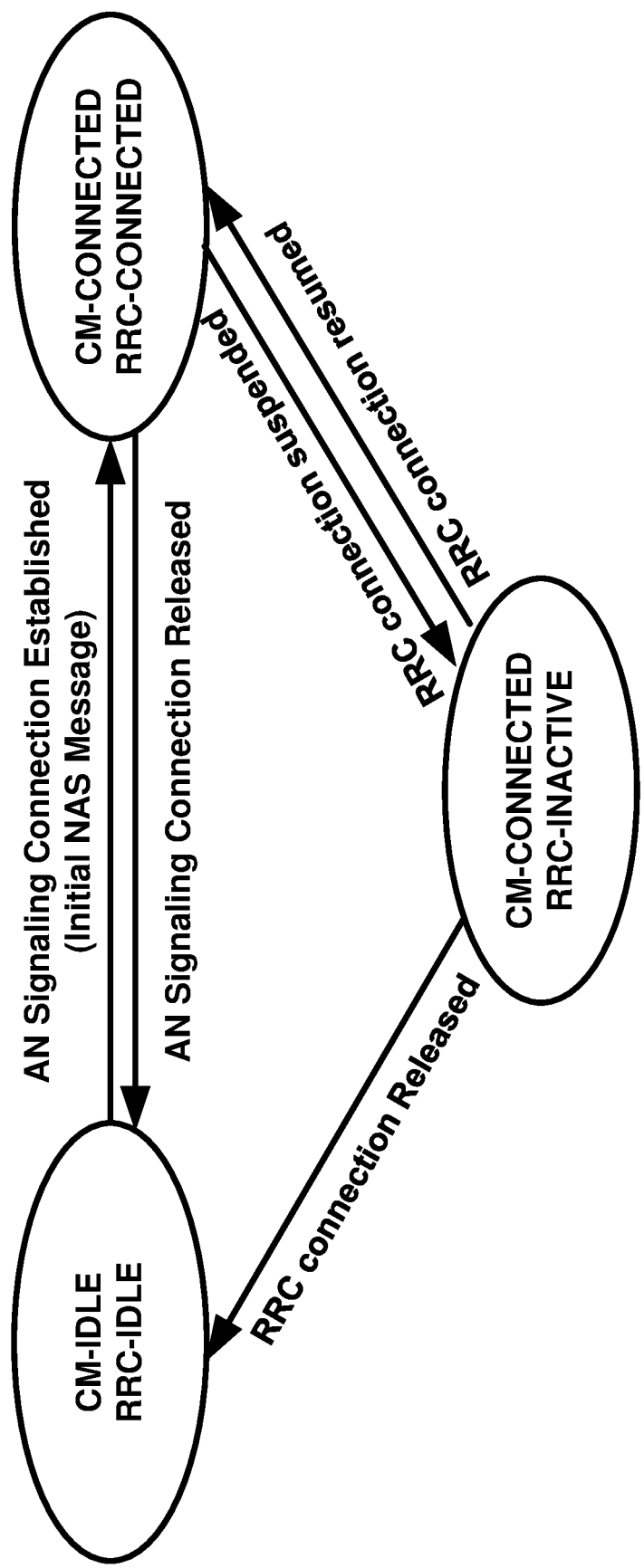
FIG. 14 is an example radio resource control (RRC) state transition aspect as per an aspect of an embodiment of the present disclosure.

As depicted in FIG. 14, a connection management (CM) state may be related to a radio resource control (RRC) state. RRC-INACTIVE (e.g. RRC inactive) may be a state where a UE (e.g. a wireless device, device) remains in CM-CONNECTED (e.g. CM connected). In an example, the UE may move within an area configured by a RAN (e.g. NG-RAN), referred to as a RAN notification area (RNA), without notifying the RAN. In RRC_INACTIVE state, the last base station (e.g., gNB) of a RAN to serve the UE may keep the UE context and the UE-associated connection with the serving AMF and UPF (e.g. N2 connection, N3 connection). In an example, a UE in CM-IDLE may be in RRC-IDLE. In an example, a UE in CM-CONNECTED may be in RRC-CONNECTED. The mobility behavior of the UE in RRC-INACTIVE may be similar with RRC-IDLE state behavior (e.g. cell reselection based on serving cell quality, paging monitoring, periodic system information acquisition) and may apply different parameter for RRC-IDLE and RRC-INACTIVE.

Figure 15:
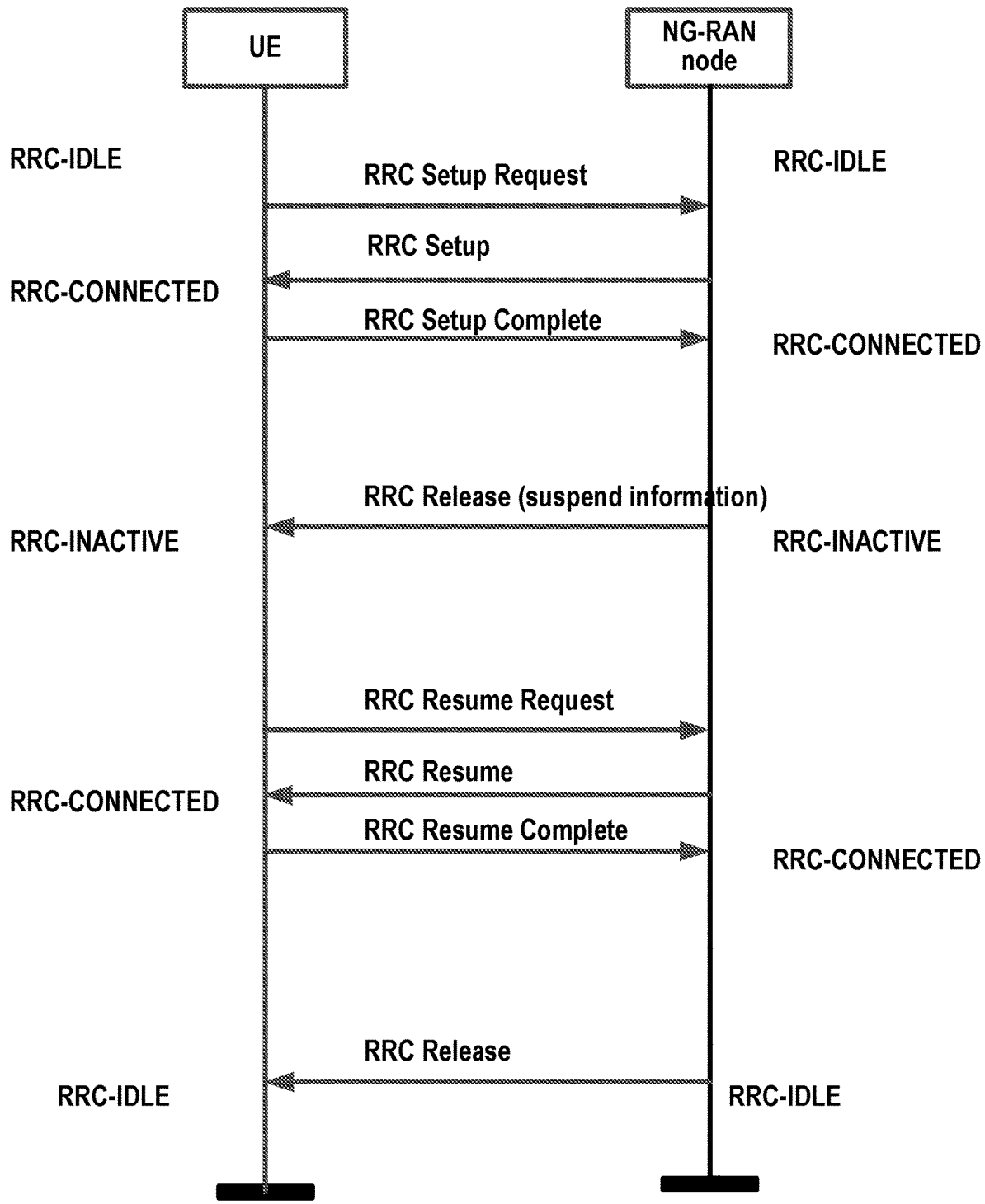
FIG. 15 is an example call flow for RRC state transition as per an aspect of an embodiment of the present disclosure.

FIG. 15 illustrates an example call flow for four RRC state transitions in accordance with embodiments of the present disclosure. The four RRC state transitions include: RRC-IDLE to RRC-CONNECTED; RRC-CONNECTED to RRC-INACTIVE; RRC-INACTIVE to RRC-CONNECTED; and RRC_CONNECTED to RRC-IDLE. It should be noted that, although the four RRC state transitions are shown as part of a single call flow diagram, each RRC state transition call flow can be performed independently from each other.

Starting with the RRC state transition from RRC-IDLE to RRC-CONNECTED, a UE in RRC-IDLE may send an RRC setup request message to an NG-RAN node (e.g., a gNB) to request RRC connection setup with the NG-RAN. The UE may receive an RRC setup message from the NG-RAN node in response to the RRC setup request message. The UE may transition from the RRC-IDLE to RRC-CONNECTED in response to the RRC setup message from the NG-RAN node. The RRC state maintained at the UE may be updated to reflect that the current RRC state of the UE is RRC-CONNECTED after the state transition. The UE may respond to the RRC setup message by sending an RRC setup complete message to the NG-RAN. The RRC state maintained at the NG-RAN node may be updated to reflect that the current RRC state of the UE is RRC-CONNECTED after receiving the RRC setup complete message.

For the RRC state transition from RRC-CONNECTED to RRC-INACTIVE, the NG-RAN node may send an RRC release message to the UE to request suspension of an RRC connection. In an example, the RRC release message may include suspend information that indicates to the UE that the RRC release message is for suspending instead of releasing the RRC connection. The suspend information may comprise a radio network temporary identity (RNTI) value, a radio access network (RAN) paging cycle, RAN notification area information, and/or the like. The UE may transition from RRC-CONNECTED to RRC-INACTIVE in response to the RRC release message from the NG-RAN node. The RRC state maintained at both the UE and the NG-RAN node may be updated to reflect that the current RRC state of the UE is RRC-INACTIVE.

For the RRC state transition from RRC-INACTIVE to RRC-CONNECTED, the UE may send an RRC resume request message to the NG-RAN node to request that the suspended RRC connection be resumed. The UE may receive an RRC resume message from the NG-RAN node in response to the RRC resume request message. In response to the RRC resume message from the NG-RAN node, the UE may transition from RRC-INANCTIVE to RRC-CONNECTED state and may send an RRC resume complete message to the NG-RAN node. The RRC state maintained at the UE may be updated to reflect that the current RRC state of the UE is RRC-CONNECTED after the state transition. The RRC state maintained at the NG-RAN node may be updated to reflect that the current RRC state of the UE is RRC-CONNECTED after receiving the RRC resume complete message from the UE.

Finally, for the RRC state transition from RRC-CONNECTED to RRC-IDLE, the NG-RAN node may send an RRC release message to the UE to request that the RRC connection be released. The UE may transition from RRC-CONNECTED to RRC-IDLE after receiving RRC release message from the NG-RAN node. The RRC state maintained at both the UE and the NG-RAN node may be updated to reflect that the current RRC state of the UE is RRC-IDLE.

Figure 16:
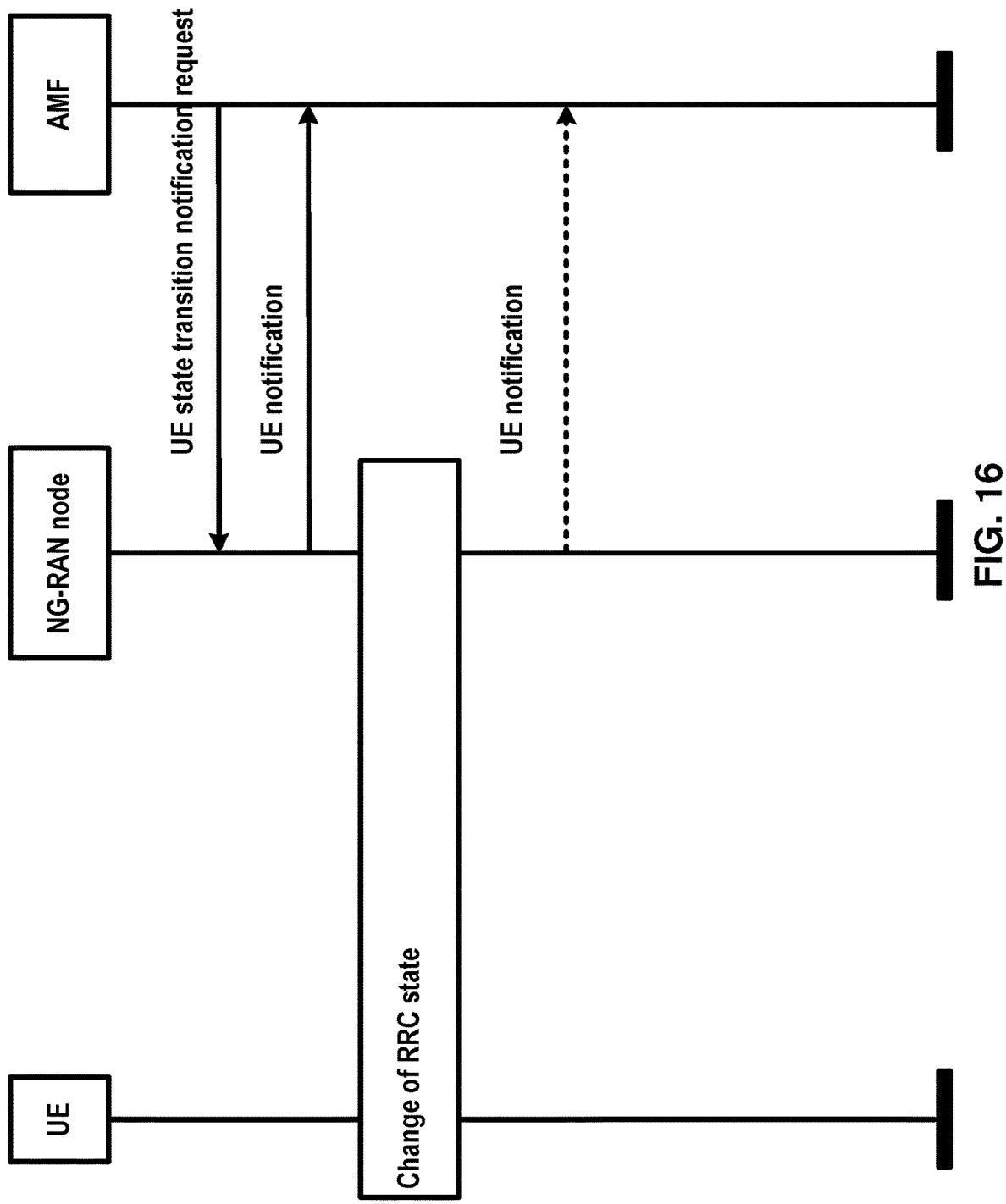
FIG. 16 is an example call flows of RRC state transition report to a core network.

A 5G core network node may query a NG-RAN node to get RRC state transition information of a UE. In an example, the core network may be an AMF. The AMF may send a UE state transition notification request message (e.g. UE state transition notification request message, RRC state notification message) to a NG-RAN node, requesting to report the RRC state transition information as illustrated in FIG. 16. The UE state transition notification request message may comprise AMF UE NGAP ID, RAN UE NGAP ID, an RRC Inactive Transition Report Request information element (IE) and/or the like. The AMF UE NGAP ID may uniquely identify a UE association over the NG interface (e.g. N2 interface) within the AMF side. The RAN UE NGAP ID may uniquely identify a UE association over the NG interface within the NG-RAN side. The RRC Inactive Transition Report Request IE may indicate a condition of RRC state transition reporting and may comprise a subsequent state transition report, single RRC connected state report, cancel report and/or the like. The NG-RAN may report to the AMF by sending a UE notification message (e.g. RRC INACTIVE TRANSITION REPORT, RRC state information message) comprising an RRC state of the UE if the UE transition into RRC-CONNECTED from RRC-INACTIVE or vice versa in case the RRC Inactive Transition Report Request information element (IE) is set to "subsequent state transition report". In an example, the NG-RAN may report to the AMF by sending the UE notification message but no subsequent UE notification messages if the UE is in RRC_CONNECTED state and the RRC Inactive Transition Report Request IE is set to "single RRC connected state report". In an example, the NG-RAN may report to the AMF one UE notification message plus one subsequent UE notification message when the RRC state transitions to RRC_CONNECTED state if the UE is in RRC_INACTIVE state and the RRC Inactive Transition Report Request IE is set to "single RRC connected state report". In an example, the NG-RAN may stop reporting to the AMF the RRC state of the UE in case the RRC Inactive Transition Report Request IE is set to "cancel report". In an example, the UE notification message may further comprise AMF UE NGAP ID, RAN UE NGAP ID, user location information and/or the like. The user location information may comprise a tracking area identity, a cell global identity, an age of location (e.g. time stamp information as defined in IETF RFC 5905) of the location information and/or the like. The reporting of RRC state transitions may be requested per UE by the AMF. The continuous reporting by setting "subsequent state transition report" of all RRC state transitions can be enabled by operator local configuration.

In an example, a UE may register to a same AMF via a third-generation partnership project (3GPP) access network and a non-3GPP access network. The 3GPP access network may be 5G access network (e.g. NG-RAN) or a 4G access network (e.g. LTE). The non-3GPP access network may be a wireless local access network (WLAN), such as a WLAN implemented in accordance with one of IEEE's 802.11 specifications, or a wired LAN.

Figure 17:
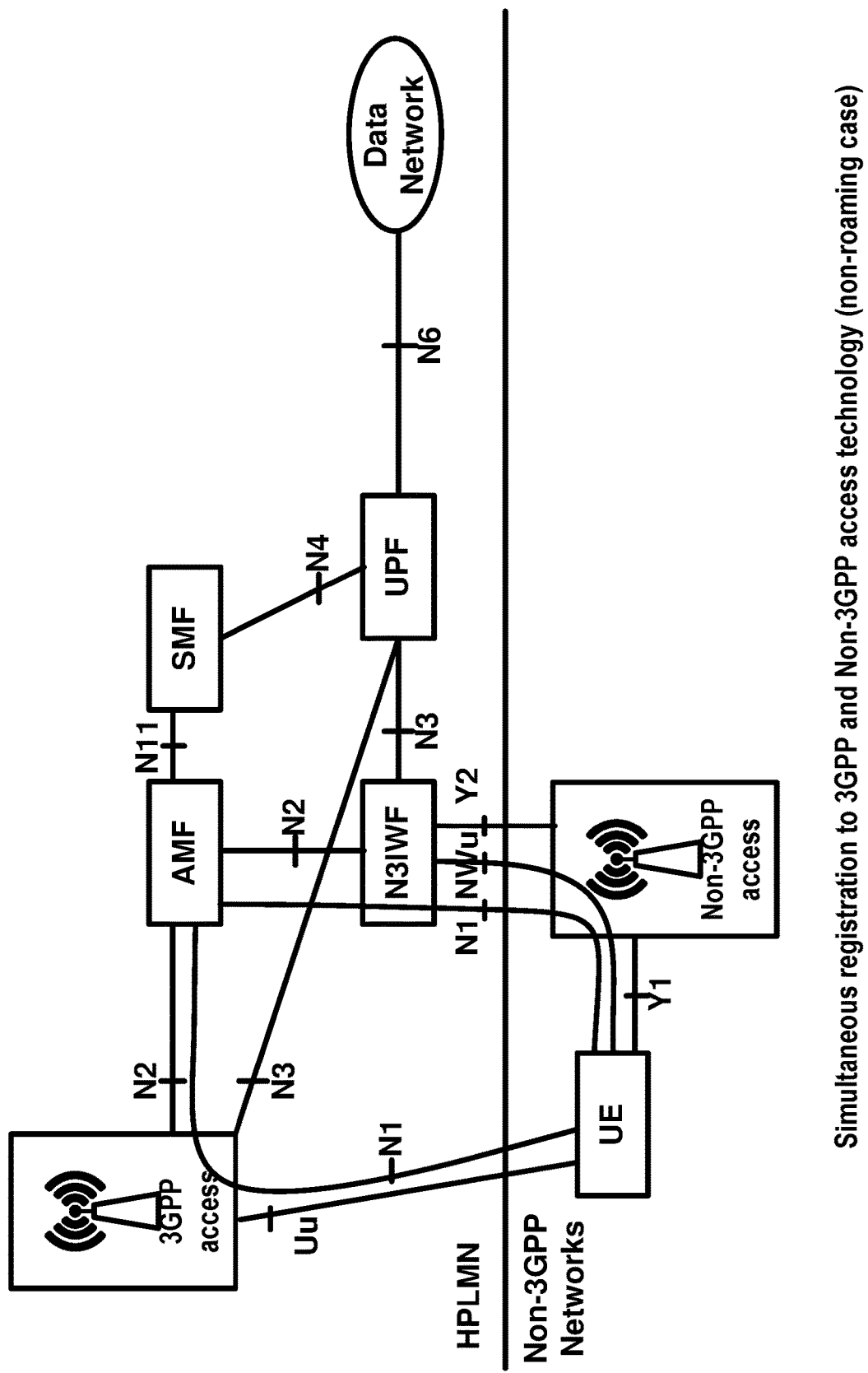
FIG. 17 is a diagram of an example 5G system architecture for 3GPP and non-3GPP simultaneous access as per an aspect of an embodiment of the present disclosure.

As depicted in FIG. 17, a 5G Core Network may support connectivity to the UE via the non-3GPP access network. The 5G Core Network may include, for example, an AMF, SMF, UPF, and a Non-3GPP InterWorking Function (N3IWF) as shown in FIG. 17. In an example, the non-3GPP access network may connect to the 5G Core Network via N3IWF. In an example, the interface between N3IWF and the 5G Core Network CP (e.g. AMF) may be an N2 interface. In an example, the interface between N3IWF and the 5G Core UP functions (e.g. UPF) may be one or more N3 interfaces. The 5G Core network may use the N2 and N3 reference points to connect non-3GPP access networks. In an example, a UE that accesses the 5G Core Network via a non-3GPP access network may send NAS signaling with 5G Core Network CP functions using the N1 reference point.

In an example, a UE may be connected via a NG-RAN (e.g. 3GPP access) to AMF and via a non-3GPP access network to AMF. In an example, two N1 instances may exist for the UE. There may be one N1 instance between the NG-RAN and the UE, and one N1 instance between the non-3GPP access and the UE.

In an example, a UE having a connection to the same 5G Core Network of a PLMN over a 3GPP access network and a non-3GPP access network may register via a single AMF.

In an example, a Y1 reference point may be used as an interface between a UE and the non-3GPP access network. In an example, a Y2 reference point between the non-3GPP access network and the N3IWF may be used for the transport of NWu traffic. In an example, an NWu reference point may be used between the UE and N3IWF for establishing a secure tunnel between the UE and N3IWF.

Figure 18:
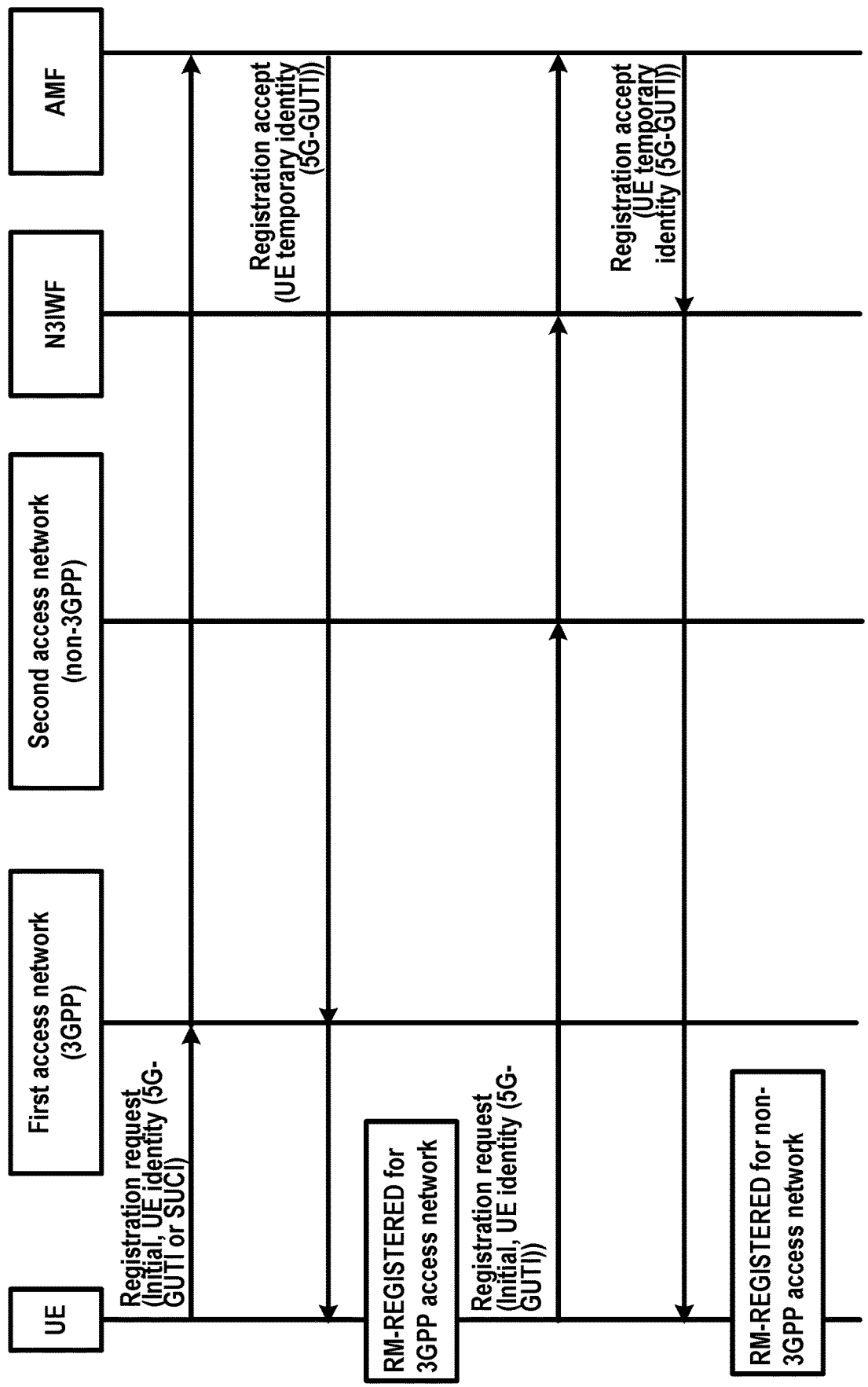
FIG. 18 is an example call flow illustrates a registration via 3GPP and non-3GPP toward same AMF simultaneously.

Referring now to FIG. 18, a registration call flow for registration via a first access network (e.g., a 3GPP access network) and via a second access network (e.g., a non-3GPP access network) to a same AMF is illustrated in accordance with embodiments of the present disclosure. As shown in FIG. 18, a UE may send a registration request message to an AMF via a first access network. The UE may include a UE identity (e.g. a 5G globally unique temporary identifier (GUTI) and/or a subscription concealed identifier (SUCI)) for the initial registration via the first access network. The AMF may accept the registration request by sending a registration accept message to the UE via the first access network. The registration accept message may comprise a UE temporary identity (e.g. a 5G-GUTI). After the registration message exchange, the UE may be in RM-REGISTERED state for the first access network. The UE may register the same AMF via the second access network by sending a registration request message comprising a UE identity. In an example, the UE may use the 5G-GUTI assigned by the AMF during the registration with the first access network to route to the same AMF.

Figure 19:
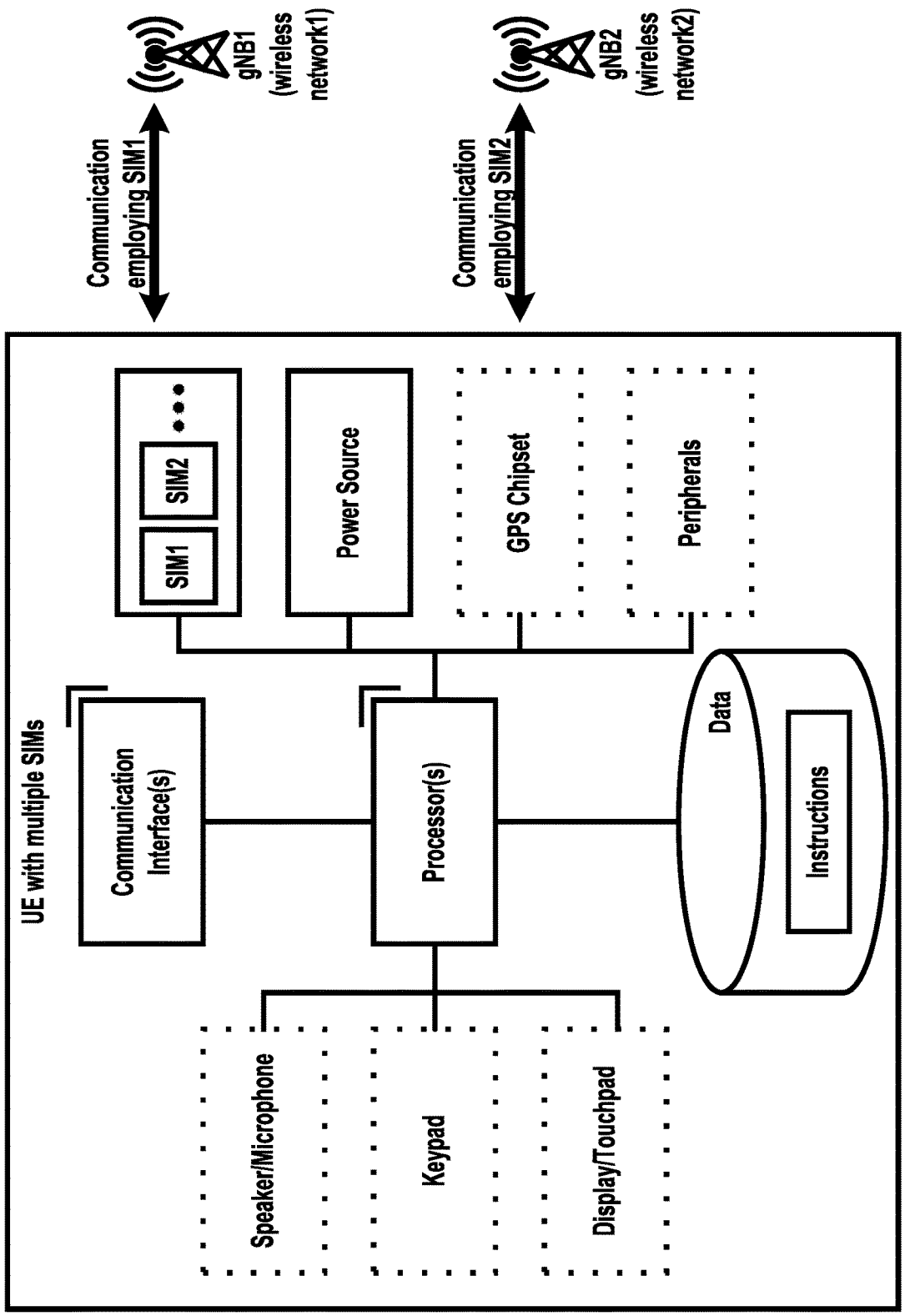
FIG. 19 is a diagram of an example multi-subscriber identity module (SIM) device architecture.

In an example, a UE may employ more than one subscriber identity module (SIM) as depicted in FIG. 19. The UE may further comprise communication interface(s), a speaker/microphone, a keypad, a display/touchpad, processor(s), a data base, a power source, a global positioning system (GPS) chipset, peripherals and/or the like. In an example, the UE may further comprise a single transmitter and one or more receivers. In an example, the UE may be a dual-SIM dual-standby (DSDS) UE. In an example DSDS UE may be dual-SIM UE. The UE may register to different PLMNs simultaneously and may be prepared to place and receive voice calls on both PLMN.

As depicted in FIG. 19, the UE may attempt to receive paging message from wireless network 2 employing SIM 2, during the time period of the UE is in connected state to wireless network 1 employing SIM 1. The UE may create gaps on the active connection with wireless network 1 in order to listen to paging message of the other connection, the wireless network 2. In an example, the UE may not be reachable/available by the wireless network 1 during the time period of the gap.

Figure 20:
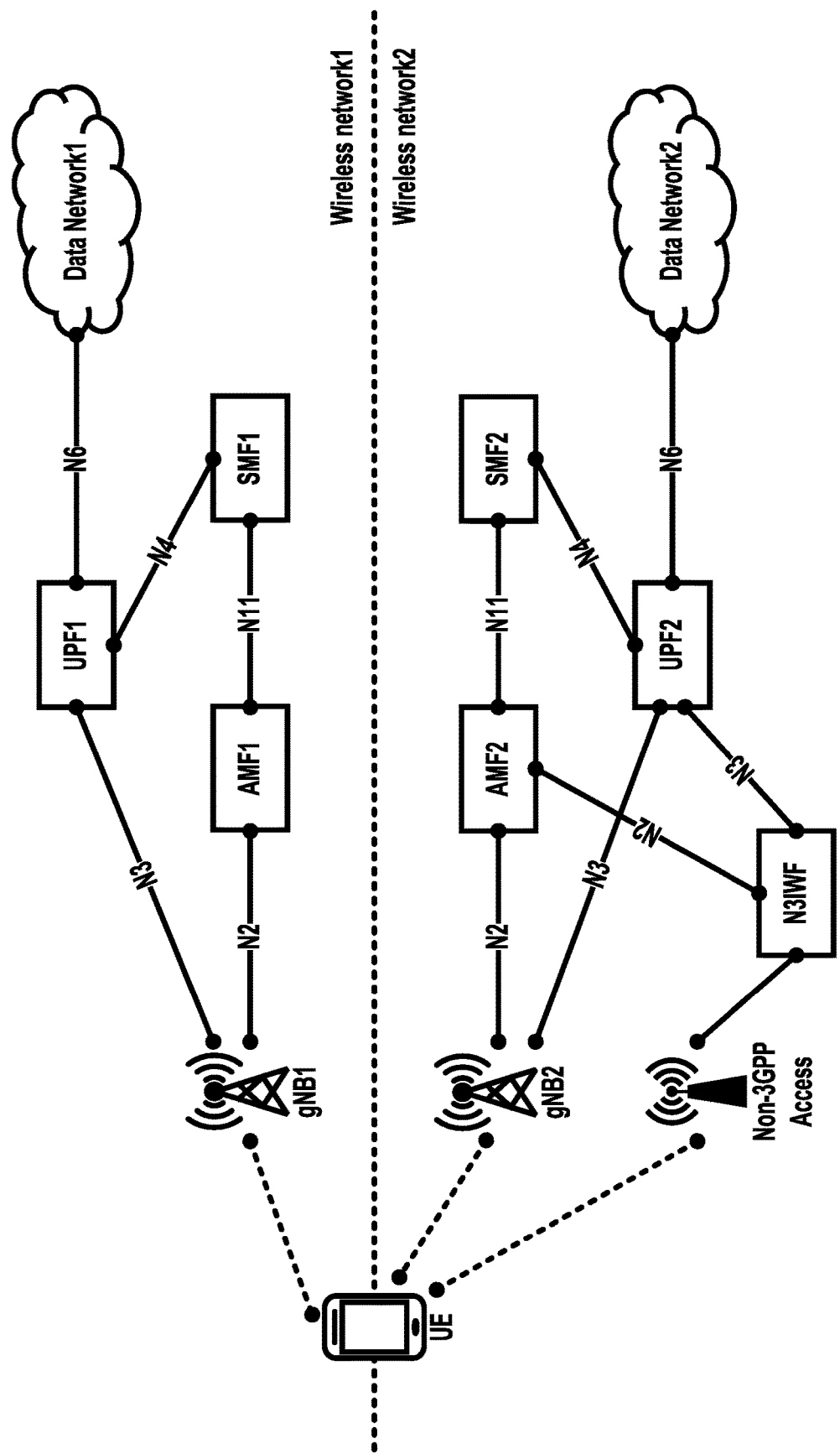
FIG. 20 is a diagram of an example 5G system architecture for dual-SIM device.
Figure 21:
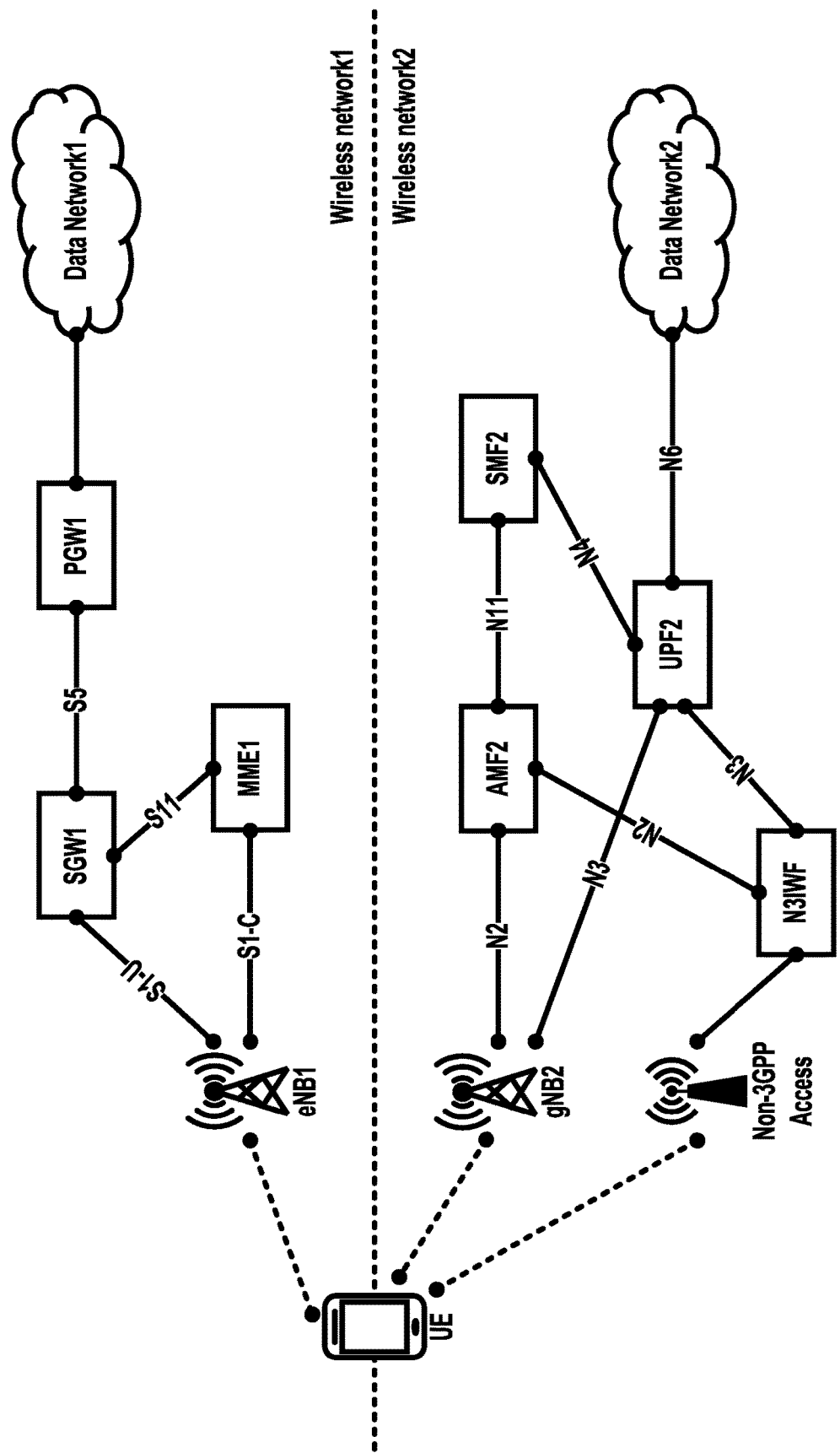
FIG. 21 is a diagram of an example 4G and 5G network architecture for dual-SIM device.

FIG. 20 and FIG. 21 illustrates an example architecture with a dual-SIM UE and two wireless networks. In an example, FIG. 20 illustrates the case that both wireless network/PLMNs employing 5G system and FIG. 21 illustrates the case that one wireless network/PLMN employs 4G network and the other data network/PLMN employs 5G network.

As depicted in FIG. 20 and FIG. 21, the UE may simultaneously communicate via a non-3GPP access of the wireless network 2 during a time period of that the UE actively communicate via 3GPP access of wireless network 1. In an example, the dual-SIM UE employing single transmission for 3GPP access may simultaneously activate non-3GPP transmission.

The explanation for the present disclosure is specifically for 5G system and network function. However, same functionality may be applicable for 4G system and network function. In an example, the functionality of AMF may be employed by an MME and a S-GW in 4G network.

In an example, 5G core network may employ 5G access technology (e.g. new radio) and enhanced 4G access technology (e.g. EUTRA/LTE). In an example, the base station supporting 4G access technology may be enhanced to support N2/N3 interface for 5G core network.

In an example, the 5G/4G system may support an AMF/MME/S-GW and/or a base station to apply different paging strategies for different types of traffic based on operator configuration. For a UE in CM-IDLE state, the different paging strategies may be configured in the AMF for different combinations of DNN, a paging policy indicator (PPI), ARP, 5QI and/or the like. For a UE in CM-CONNECTED/RRC-INACTIVE state, the different paging strategies may be configured in the base station for different combinations of the PPI, ARP and 5QI.

In an example, the paging strategies may comprise a paging retransmission scheme, determining whether to send the paging message to the base station during certain AMF high load conditions, whether to apply sub-area-based paging and/or the like. In an example, the paging retransmission scheme may be how frequently the paging is repeated or with what time interval. In an example, the paging retransmission scheme may be a maximum number of paging retransmission trial for the case when there is no answering from a UE. In an example, the sub-area-based paging is that first paging in the last known cell-id or tracking area (TA) and retransmission in all registered TAs.

In an example, the AMF may apply different paging strategies for IMS DNN and internet DNN for same UE. In an example, the AMF may send paging message to whole tracking areas of a UE for the first paging transmission in response to the paging being for IMS DNN. Meanwhile, the AMF may send paging message to the last known cell of the UE for the first paging transmission in response to the paging being for internet DNN. The different paging strategy may address different connection setup time and connection success rate. In an example, the AMF may not perform paging retransmission for a specific DNN to save paging resources of the system.

In the case of UE in CM-IDLE state, the AMF may perform paging and determine the paging strategy based on e.g. local configuration, a type of a network node that triggered the paging, information available in the request (e.g. a data notification message) that triggered the paging, and/or the like. In the case of UE in CM-CONNECTED/RRC-INACTIVE state, the base station may perform paging procedure and determine the paging strategy based on e.g. local configuration, and information received from the AMF or the SMF.

Figure 22:
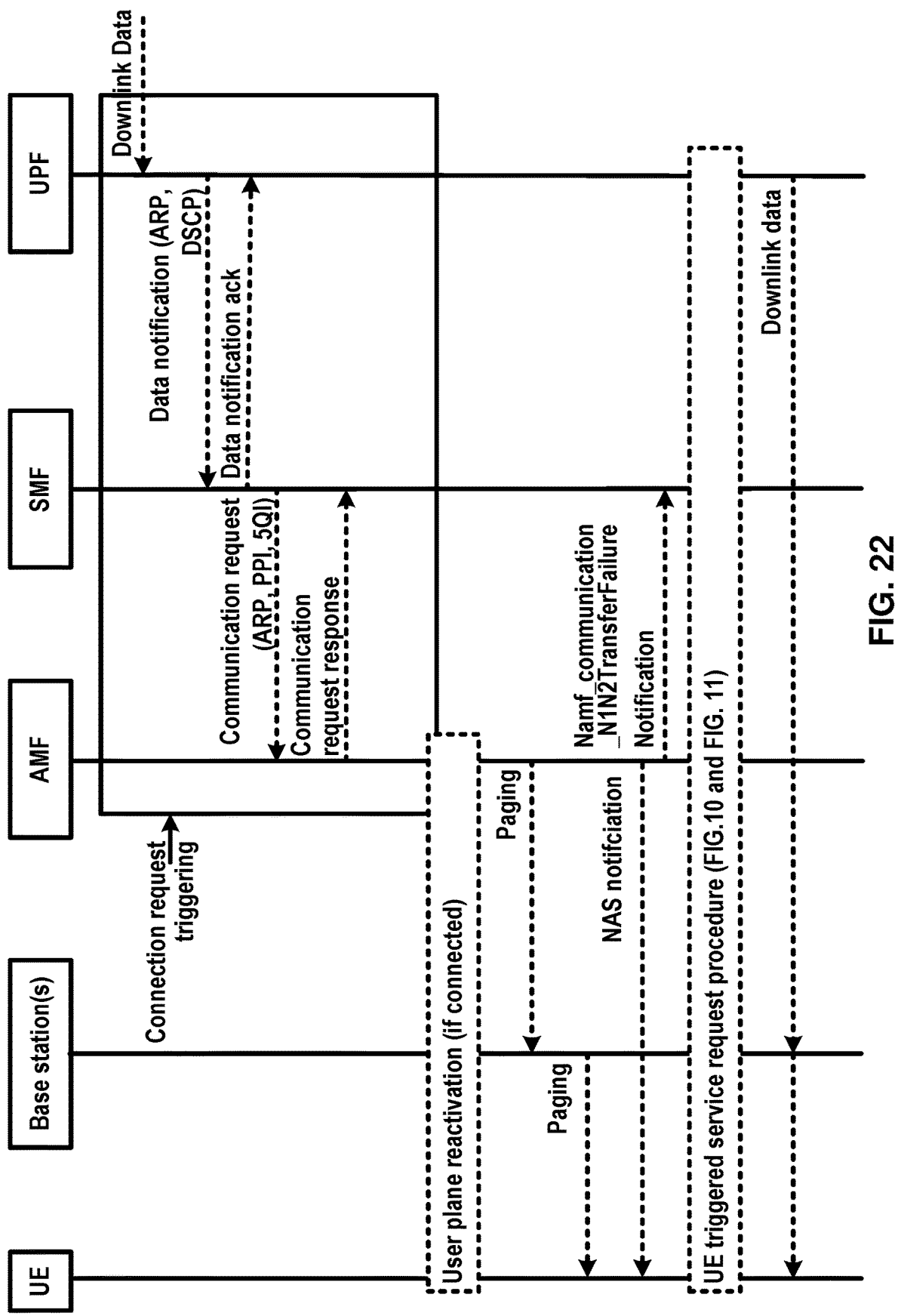
FIG. 22 is an example call flows of network triggered service request procedure.

In the case of network triggered service request from SMF, as depicted in FIG. 22, the SMF may determine the 5QI and ARP based on the downlink data or the data notification of the downlink data received from UPF. In an example, the SMF may include the 5QI and ARP corresponding to the received downlink data in the request (e.g. communication request) sent to the AMF. If the UE is in CM IDLE, the AMF uses e.g. the 5QI and ARP to derive different paging strategies for the paging procedure.

Paging Policy Differentiation

Paging policy differentiation (PPD) feature may allow the AMF, based on operator configuration, to apply different paging strategies for different traffic or service types provided within the same PDU Session. In an example, the paging policy differentiation may apply to PDU Session of IP type. When the 5GS supports the PPD feature, a DSCP value (TOS in IPV4/TC in IPV6) of a user IP packet is set by the application server to indicate to the 5G system which paging policy should be applied for a certain IP packet. The differentiated service code point (DSCP) is a packet header value that can be used to request high priority or best effort delivery for traffic.

Figure 23:
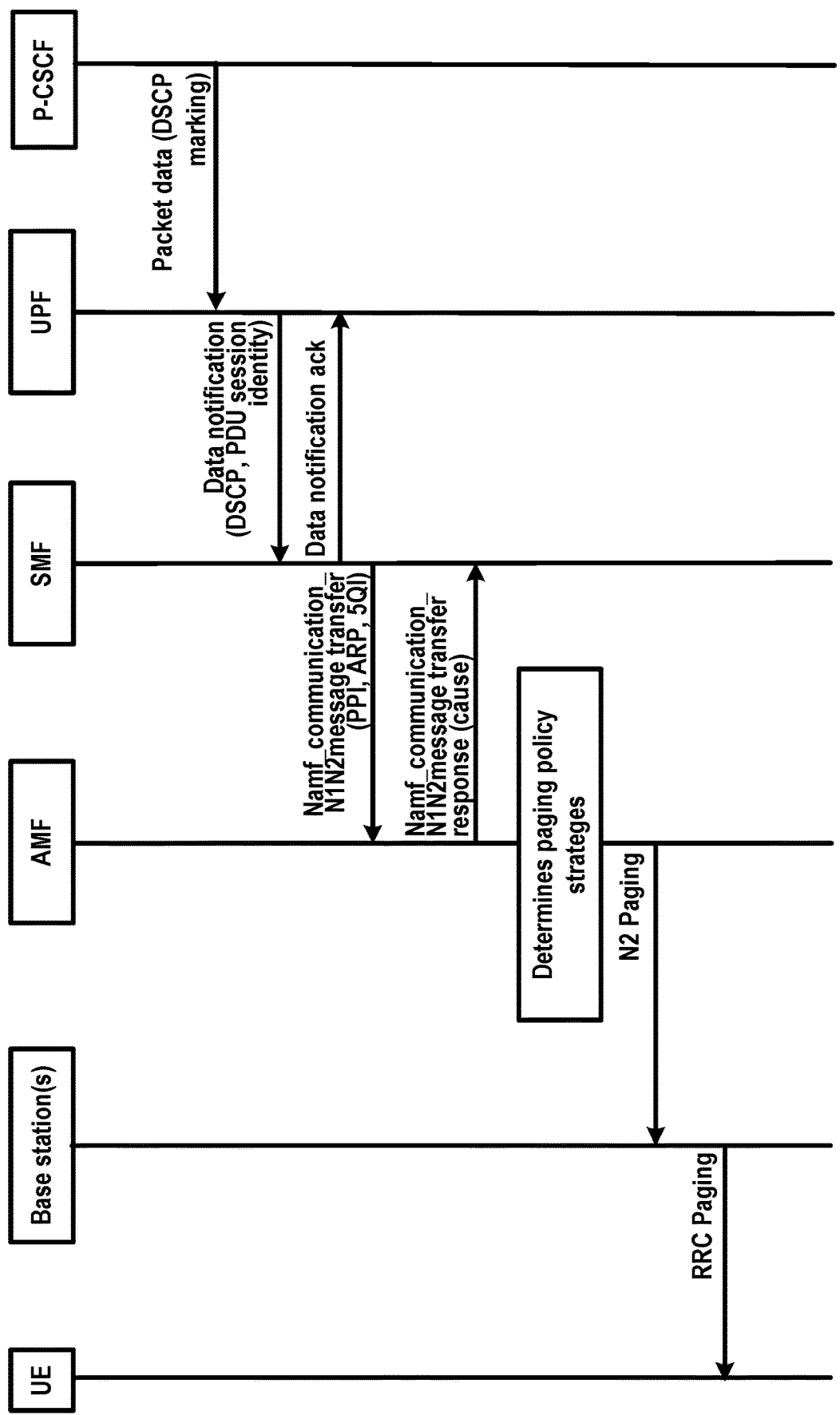
FIG. 23 is an example call flows of paging procedure in idle state by core network.

As shown in FIG. 23, the application server may be an IP multimedia subsystem proxy server (e.g. P-CSCF) and the P-CSCF may support PPD feature by marking packet(s) using the DSCP to be sent towards the UE that relate to a specific IMS services. In an example, the specific IMS service may indicate at least one of an IMS voice, IMS video, IMS SMS, IMS signaling, the other PS service and/or the like. The UPF may include the DSCP in TOS (IPv4)/TC (IPv6) value from the IP header of the downlink data packet from the application server and an indication of the corresponding QoS flow in the data notification message sent to the SMF. The SMF may determine the paging policy indicator (PPI) based on the DSCP in the data notification message received from the UPF. In an example, the SMF may include the PPI, the ARP and the 5QI of the corresponding QoS Flow in the N11 message sent to the AMF. If the UE is in CM-IDLE state, the AMF uses this information to derive a paging strategy and sends paging messages to a base station. In an example, AMF may apply different paging strategies for IMS voice and IMS SMS.

Figure 24:
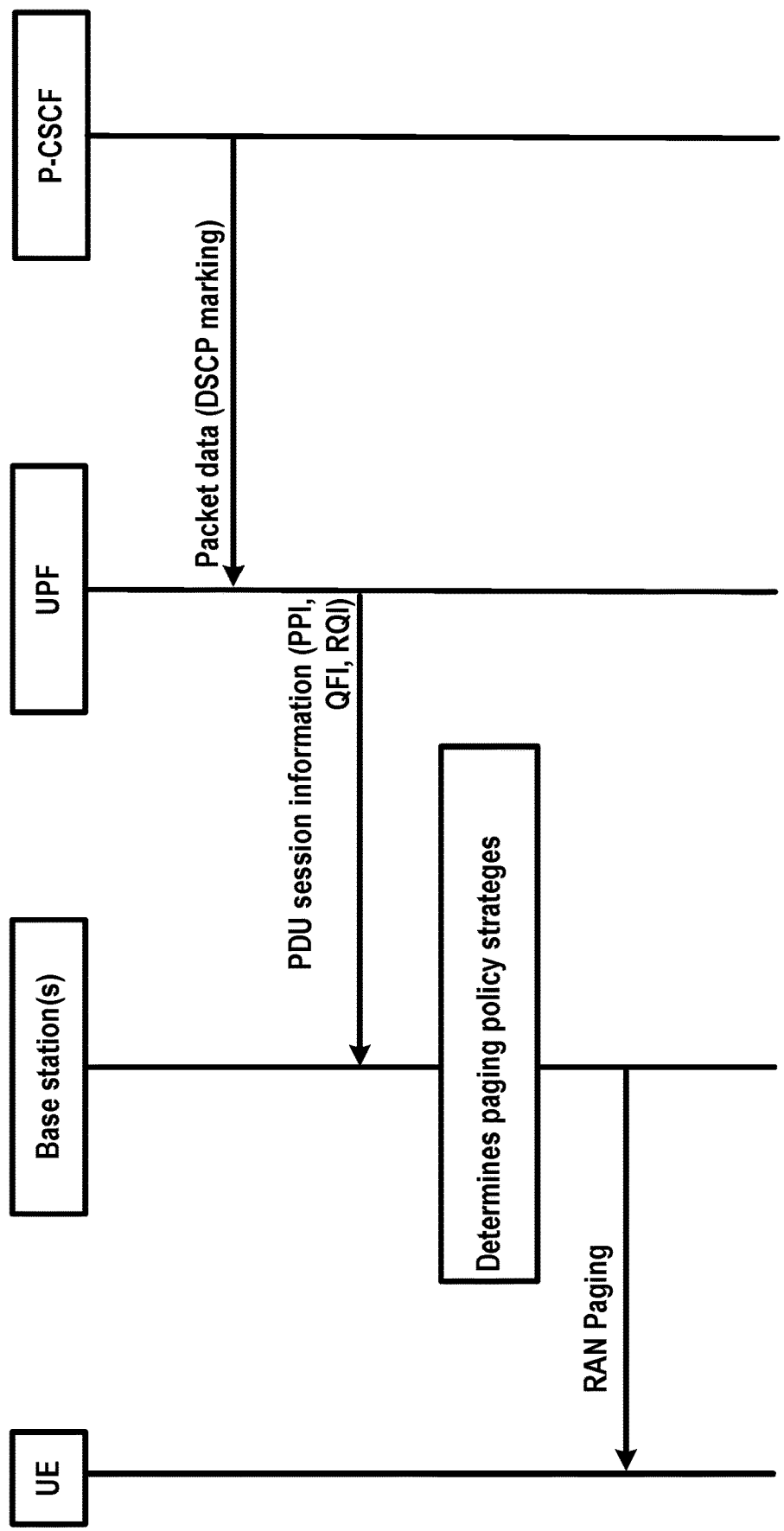
FIG. 24 is an example call flows of paging procedure in connection mode (RRC-INACTIVE) by radio access network.
Figures 25A, 25B:
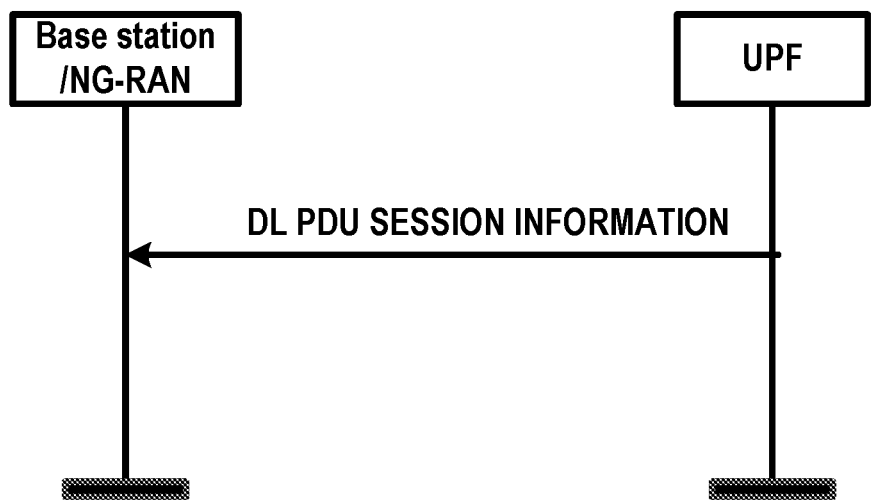
FIG. 25A is an example call flows of downlink packet data unit (PDU) session information transfer.
FIG. 25B is an example format of downlink PDU session information.

In an example, for a UE in CM-CONNECTED/RRC-INACTIVE state, the base station may enforce specific paging policies for RAN paging, based on 5QI, ARP and PPI associated with an incoming DL PDU as depicted in FIG. 24. To enable this, the SMF may instruct the UPF to detect the DSCP in the TOS (IPv4)/TC (IPv6) value in the IP header of the DL PDU (by using a downlink packet detection rule (DL PDR) with the DSCP for this traffic) and to transfer the corresponding PPI in the core network (CN) tunnel header (by using a forward action rule (FAR) with the PPI value). FIG. 25A illustrates an example call flow of downlink (DL) PDU session information transfer from s UPF and s base station. In an example, the transfer of DL PDU session information procedure may be used to send control information elements related to the PDU session from a UPF to a base station (NG-RAN). In an example, the transfer of DL PDU session information procedure may be invoked whenever packets for that PDU Session need to be transferred across the related interface instance. The base station may utilize the PPI received in the CN tunnel header of an incoming DL PDU in order to apply the corresponding paging policy for the case the UE needs to be paged when in RRC-INACTIVE state. FIG. 25B depicts an example frame format of DL PDU session information. In an example, the DL PDU session information frame may include a QoS flow identifier (QFI) field associated with the transferred packet. In an example, the base station may use the received QFI to determine the QoS flow and QoS profile which are associated with the received packet. The DL PDU session information frame may include the reflective QoS indicator (RQI) field to indicate that user plane reflective QoS shall be activated or not. The DL PDU session information frame may include a paging policy indicator (PPI) field associated with the transferred packet. The base station may use the received PPI to determine the paging policy differentiation which is associated with the received packet.

FIG. 22 illustrates an example call flow of a network triggered service request procedure. The network triggered service request may be used by a network when the network needs to signal (e.g. N1 signaling to UE, Mobile-terminated SMS, User Plane connection activation for PDU Session(s) to deliver mobile terminating user data) with a UE. When the procedure is triggered by SMSF, PCF, NEF or UDM, the SMF in the FIG. 22 may be replaced by the respective network function. If the UE is in CM-IDLE state or CM-CONNECTED state in 3GPP access, the network may initiate the network triggered service request procedure. If the UE is in CM-IDLE state, and asynchronous type communication is not activated, the network triggered service request procedure may trigger paging procedure (i.e. the AMF send a paging request message to the UE via a base station). In an example, the paging request message may be paging message. In an example, the paging procedure may trigger the UE triggered service request procedure in UE as depicted in FIG. 10 and FIG. 11. If the asynchronous type communication is activated, the network may store the received message and forward the message to the base station and/or the UE when the UE enters CM-CONNECTED state.

If the UE is in CM-IDLE state in 3GPP access and in CM-CONNECTED state in non-3GPP access, and if the UE is simultaneously registered over 3GPP and non-3GPP accesses in the same PLMN, the network may initiate a network triggered service request procedure for 3GPP access via non-3GPP access by sending notification message.

In an example, the SMF may need to setup N3 tunnel (i.e. tunnel between the UPF and the base station) to deliver downlink packet to the UE for a PDU Session and the UE is in CM-IDLE state. In an example, the SMF may send a communication request message (e.g. Namf_communication_N1N2message transfer) to AMF so the AMF may perform paging procedure.

In an example, a network function (e.g. SMF, SMSF, PCF or NEF) may need to send an N1 message to the UE. In this case, the NF may use the Namf_communication_N1N2message transfer service operation (e.g. sending Namf_communication_N1N2message transfer). In the UE is in CM-IDLE state, the AMF may respond to the NF by sending a communication request response message (Namf_communication_N1N2transfer response message), the communication request response message may comprise cause "Attempting to reach UE" and the AMF may perform paging procedure. In an example, N1 message may be non-access stratum message. In an example, the N1 message may be a control signaling message by the network function for a UE, for example PDU session modification command message.

In existing wireless technologies, a UE may monitor two different paging messages from two different systems simultaneously. For example, a dual subscriber identity module (SIM) dual standby (DSDS) UE may monitor two different paging messages from two different subscribed public land mobile networks (PLMNs). Adding a paging cause value in a paging message may help the DSDS UE selectively respond to a terminating service. In an example, a paging cause value (or more simply a paging cause) in a paging message may help the DSDS UE selectively ignore a less important terminating service compared to other terminating services. In an example, a UE may be actively communicating with a first PLMN (PLMN1) and may want to respond to paging message for an IMS voice service from a second PLMN (PLMN 2). In another example, the UE may be actively communicating with PLMN1 and may not want to respond to paging message for a non-IMS terminating service.

In the existing wireless technologies described above, paging resources may be wasted on both the RAN and core network side. For example, the existing wireless technologies may include a paging cause in every paging message for a UE even though the UE does not need the paging cause. This may result in a waste of paging resources. In addition, the existing technologies may retransmit a paging message from the network without knowing the potential for the UE to ignore the paging message. This may also result in a waste of paging resources.

In an embodiment of the present disclosure, a UE may determine whether a paging cause value (or a paging cause) needs to be included in a paging message. Based on the determination, the UE may send a request to an AMF to provide a paging cause value in the paging message. If the AMF accepts the request, the AMF may add one or more paging cause values in a paging message for the UE. In another embodiment of the present disclosure, the paging cause request procedure and the paging cause addition procedure described above may be extended to RAN paging. In an example, the AMF may not comprise a paging cause value in a paging message. This may be based on the AMF rejecting the request from the UE, based on the UE not sending the request, or sending the request for not including the paging cause value in the paging message. Embodiments of the present disclosure may increase paging resource efficiency of RAN paging and core network paging by providing a paging cause value in a paging message to a UE based on, for example, a need of the UE. Embodiments of the present disclosure may alternatively or additionally increase paging resource efficiency by controlling paging message retransmissions based on UE behavior (e.g., whether the UE will ignore the paging messages).

Figure 27:
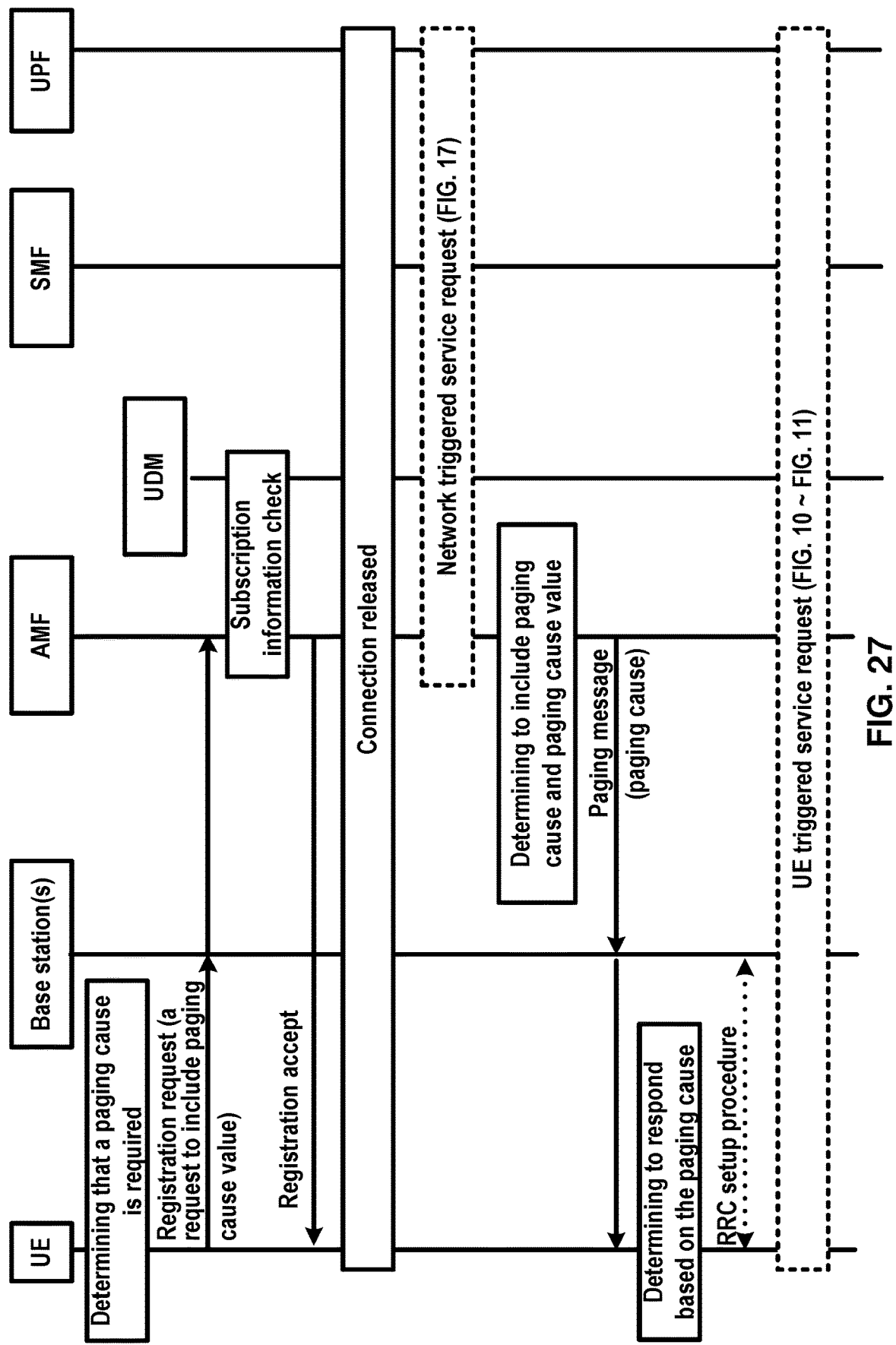
FIG. 27 illustrates an example embodiment of a present disclosure.

FIG. 27 illustrates an example call flow for a paging cause value request procedure and paging cause determination procedure in accordance with embodiments of the present disclosure. As shown in FIG. 27, a UE may determine whether a paging cause parameter/value/indication may be required. In an example, the determination may be based on a device type (e.g. dual-SIM UE, multi-SIM UE), roaming status of the UE (a UE registers visited PLMN or home PLMN), an indication from network that the network support dual-SIM UE optimization, and/or the like. In an example, the UE may be a multi-SIM device. The multi-SIM device may comprise more than one SIM. In an example, the UE may be dual-SIM device. A dual-SIM device may comprise two/dual SIMs. In an example, the UE may be previously registered with a first PLMN (PLMN A). In an example, PLMN A may be primary PLMN. The UE may register with a second PLMN (PLMN B). In an example, PLMN B may be a secondary PLMN. In another example, PLMN B may be a primary PLMN. In an example, the UE may request, during registration with PLMN B, that paging cause values be included in paging messages to the UE. The UE may send a registration request message, via a base station to the AMF of the PLMN B, requesting the registration with PLMN B. The registration request message may comprise a request to include paging cause values for the paging messages to the UE, a UE identity (e.g., SUCI, 5G-GUTI), the location of the UE (e.g., last visited TAI), requested NSSAI, UE mobility management context information, PDU session state, information for the MICO mode usage, and/or the like. In an example, the UE may include a dual-SIM UE capability in the registration request message instead of the request to include paging cause values for the paging messages. In an example, the AMF may interpret the dual-SIM UE capability as the same as the request to include paging cause values for the paging messages.

In an example, the UE may request to include a paging cause value if the UE is registered in a visited PLMN and try/attempt to reselect and/or register with a home PLMN.

In an example, the AMF may determine whether to include the paging cause value in the paging message to the UE based on one or more of the request to include a paging cause values, a local policy of the AMF, subscription information of the UE in a UDM, an overload condition of the system, a dual-SIM UE capability, and/or the like. In an example, the AMF may not include a paging cause value if the local policy of the AMF does not allow it. In an example, the AMF may not include a paging cause value if the subscription information of the UE does not indicate/allow that the paging cause value is to be included in paging messages to the UE. In an example, the AMF may not include a paging cause value if an overload/congestion condition does not allow it. In an example, the AMF may detect an overload/congestion of paging resource usage. The AMF may not allow a UE selective paging response based on a paging cause value.

In an example, the AMF may send a notification message via non-3GPP access (if the UE is CM-CONNECTED for non-3GPP access) instead of paging message via 3GPP access for the UE in response to receiving and accepting the request to include paging cause values. In an example, the AMF may send a notification message instead of paging message for a UE in CM-CONNECTED for non-3GPP access.

In an example, the AMF may send a registration accept message to the UE indicating a successful registration. In an example, the registration accept message may comprise 5G-GUTI, registration area, a periodic registration area update time value, a MICO mode indication, and/or the like. In an example, the registration accept message may further comprise a result of the request (e.g., whether the AMF accepts the inclusion of paging cause values for paging messages to the UE).

In an example, the AMF and a base station may determine a connection release for a 3GPP access with the UE. In an example, the determination of the connection release with the UE may be based on UE inactivity detection for a period of time (e.g., when there is no transmission from or reception by the UE in 10 seconds).

In an example, a network triggered service request, as depicted in FIG. 22 and FIG. 23, may be performed between the AMF and the network functions for a UE in CM-IDLE (for 3GPP access) state.

In an example, the network triggered service request may be triggered by a UPF in response to receiving downlink data. In an example, the network triggered service request may be triggered by one or more network functions (e.g., NEF, SMSF, PCF, and/or the like) to request delivery of control signaling to the UE. In an example, the PCF may request the network triggered service request due to change of a UE policy. In an example, the network triggered service request may be triggered by the AMF, due to a change of UE configuration (e.g., configuration for access and mobility management, MICO disabling, slice information update, and/or the like).

In an example, the UPF may receive downlink data for a PDU session and there is no AN Tunnel info stored in the UPF for the PDU Session. In an example, the UPF may send a data notification message to a SMF in response to receiving the downlink data, requesting a user plane connection setup for the PDU session with the UE. In an example, the data notification message may comprise N4 session identity, a differentiated service code point (DSCP) value (TOS in IPV4/TC in IPV6), information to identify the QoS flow for the DL data packet, and/or the like. In an example, the N4 session identity may be used by the SMF to identify a PDU session. In an example, the SMF may derive allocation retention priority (ARP) and 5QI based on the information to identify the QoS flow for the DL data packet. The SMF may derive paging policy indicator (PPI) based on the DSCP value. In an example, if a paging policy differentiation (PPD) is supported by the UPF and the IP multimedia system (IMS), a DSCP (TOS in IPv4/TC in IPV6) may be set by the application server (e.g. P-CSCF) to indicate to the 5G system which paging policy should be applied for a certain IP packet by marking packet(s) using the DSCP to be sent toward the UE that relate to a specific IMS service. In an example, the specific IMS service may indicate at least one of an IMS voice, IMS video, IMS SMS, IMS signaling, other PS service and/or the like. In an example, the SMF may send a data notification ack message to the UPF, in response to receiving the data notification message. In an example, the SMF may send a communication request message to the AMF in response to receiving the downlink data notification from the UPF, requesting a communication setup with the UE. The communication request message may be a Namf_Communication_N1N2MessageTransfer. In an example, the communication request message may comprise UE identity, PDU session identity, session management container, QFI, QoS profile, 5QI, ARP, PPI, N1 message and/or the like. In an example, the UE is in CM-IDLE state at the AMF. If the AMF is able to page the UE, the AMF may send a communication request response message to the SMF immediately with a cause "Attempting to reach UE", responding to the communication request message.

If the AMF accepts to include the paging cause value for the UE in previous step in FIG. 27 and the UE is in CM-IDLE state in AMF, the AMF may determine a paging cause value for a paging message of the UE. In an example, the determination of the paging cause value may be based on at least one of the PPI, 5QI, a network node/function triggered the paging procedure, a paging resource load condition of the system, and/or the like.

In an example, the paging cause value may indicate at least one of a non-access stratum (NAS) signaling for mobility management, a NAS signaling for slice change, a UE context/configuration update, a UE policy update, an indication requesting a registration, an IMS voice, an IMS video, an IMS SMS, an IMS signaling, other IMS, others, and/or the like.

In an example, the network node triggering the paging procedure may be the UPF and PPI is present in the communication request message from the SMF. The AMF may determine the paging cause value based on the PPI.

In an example, the network node triggering the paging procedure may be the UPF and PPI is not present (the network does not support PPD feature) in the communication request message from the SMF. The AMF may determine the paging cause value based on 5QI and session information. For example, if the 5QI value indicates 5 (i.e., IMS signaling), the AMF may determine the paging cause as IMS service. If the 5QI indicates other than 5, the AMF may determine the paging cause as non-IMS service.

In an example, the network node triggering the paging procedure may be the PCF. The AMF may determine the paging cause value as 'a UE policy update'.

In an example, the network node triggering the paging procedure may be the AMF. The AMF may determine the paging cause value based on the message contents. If the AMF triggers the paging procedure to update slice information, the AMF may indicate the paging cause value as a NAS signaling for slice change. If the AMF triggers the paging procedure to update UE configuration, the AMF may indicate the paging cause value as a NAS signaling for UE configuration update.

In an example, the AMF may send a paging message to the UE via base station(s). The paging message may comprise the paging cause value, UE identity, an access type, and/or the like. In an example, the UE identity may indicate 5G S-TMSI. In an example, the access type may indicate a third-generation partnership project (3GPP) access technology. In an example, the paging message may not comprise the paging cause value for UEs that did not request the paging cause value, or the request is not accepting by the AMF. This procedure enhances paging resource efficiency by not sending the paging cause value for some UEs.

In an example, the UE may receive a paging message. The UE may determine to send a radio resource control (RRC) message to request a connection setup with the PLMN B in response to receiving the paging message. The determination may be based on the paging cause value, a 3GPP connection status of the UE, a roaming status of the UE and/or the like. In an example, the 3GPP connection status may indicate an active connection with a base station which belongs to PLMN A or the UE in CM-CONNECTED for PLMN A. The roaming status of the UE may indicate whether the UE registers in visited PLMN or home PLMN.

In an example, the UE may send the RRC request message in response to the paging cause value indicating IMS voice. The UE may drop any active communication with PLMN A in order to send the RRC request message and continue the terminating service with PLMN B. In an example, the UE may not send the RRC request message in response to the paging cause value indicating other terminating services (e.g., other than IMS voice). In another example, the UE may not send the RRC request message in response to the paging cause value indicating other terminating services while the UE is actively communicating with PLMN A. However, if the UE is not actively communicating with PLMN A, the UE may send the RRC request message in response to the paging cause value indicating other terminating services.

In an example, the UE may receive an RRC request response message in response to sending the RRC request message. The UE may send an RRC request complete message to the base station. The RRC request complete message may comprise a NAS service request message. By sending the NAS service request message from the UE, the UE triggered service request procedure may be invoked as described above in FIG. 10 and FIG. 11.

In an example, the AMF may retransmit the paging message in response to waiting for a response message (e.g., service request message) and an expiration of a waiting timer. In an example, the AMF may use the request to include a paging cause value for a paging strategy. In an example, the AMF may decrease the number of paging retransmission attempts (or vary the time interval between subsequent paging retransmissions, a time offset, and/or the like) if the UE previously requested to include a paging cause and the AMF included a paging cause value in paging message. In an example, the AMF may consider if the UE does not respond to the paging intentionally. In an example, the AMF may be aware that there is no coverage hole in the registration area of the UE location such that the UE may respond to the paging message. The coverage hole may be an area where a UE cannot receive a signal from the base station. In an example, the AMF may be aware of the potential for the UE to ignore the paging message and not transmit a paging response (e.g. service request) if the paging cause included in the paging message is of a relatively low priority (e.g., the AMF may determine that the UE has ignored the paging message based on a priority associated with the paging cause). In an example, if the AMF is aware that there is no coverage hole and the UE does not respond to the paging message, the AMF may not retransmit the paging message based on, for example, a paging resource usage condition. In an example, the AMF may not retransmit the paging message to the UE if the paging message comprises a paging cause.

Figure 28:
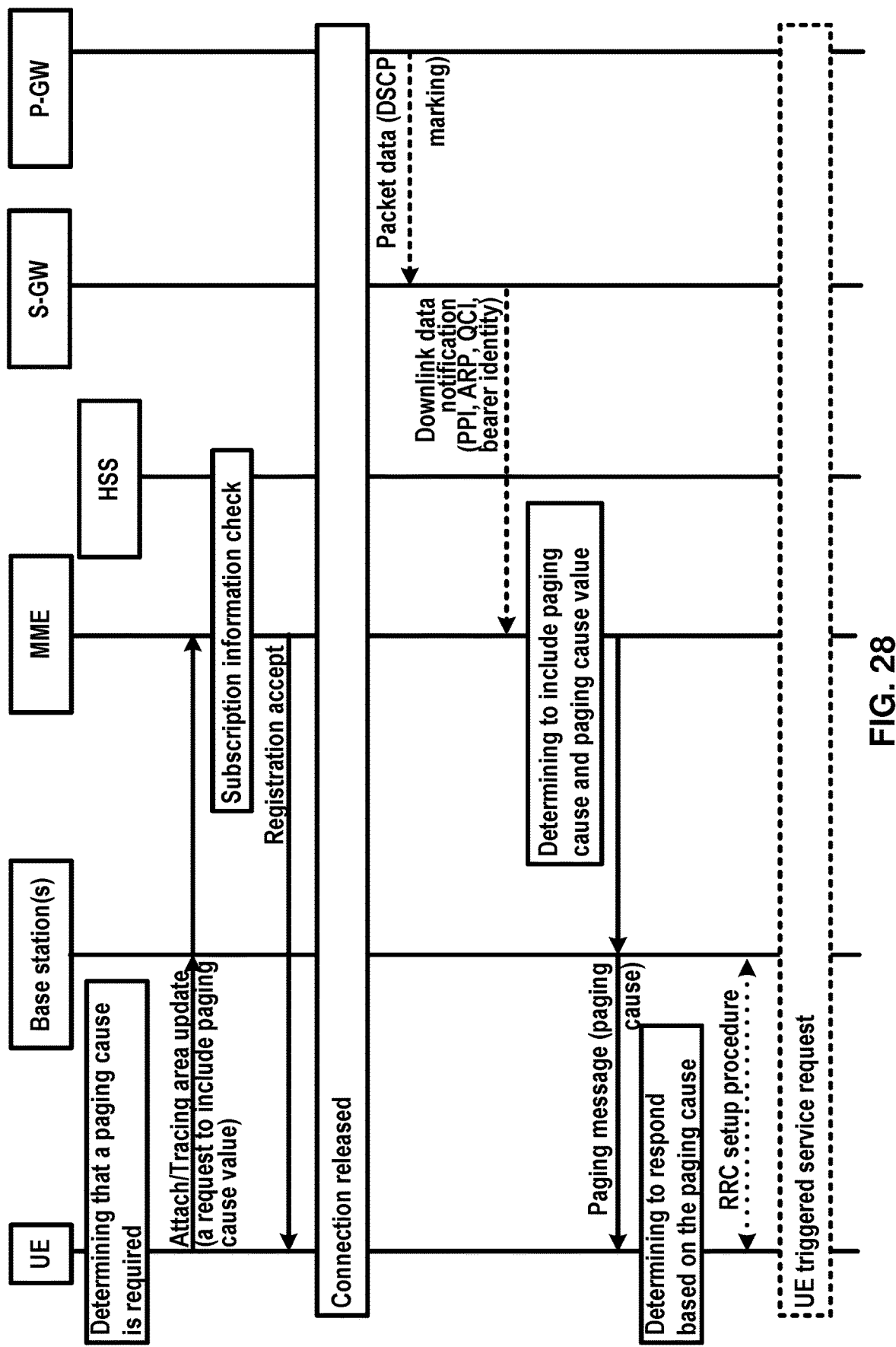
FIG. 28 illustrates an example embodiment of a present disclosure.

FIG. 28 illustrates an example of a paging cause value request procedure and paging cause determination between a UE and an MME regarding 4G system case in accordance with embodiments of the present disclosure. In the example of FIG. 28, compared to the previous example of FIG. 27, the AMF is replaced with the MME and the SMF is replaced with the S-GW.

Figure 29:
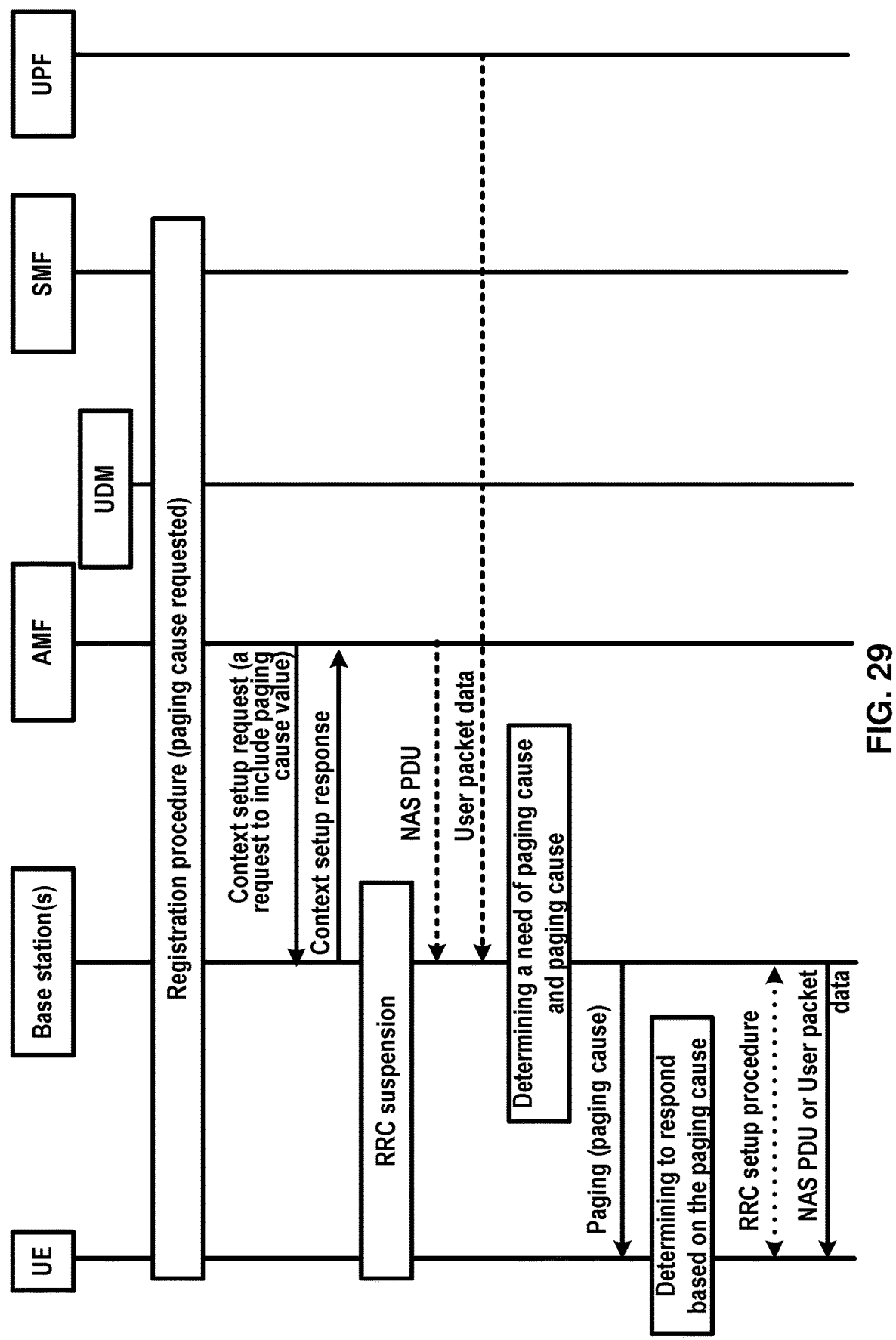
FIG. 29 illustrates an example embodiment of a present disclosure.

FIG. 29 illustrates an example of a paging cause value request procedure and paging cause determination between a UE and a base station for RRC-INACTIVE state regarding 5G system case in accordance with embodiments of the present disclosure. In this example, the UE may previously register different PLMN which does not comprise the base station. The UE and an AMF may negotiate an inclusion of the paging cause values in paging messages during a registration procedure based on a request to include a paging cause value from the UE, a local policy of the AMF, subscription information of the UE in a UDM, an overload condition of the system and/or the like.

In an example, if the AMF determines to include a paging cause for the UE, the AMF may provide corresponding information to the base station during a connection setup procedure so the base station can properly configure the inclusion of paging cause for a RAN paging during RRC-INACTIVE state. In an example, the AMF may send a context setup request message to a base station to request the connection setup for the UE. In an example, the context setup request message may comprise a request to include a paging cause value for the UE. The base station may respond by sending a context setup response message to the AMF in response to receiving the context setup request message.

In an example, the base station may detect an inactivity of the UE for a period of time (e.g., there is no transmission from or reception by the UE in 10 seconds) and determine to suspend an RRC connection with the UE. In an example, the base station may send an RRC release message to the UE in response to the determination. In an example, the RRC release message may comprise suspension/suspend configuration information.

In an example, the suspension/suspend configuration information may comprise a radio network temporary identity (RNTI), a radio access network (RAN) paging cycle, a RAN notification area (RNA) information, a periodic RNA update time value, and/or the like. In an example, the periodic RNA update time value may be 10 minutes. In an example, the RAN notification area information may comprise a list of cells, a PLMN identity, a list of tracking area codes, a list of RAN area code, and/or the like.

In an example, the UE may enter an RRC-INACTIVE state in response to receiving the RRC release message. The UE may monitor paging messages in response to entering the RRC-INACTIVE state. In an example, the UE may perform a RAN notification area update procedure in response to entering a cell which does not belong to the RNA. In an example, the UE may perform the RAN notification area update procedure in response to entering a new RNA. In an example, the base station may determine the periodic RNA update time value based on a periodic registration area update time value. In an example, the periodic RNA update time value (e.g., 30 minutes or 1 hour) may be smaller than the periodic registration area update time value (e.g., 3 hours or 12 hours).

In an example, the base station may receive a user NAS data (e.g. downlink NAS transport) from a AMF for the UE. In an example, the base station may receive a user packet data (e.g. DL PDU session information) from a UPF.

In an example, the user packet data may be downlink PDU session information as described in FIG. 25A. As depicted in FIG. 25B, the downlink PDU session information may comprise RQI, PPI, QOS flow identifier, and/or the like.

Figures 26A, 26B:
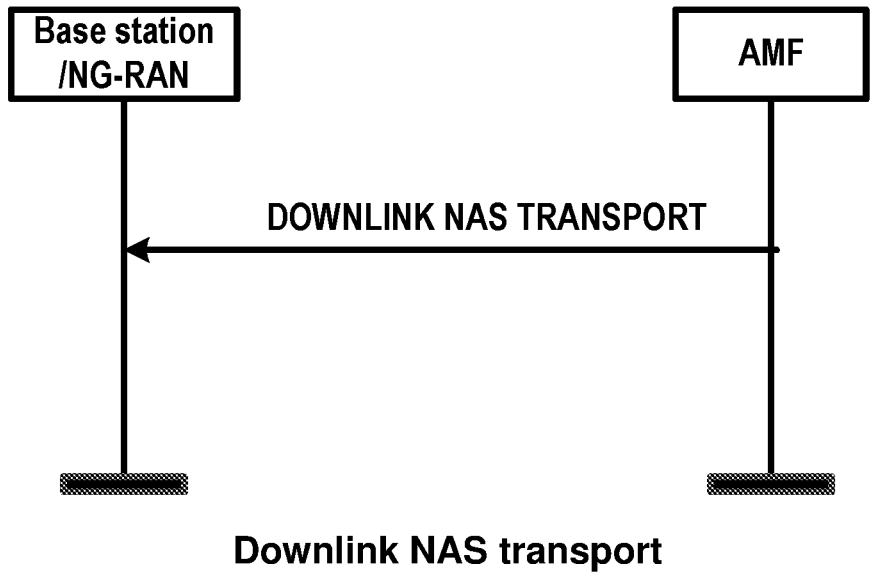
FIG. 26A is an example call flows of downlink NAS transport.
FIG. 26B is an example format of downlink NAS transport.

In an example, the base station may receive a downlink NAS transport message from the AMF, as depicted in FIG. 26A. In an example, the NAS transport message, as depicted in FIG. 26B, may comprise a message type, AMF UE NGAP identity, RAN UE NGAP identity, an old AMF address, a RAN paging priority, a NAS-PDU, a NAS PDU type, allowed NSSAI and/or the like. In an example, the AMF UE NGAP ID may uniquely identify a UE association over the NG interface (e.g. N2 interface) within the AMF side. The RAN UE NGAP ID may uniquely identify a UE association over the NG interface within the NG-RAN side. In an example, the NAS PDU type may indicate at least one of mobility management, UE policy update, UE context/configuration update, an indication requesting a registration, and/or the like.

In an example, the base station may determine the paging cause value based on the information received from the UPF and the AMF. In an example, the information may be the NAS PDU type, the PPI, the QoS flow identifier, and/or the like.

In an example, the base station may send a RAN paging message in response to receiving the downlink PDU session information or the downlink NAS transport message. In an example, the RAN paging message may comprise a paging cause value, UE identity, an access type, and/or the like. In an example, the UE identity may indicate 5G S-TMSI or I-RNTI. In an example, the access type may indicate a third-generation partnership project (3GPP) access technology. The paging cause value may indicate at least one of a non-access stratum (NAS) signaling for mobility management, a NAS signaling for slice change, a UE context/configuration update, a UE policy update, an indication requesting a registration, an IMS voice, an IMS video, an IMS SMS, an IMS signaling, other IMS, others, and/or the like.

In an example, the base station may not send RAN paging message in response to detecting resource congestion and the paging cause being relatively low priority. In an example, the non-IMS paging may be relatively low priority.

In an example, the base station may retransmit the RAN paging message in response to waiting for a response message (e.g. RRC resume request message) and an expiration of a waiting timer. In an example, the base station may use the request to include paging cause value for the paging strategies. In an example, the base station may decrease the number of paging retransmission attempts (or vary the time interval between subsequent paging retransmissions, a time offset, and/or the like) if the UE previously requested to include a paging cause and the base station included paging cause value in RAN paging message.

In an example, the base station may consider if the UE intentionally does not respond to the paging message. In an example, the base station may be aware that there is no coverage hole in the RAN notification area of the UE location such that the UE may respond to the RAN paging message. In an example, the base station may be aware of the potential for the UE to ignore the paging message and not transmit a paging response if the paging cause included in the paging message is of a relatively low priority (e.g., the base station may determine that the UE has ignored the paging message based on a priority associated with the paging cause). In an example, the base station may determine not to retransmit paging message to the UE if the paging message comprises a paging cause and the paging cause is of is relatively low priority.

FIG. 30, FIG. 31, FIG. 32, FIG. 33A and FIG. 33B illustrate examples when a user packet includes a paging cause value instead of a base station determines a paging cause value. This example embodiment shows how to selectively include information such as a paging cause value and a PPI in the downlink PDU session information when this information is used. In an example, the PPI and the paging cause value may be only used when the UE is in RRC-INACTIVE state. In an example, the PPI and the paging cause may not be used by the base station if the UE is in RRC-CONNECTED state.

Figure 30:
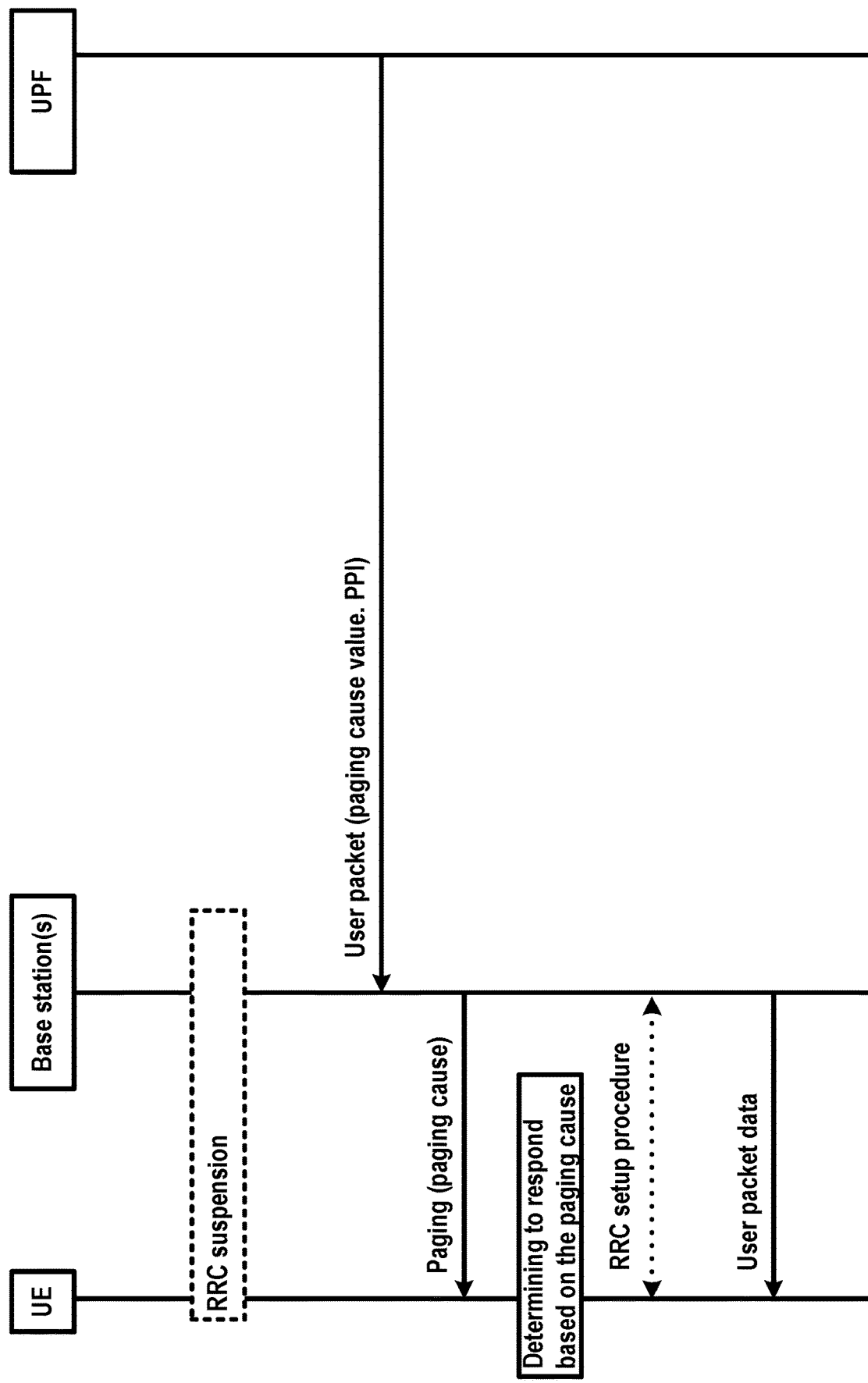
FIG. 30 illustrates an example embodiment of a present disclosure.

FIG. 30 illustrates how a paging cause value and PPI is delivered to a base station in accordance with embodiments of the present disclosure. In an example, the base station may use the paging cause value in the user packet (i.e., downlink PDU session information) and the same paging cause value may be included in a RAN paging message. After the base station sends the paging message, the UE and the base station behavior may be the same as the example embodiment of FIG. 29.

FIG. 31 shows a downlink PDU session information format which further comprises a paging cause value in accordance with embodiments of the present disclosure.

In the existing wireless technologies described above, paging cause values or PPI may be included in packet data unit headers. The paging cause value or PPI may be used for RAN paging by an access network for a wireless device in an RRC inactive state. The paging cause values or PPI may not be used a wireless device in a RRC connected state. A session management function and/or a user plane function may not know whether a wireless device is in the RRC inactive state or RRC connected state. The user plane packet header may include the paging cause values or PPI even though the base station does not require those information. Including the paging cause value or PPI irrespective of RRC state may waste the user plane resources. Accordingly, a mechanism to aware the RRC state by the SMF or the UPF may be required.

Figure 32:
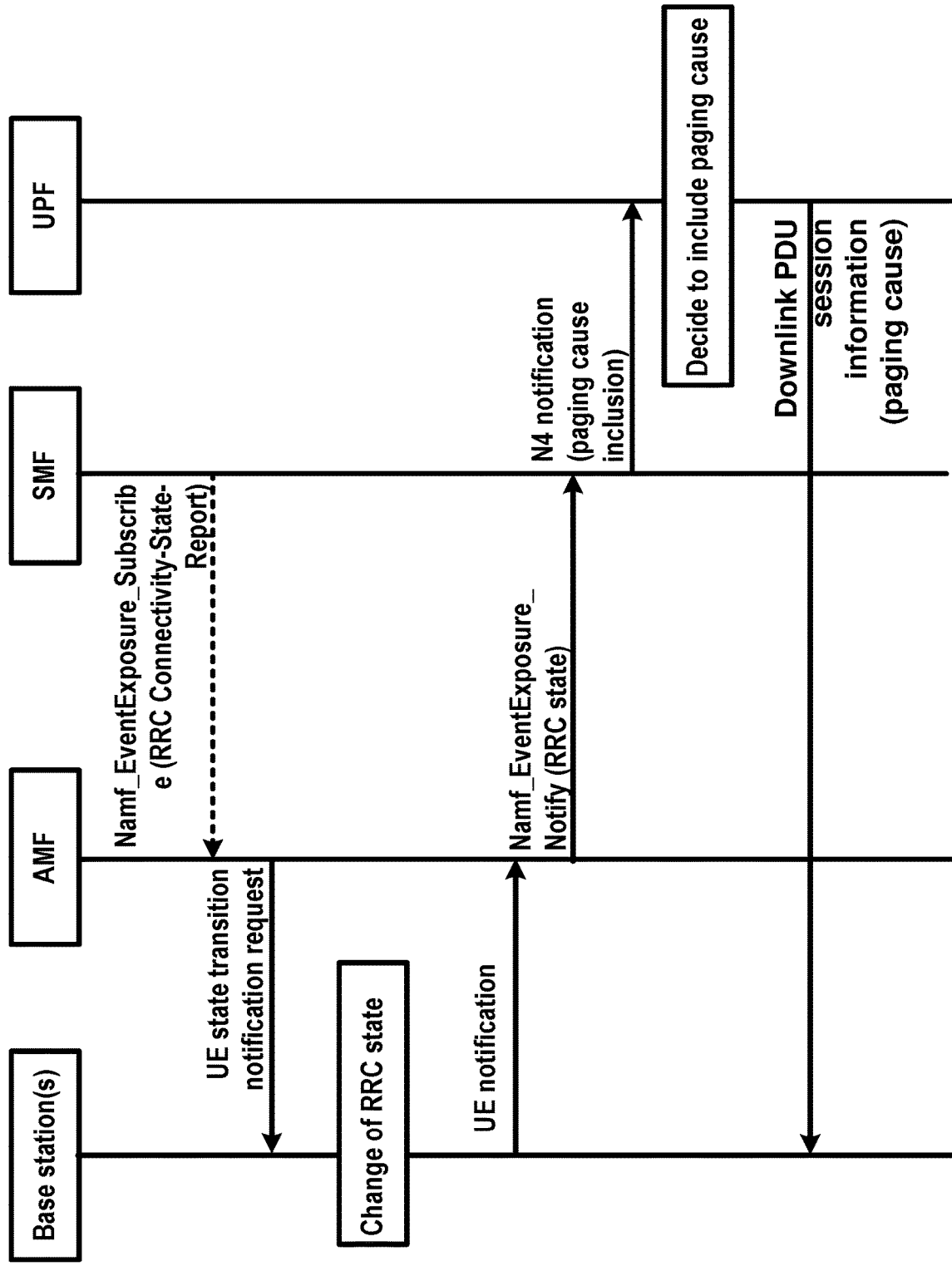
FIG. 32 illustrates an example embodiment of a present disclosure.

FIG. 32 shows how a SMF aware an RRC state of a UE and how the SMF report the change RRC state to a UPF. In an example, the UPF may include the paging cause value or a PPI value based on the RRC state of the UE. In an example, the UPF may include that paging cause value or PPI if the UE is in RRC-INACTIVE state. In an example, the UPF may not include the paging cause value or the PPI if the UE is in RRC-CONNECTED state. In an example, the UPF may include the paging cause value or PPI value based on explicit indication from the SMF.

As depicted in FIG. 32, an SMF may send Namf_EventExposure_Subscribe message to an AMF. The Namf_EvenExposure_Subscribe message may comprise an event type, UE type, report type, UE identity as shown in FIG. 33A and in FIG. 33B. FIG. 33A is for a connectivity state report event type. FIG. 33B is for an RRC connectivity state report event. In an example the event type may be RRC connectivity state report. In an example, the report type may be continuous report. Again, referring to the FIG. 32, the AMF may subscribe the event type for RRC connectivity state for the UE in response to receiving the Namf_EventExposure_Subscribe message with event type as RRC connectivity state report. In an example, the AMF may send a UE state transition notification request message to a base station in response to receiving the Namf_EventExposure_Subscribe message with event type as RRC connectivity state report. In an example, the base station may monitor a change of RRC state of the UE and the base station may report the change of RRC state (e.g. RRC-CONNECTED to RRC-INACTIVE or RRC-INACTIVE to RRC-CONNECTED) to the AMF by sending a UE notification message as depicted in FIG. 16. In an example, the AMF may send a Namf_EventExposure_Notify message comprising an RRC state, in response to receiving the UE notification message from the base station. In an example, the SMF may report the change of RRC state and current RRC state to the UPF. In an example, the SMF may request an inclusion of a paging cause value or PPI to the UPF based on the RRC state being as RRC-INACTIVE state. In an example, the UPF may include any additional information for RAN paging procedure, in response to the implicit or explicit indication from the SMF.

Figure 34:
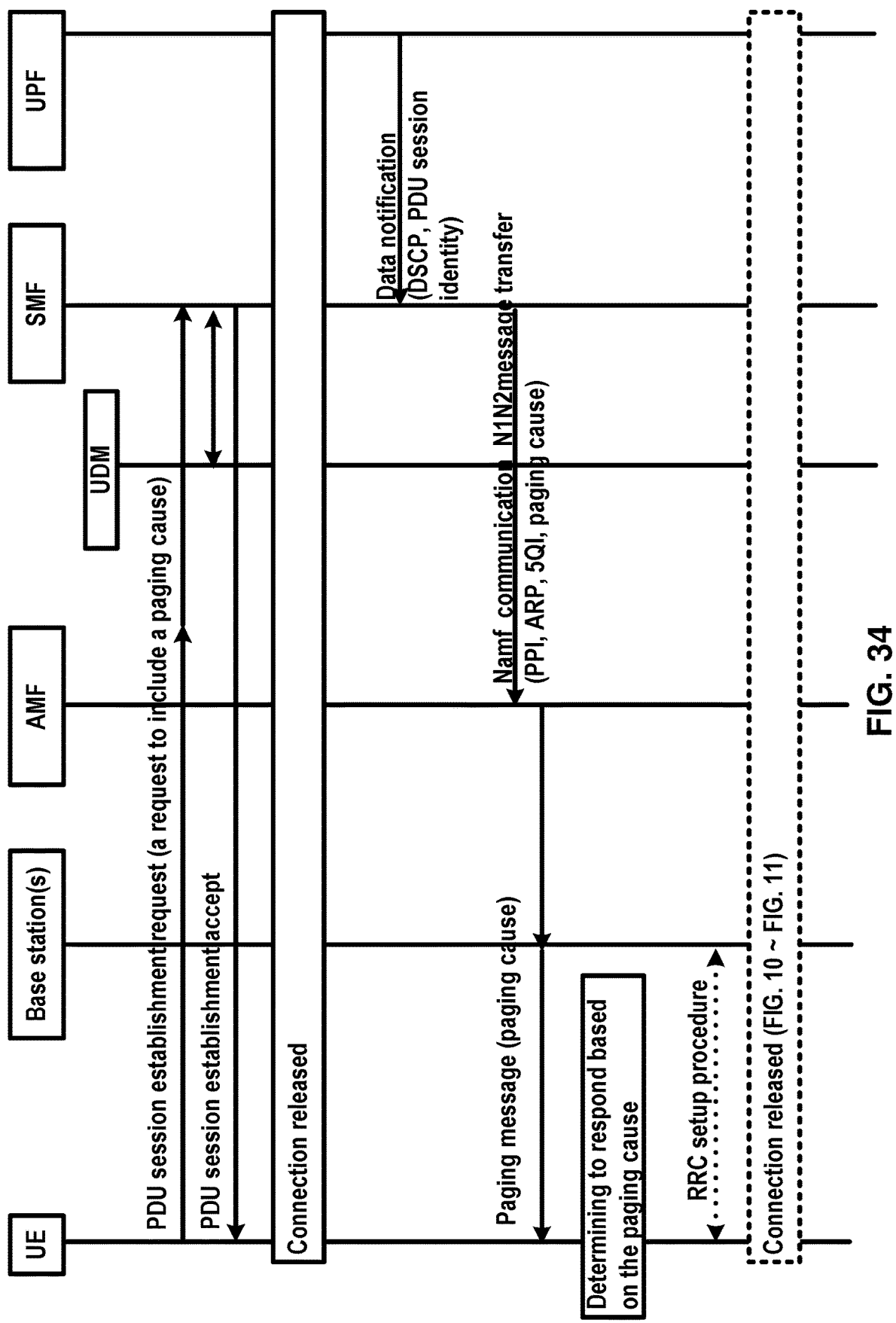
FIG. 34 illustrates an example embodiment of a present disclosure.

FIG. 34 illustrates an example embodiment for per PDU basis paging cause request procedure. A UE may request a paging cause needs during PDU session establishment request procedure. Accordingly, the AMF includes paging cause value for paging message if the PDU session configured as including paging cause.

Figure 35:
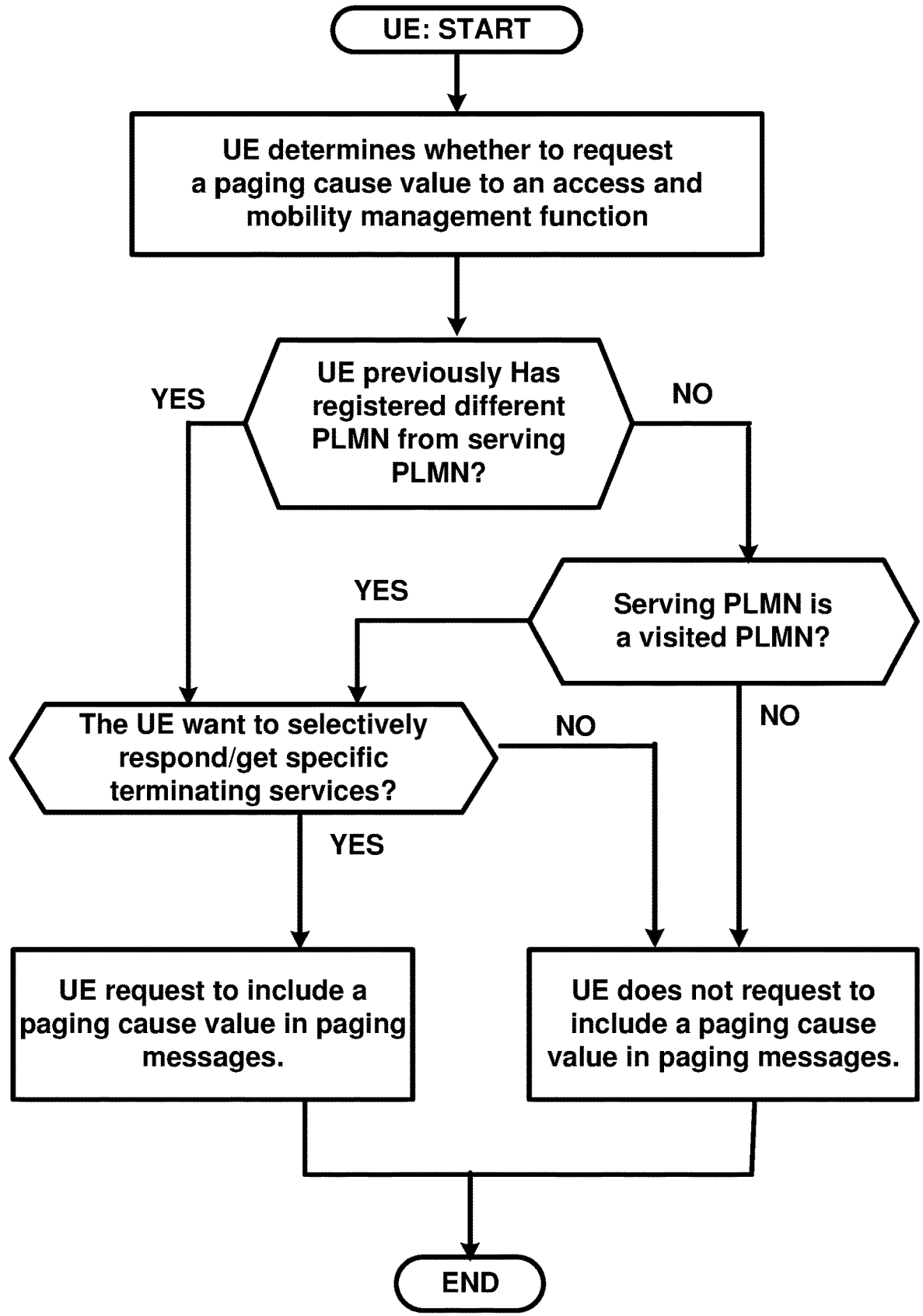
FIG. 35 is a flow diagram of an aspect of an example embodiment of the present disclosure.
Figure 36:
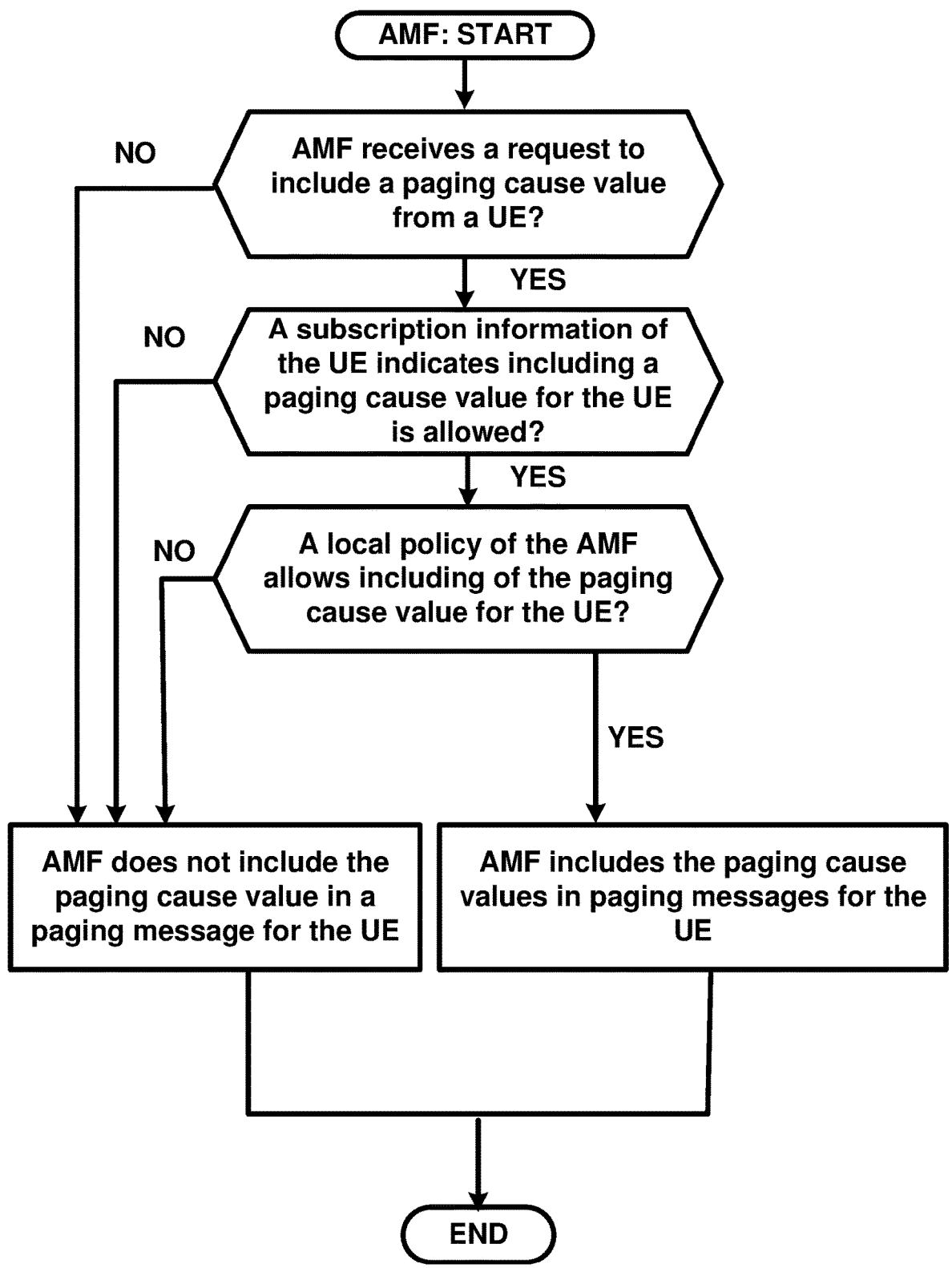
FIG. 36 is a flow diagram of an aspect of an example embodiment of the present disclosure.
Figure 37:
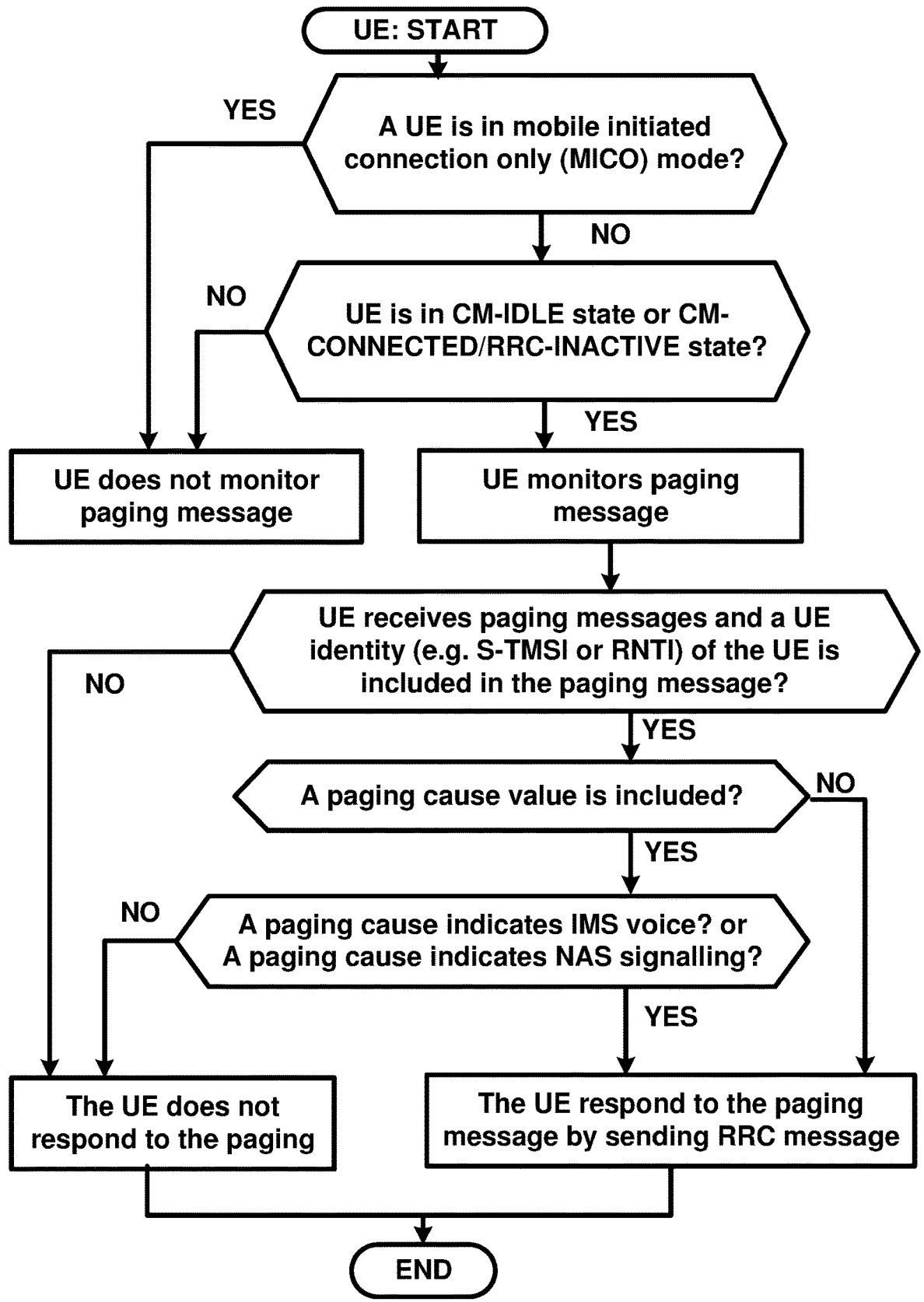
FIG. 37 is a flow diagram of an aspect of an example embodiment of the present disclosure.

FIG. 35, FIG. 36 and FIG. 37 is flow chart for present disclosure.

FIG. 35 illustrate a UE behavior when or how a UE determine that a paging cause is required and request to a network. In an example, the UE may be a dual-SIM UE and previously has registered in a PLMN 1 which is different from a serving PLMN. In an example, the serving PLMN may be a secondary PLMN. Therefore, the UE may want to know the type of terminating service of the serving PLMN by asking paging cause of the terminating service. Accordingly, the UE can ignore (not respond) to the paging of a terminating service indicating less important paging cause value than the active service of PLMN 1.

In an example the serving PLMN may be a visited PLMN so the UE may want to prioritize a searching or camping on home PLMN. In an example, the UE may want to know the cause of terminating service in visited PLMN so the UE can selectively respond to the terminating service of the visited PLMN.

FIG. 36 illustrates how an AMF determines to include paging cause in a paging messages. In an example, the AMF may determine based on a request from a UE, subscription information of the UE, a local policy of an AMF and/or the like. If a UE does not request to include the paging cause value, the AMF may not include the paging cause value in a paging message to the UE.

FIG. 37 illustrate how a UE determine to respond to a paging message based on a paging cause value in the paging message.

In an example, a wireless device may send to an access and mobility management function (AMF) a registration request message, to request a registration to a public land mobile network (PLMN). In an example, the registration request message may comprise a request to include paging cause values in paging messages to the wireless device.

In an example, the wireless device may receive from the AMF a registration accept message, indicating a successful registration with the PLMN.

In an example, the wireless device may receive from a base station a paging message. The paging message may comprise a paging cause value.

In an example, the wireless device may determine to send a radio resource control (RRC) request message requesting a connection setup with the PLMN and may send the RRC request message.

In an example, the wireless device may send the request, in response to the wireless device being a multi-subscriber identity module (SIM) device.

In an example, the multi- SIM device may be a dual-SIM device.

In an example, the wireless device may send the request, in response to the PLMN being a low priority PLMN of the wireless device.

In an example, the wireless device may send the request, in response to the wireless device using dual registration for an interworking.

In an example, the interworking may be a UE functionality to interwork between different generation wireless communication technologies (e.g. 4G or 5G).

In an example, the wireless device may register a fourth-generation network of the PLMN and a fifth-generation network of the PLMN simultaneously.

In an example, the wireless device may send the request in response to the PLMN being a visited PLMN.

In an example, the paging message may further comprise 5G S-TMSI, I-RNTI, an access type.

In an example, the access type may indicate a third-generation partnership project (3GPP) access technology, a non-third generation partnership project (Non-3GPP) access technology, and/or the like.

In an example, the paging cause value may indicate at least one of a NAS signaling for mobility management, a NAS signaling for policy update, a UE context/configuration update, a UE policy update, an indication requesting a registration, an IMS voice, an IMS video, an IMS SMS, an IMS MMS, an IMS signaling, other IMS, others.

In an example, the wireless device may send the RRC request message in response to the paging cause value indicating the IMS voice.

In an example, the wireless device may not send the RRC request message in response to the paging cause value indicating the others.

In an example, the paging cause value may indicate at least one of high priority, medium priority, low priority.

In an example, the wireless device may send the RRC request message in response to the paging cause value indicating the high priority.

In an example, the wireless device may not send the RRC request message in response to the paging cause value indicating the low priority.

In an example, the registration request message may further comprise at least one of, a type of registration, a UE identity, last visited Tracking area identify, requested NSSAI, mobility-initiated connection only (MICO) mode indication, UE mobility management core network capability, packet data session related information and/or the like.

In an example, the type of registration may indicate at least one of initial registration, mobility registration updating, periodic registration updating, emergency registration.

In an example, the UE identity may indicate at least one of subscription concealed identifier (SUCI), 5G global unique temporary identity (GUTI), permanent equipment identifier (PEI), and/or the like.

In an example, the RRC request message may be an RRC setup request message.

In an example, the RRC request message may be an RRC resume request message.

In an example, a wireless device may send to a session management function (SMF), a session establishment request message requesting a packet data unit (PDU) session establishment to a public land mobile network (PLMN), the session establishment request message may comprise a request to include paging cause values in paging messages to the wireless device.

In an example, the wireless device may receive from the SMF, a session establishment accept message, indicating a successful session establishment with the PLMN.

In an example, the wireless device may receive a paging message comprising a paging cause value.

In an example, the wireless device may determine to send a radio resource control (RRC) request message requesting a connection setup with the PLMN based on the paging cause value.

In an example, the wireless device may send the RRC request message, in response to the determining.

In an example, the session establishment request message may further comprise at least one of a data network name (DNN), a PDU session ID, a requested PDU Session Type, a requested session and service continuity (SSC) mode, session management capability PCO, number of packet filters, always-on PDU Session Requested, and/or the like.

In an example, the DNN may indicate IP multimedia subsystem (IMS).

In an example, an access and mobility management function (AMF) may receive from a wireless device, a registration request message requesting a registration to a PLMN, the registration request message may comprise a request to include paging cause values for paging messages to the wireless device.

In an example, the AMF may send to the wireless device, a registration accept message, indicating a successful registration with the PLMN.

In an example, the AMF may determine a paging cause value for a paging message to the wireless device.

In an example, the AMF may send the paging message to a base station, the paging message may comprise the paging cause.

In an example, the determining to include the paging cause value in the paging message bay be based on at least one of, the request, a local policy of the AMF, subscription information of the wireless device, an overload condition of the system.

In an example, the determining to send the paging message may be based on at least one of receiving a connection setup request message from a network node for the wireless device, a change of UE configuration, a change of UE policy and/or the like.

In an example, the network node may be a session management function, a policy control function, a network exposure function, a user data management function and/or the like.

In an example, the determining of the paging cause value may be based on at least one of paging policy indication, a QoS parameter of a corresponding user data packet (5QI), a local policy, a network node triggering/triggered paging procedure, a paging resource load condition of the system and/or the like.

In an example, the paging policy indication may be based on a type of IMS service.

In an example, the paging policy indication may be based on a type of application service In an example, the AMF may perform a number of retransmissions of the paging message. The number of retransmissions may be based on at least one of the paging cause value, an allocation and retention priority, a local policy, a load/congestion situation of AMF, a load/congestion situation of RAN, and/or the like.

In an example, the AMF may perform a retransmission of the paging message based on a retransmission timer.

In an example, the AMF may prioritize a notification procedure via a non-third generation partnership project (3GPP) access network over a paging procedure via a 3GPP access network based on the request.

In an example, a base station may receive from an access and mobility management function (AMF), a context setup message requesting a user plane connection setup, the context setup message may comprise a request to include paging cause values in paging messages to a wireless device.

In an example, the base station may send to the wireless device, a radio resource control (RRC) message to transition the wireless device from an RRC connected state to an RRC inactive state.

In an example, the base station may determine a paging cause value for a paging message to the wireless device and may send to the wireless device. The paging message may comprise the paging cause value.

In an example, the base station may further determine to include the paging cause value in the paging message, based on at least one of, the request, a local policy of the base station, an overload condition of the system, and/or the like.

In an example, the base station may further determine to send the paging message based on at least one of, receiving a downlink NAS transport message from the AMF for the wireless device, receiving a downlink packet data unit (PDU) session information from a user plane function (UPF), and/or the like.

In an example, the downlink NAS transport message may comprise non-access stratum (NAS) PDU type.

In an example, the NAS PDU type may indicate at least one of, an update of UE mobility management, an update of UE policy, an update a UE context, an in requesting a registration, and/or the like.

In an example, the determining of the paging cause value may be based on the NAS PDU type.

In an example, the downlink packet data unit (PDU) session information may comprise at least one of, a paging policy indication (PPI), a QoS flow identifier (5QI), a paging cause value, and/or the like.

In an example, the determining of the paging cause value may be based on at least one of, the PPI, the QoS flow identifier, the paging cause value, and/or the like.

In an example, the paging policy indication (PPI) may be based on a type of IMS service.

In an example, the base station may perform a number of retransmissions of the paging message. The number of retransmissions is based on at least one of, the paging cause value, an allocation and retention priority, a local policy, a load/congestion situation of base station, and/or the like.

In an example, the base station may perform a retransmission of the paging message based on a retransmission timer.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 38:
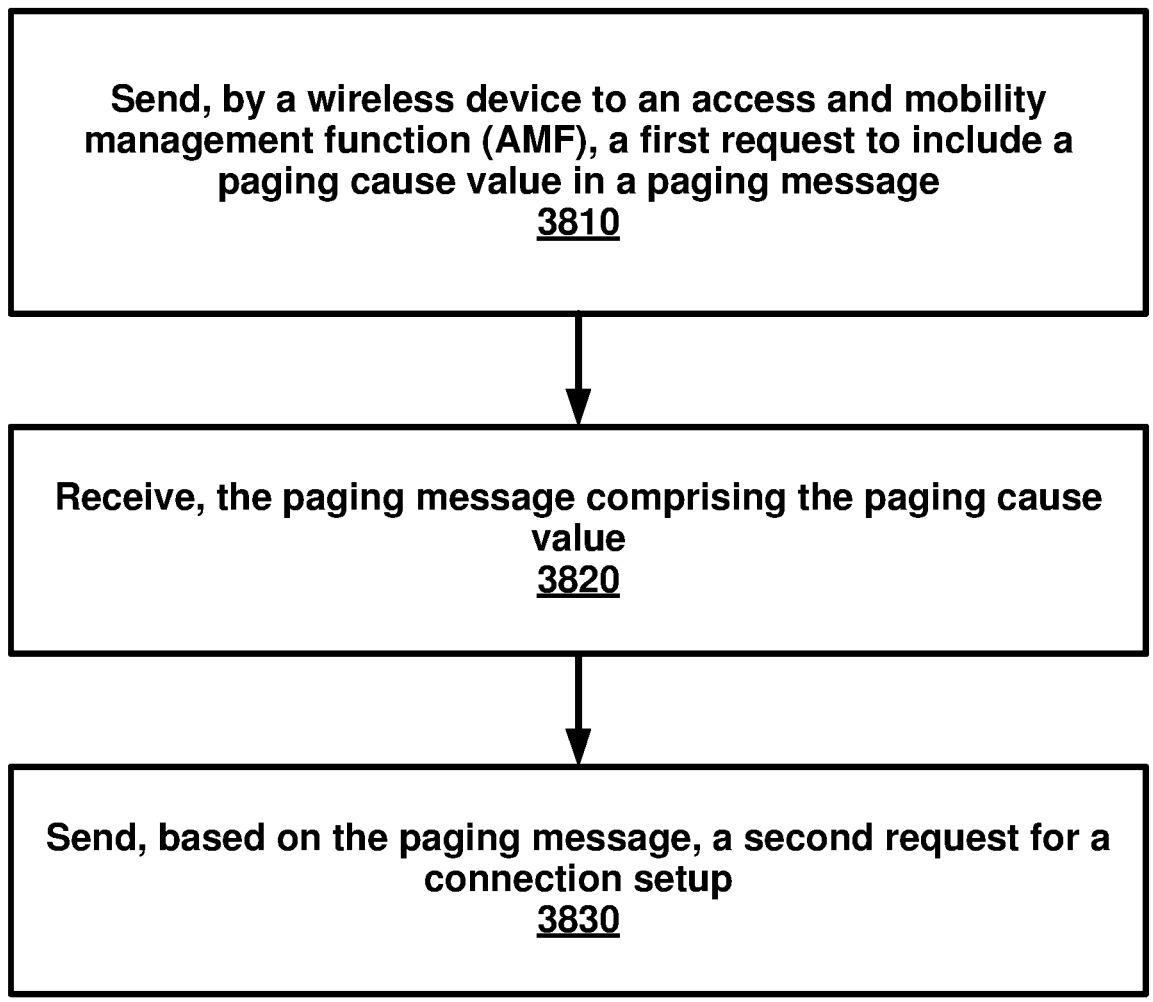
FIG. 38 is a flow diagram of an aspect of an example embodiment of the present disclosure.

FIG. 38 is a flow diagram of an aspect of an example embodiment of the present disclosure. At 3810, a wireless device may send to an access and mobility management function (AMF), a first request to include a paging cause value in a paging message. At 3820, the paging message may be received. The paging message may comprise the paging cause value. At 3830, based on the paging message, a second request for a connection setup may be sent.

According to an embodiment, the paging message may comprise the paging cause value in response to the first request. According to an embodiment, the first request may be a registration request message. According to an embodiment, the second request may be a radio resource control (RRC) setup message. According to an embodiment, the RRC setup message may be an RRC setup request message. According to an embodiment, the RRC setup message may be an RRC resume request message. According to an embodiment, the first request may comprise a user equipment identity of the wireless device. According to an embodiment, the first request may comprise at least one parameter indicating that the wireless device requests that the paging message may comprise the paging cause value.

According to an embodiment, a first public land mobile network (PLMN) may comprise the AMF. According to an embodiment, the first PLMN may be a visited PLMN. According to an embodiment,, further comprising registering, by the wireless device, with a second PLMN. According to an embodiment, the first request may be based on the first PLMN being a lower priority PLMN than the second PLMN. According to an embodiment, the first request may be based on the wireless device being a multi-subscriber identity module (SIM) device. According to an embodiment, the multi-SIM device may be a dual-SIM device. According to an embodiment, the first request may be based on the wireless device using a dual registration. According to an embodiment, wireless device may further register with a mobile management entity (MME). According to an embodiment, a fourth-generation network may comprise the MME.

According to an embodiment, the paging message may comprise the paging cause value. According to an embodiment, the paging message may comprise a user equipment identity. According to an embodiment, the paging message may comprise an access type.

According to an embodiment, the access type indicate a third-generation partnership project (3GPP) access technology. According to an embodiment, the access type indicate a non-3GPP access technology.

According to an embodiment, the user equipment identity may indicate a fifth generation serving temporary mobile subscriber identity. According to an embodiment, the user equipment identity an inactive-ratio network temporary identifier.

According to an embodiment, the paging cause value may indicate that the paging message may be for a non-access stratum (NAS) signaling for mobility management. According to an embodiment, the paging cause value may indicate that the paging message may be for a NAS signaling for policy update. According to an embodiment, the paging cause value may indicate that the paging message may be for a user equipment (UE) configuration update. According to an embodiment, the paging cause value may indicate that the paging message may be for a UE policy update. According to an embodiment, the paging cause value may indicate that the paging message may be for an indication requesting a registration. According to an embodiment, the paging cause value may indicate that the paging message may be for an internet protocol multimedia subsystem (IMS) voice. According to an embodiment, the paging cause value may indicate that the paging message may be for an IMS video. According to an embodiment, the paging cause value may indicate that the paging message may be for an IMS short message service. According to an embodiment, the paging cause value may indicate that the paging message may be for an IMS multimedia messaging service. According to an embodiment, the paging cause value may indicate that the paging message may be for an IMS signaling. According to an embodiment, the paging cause value may indicate that the paging message may be for other IMS.

According to an embodiment, the sending of the second request may be based on the paging cause value indicating the IMS voice. According to an embodiment, the paging cause value may indicate high priority. According to an embodiment, the paging cause value may indicate medium priority. According to an embodiment, the paging cause value may indicate low priority. According to an embodiment,, the sending of the second request may be based on the paging cause value indicating the high priority. According to an embodiment, the first request may include the paging cause value in the paging message to the wireless device.

According to an embodiment, a wireless device may send to an access and mobility management function (AMF) of a public land mobile network (PLMN), a first request to include a paging cause value in a paging message to the wireless device. The paging message may be received from a base station. The paging cause value in the paging message may be based on the first request. The wireless device may send, based on the paging cause value in the paging message, a second request for a connection setup with the PLMN.

According to an embodiment, a wireless device may send to an access and mobility management function (AMF), a registration request message requesting: a registration to a public land mobile network (PLMN); and inclusion of a paging cause value in a paging message to the wireless device. The paging message may be received from a base station. The paging cause value of the paging message may be based on the registration request message. Based on the paging cause value in the paging message, a radio resource control (RRC) request message requesting a connection setup with the PLMN may be sent.

Figure 39:
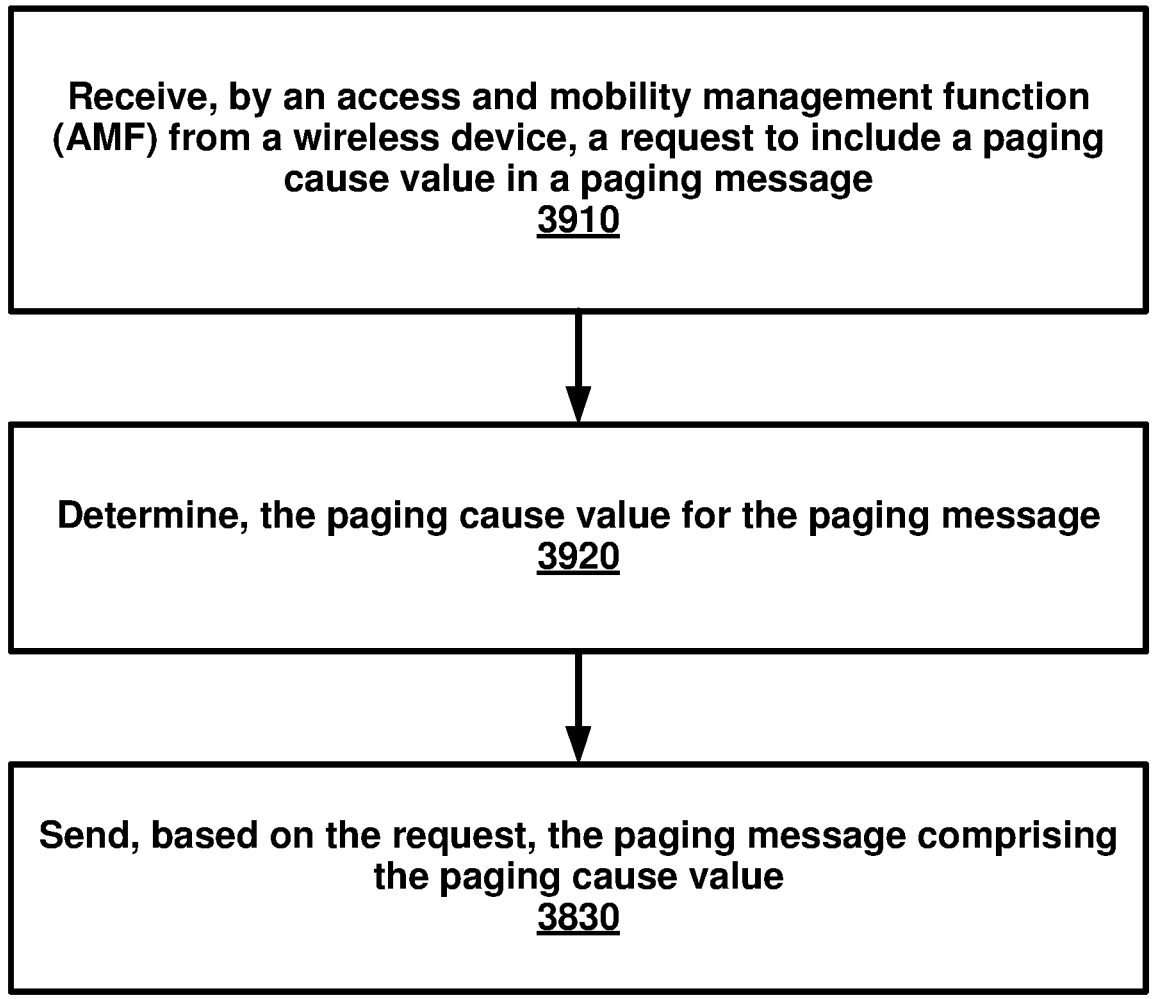
FIG. 39 is a flow diagram of an aspect of an example embodiment of the present disclosure.

FIG. 39 is a flow diagram of an aspect of an example embodiment of the present disclosure. At 3910, an access and mobility management function (AMF) may receive, from a wireless device, a request to include a paging cause value in a paging message. At 3920, the AMF may determine the paging cause value for the paging message. At 3930, based on the request, the AMF may send the paging message. The paging message may comprise the paging cause value.

According to an embodiment, the determining may be further based on a local policy of the AMF. The determining may be further based on a subscription information of the wireless device. The determining may be further based on an overload condition of a system. The determining may be further based on a paging policy indication. The determining may be further based on a quality of service parameter of a corresponding user data packet. The determining may be further based on a network node triggered paging procedure. The determining may be further based on a paging resource load condition of the system.

According to an embodiment, the paging policy indication may be based on a type of an internet protocol multimedia subsystem service. According to an embodiment, the paging policy indication may be based on a type of application service. According to an embodiment, the subscription information may indicate whether the wireless device may be allowed to request the paging cause value. According to an embodiment, the sending may be based on at least one of: receiving a connection setup request message for the wireless device from a network node; a change of a user equipment configuration; or a change of a user equipment policy.

According to an embodiment, the network node may be at least one of: a session management function; a policy control function; a network exposure function; or a user data management function. According to an embodiment, the AMF may further determine a number of retransmissions of the paging message. The number of retransmissions may be based on at least one of: the request; the paging cause value; an allocation and retention priority; a local policy; a load status of AMF; or a load status of RAN.

According to an embodiment, the AMF may further perform, a retransmission of the paging message based on a retransmission timer. According to an embodiment, the AMF may prioritize a notification procedure via a non-third generation partnership project (3GPP) access network over a paging procedure via a 3GPP access network based on the request. According to an embodiment, a public land mobile network (PLMN) may comprise the AMF. According to an embodiment, the PLMN may be a visited PLMN of the wireless device.

According to an embodiment, an access and mobility management function (AMF) may receive, from a wireless device, a registration request message requesting a registration to a PLMN. The registration request message may comprise a request to include paging cause value for a paging message to the wireless device. The AMF may determine, based on the request, the paging cause value for the paging message to the wireless device. The AMF may send, to a base station and based on the request, the paging message comprising the paging cause value.

Figure 40:
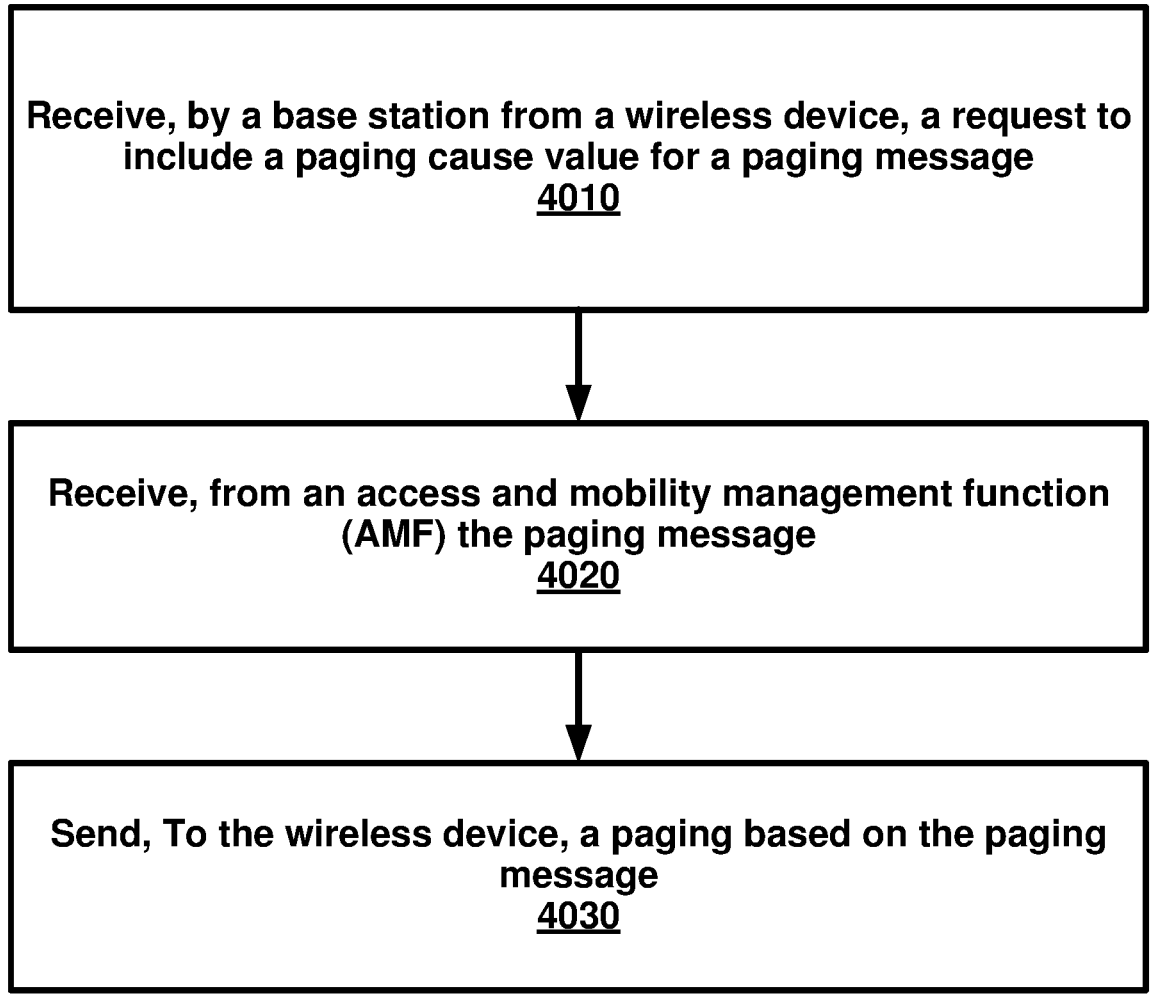
FIG. 40 is a flow diagram of an aspect of an example embodiment of the present disclosure.

FIG. 40 is a flow diagram of an aspect of an example embodiment of the present disclosure. At 4010, a base station may receive from a wireless device, a message comprising a request to include a paging cause value for a paging message. At 4020, the base station may receive the paging message from an access and mobility management function (AMF). At 4030, the base station may send, to the wireless device, a paging based on the paging message.

According to an embodiment, the paging message may comprise the paging cause value based on the request. According to an embodiment, the paging may comprise the paging cause value.

Figure 41:
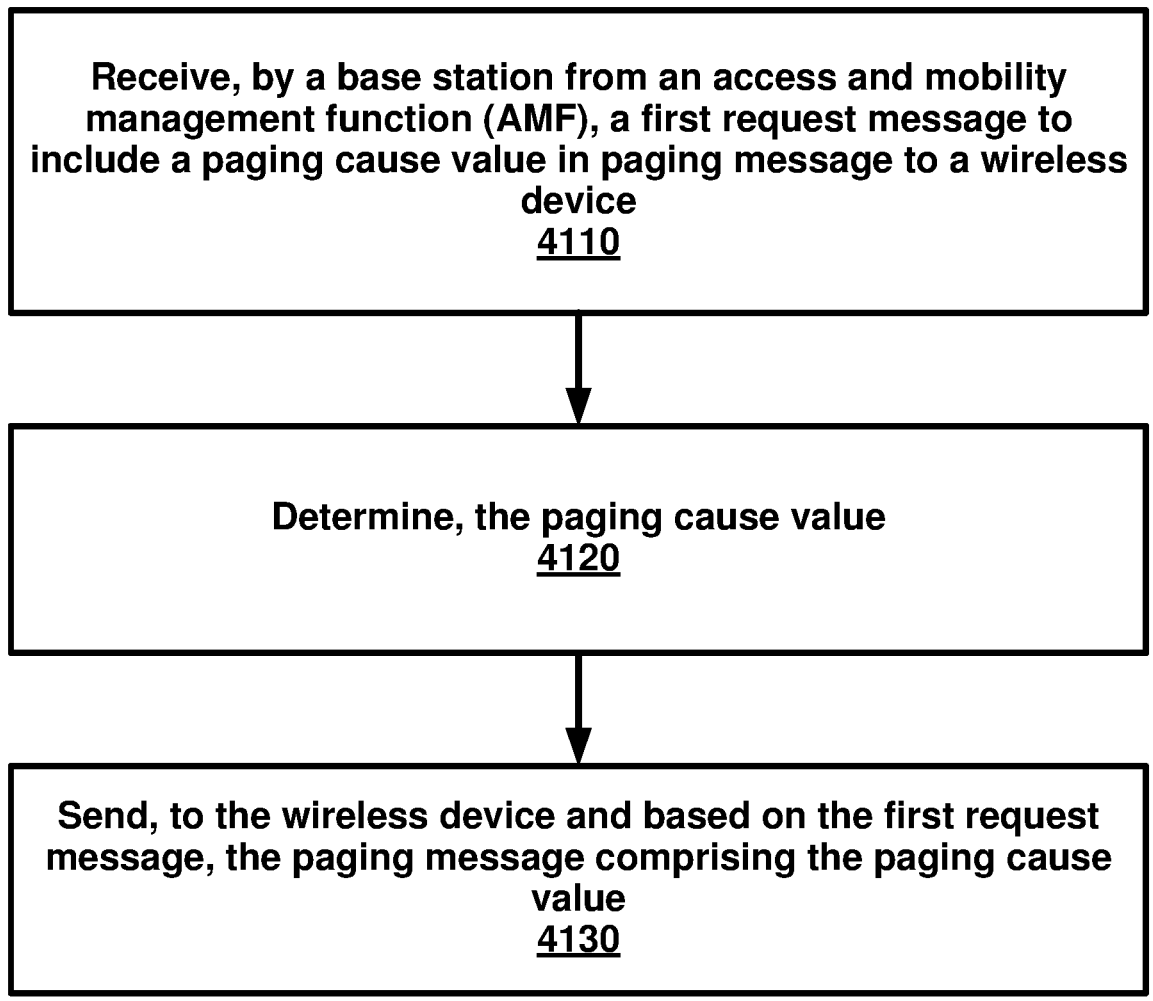
FIG. 41 is a flow diagram of an aspect of an example embodiment of the present disclosure.

FIG. 41 is a flow diagram of an aspect of an example embodiment of the present disclosure. At 4110, a base station may receive from an access and mobility management function (AMF), a first request message to include a paging cause value in paging message to a wireless device. At 4120, the base station may determine the paging cause value. At 4130, the base station may send the paging message to the wireless device. The paging message may comprise the paging cause value based on the first request message.

According to an embodiment, the base station may send to the wireless device, a second request message to transition the wireless device from a radio resource connection (RRC) connected state to an RRC inactive state.

According to an embodiment, the first request message may be a context setup request message requesting a user plane connection setup with the wireless device.

According to an embodiment, the base station may receive from the AMF, a downlink non access stratum (NAS) transport message for the wireless device. the base station the NAS transport message may comprise: a NAS packet data unit (PDU); and a NAS PDU type associated with the NAS PDU. the base station the NAS PDU type may comprise at least one of: an update of user equipment (UE) mobility management parameter; an update of UE policy; an update of UE context; or an request a registration. According to an embodiment, the base station the determining may be further based on the NAS PDU type.

According to an embodiment, the base station may receive from a user plane function, a downlink packet data unit session information. According to an embodiment, the downlink packet data unit session information may comprise at least one of: a paging policy indication (PPI); a quality of service flow identifier; or a second paging cause value. According to an embodiment, the PPI may be based on a type of an internet protocol multimedia subsystem service. According to an embodiment, the determining the paging cause value may be further based on the downlink packet data unit session information. According to an embodiment, the base station may perform, a number of retransmissions of the paging message. The number of retransmissions may be based on at least one of: the paging cause value; an allocation and retention priority of the wireless device; a local policy; or a load status of the base station.

According to an embodiment, a wireless device may send to a session management function (SMF), a first request to include a paging cause value in a paging message for a packet data unit (PDU) session. A paging message for the PDU session may be received. The wireless device may send, based on the paging message, a second request for a connection setup. According to an embodiment, the first request may be a session establishment request message.

According to an embodiment, the first request may comprise: a PDU session identity of the PDU session; and at least one parameter indicating the paging cause value to include in the paging message for the PDU session identified by the PDU session identity. According to an embodiment, the first request further comprises at least one of: a data network name (DNN) of the PDU session; a PDU session identity of the PDU session; a requested PDU session type of the PDU session; a requested session and service continuity mode of the PDU session; session management capability protocol configuration options of the PDU session; or number of packet filters. According to an embodiment, the DNN may indicate an internet protocol multimedia subsystem.

According to an embodiment, a session management function (SMF) may receive, from a wireless device, a request to include a paging cause value in a paging message for a packet data unit (PDU) session. The SMF may determine a paging cause value of a paging message for the PDU session. The SMF may send, to an access and mobility management function (AMF), based on the request, a connection setup request message comprising the paging cause value.

According to an embodiment, a wireless device may send, to a session management function (SMF), a session establishment request message requesting establishment of a packet data unit (PDU) session to a public land mobile network (PLMN). The session establishment request message may comprise a request to include paging cause value for the PDU session in a paging message to the wireless device. A paging message may be received from a base station. The paging message may comprise a paging cause value for the PDU session based on the request. The wireless device may send, based on the paging cause value, a radio resource control (RRC) request message requesting a connection setup for the PDU session with the PLMN. According to an embodiment, the session establishment request message may comprise: a PDU session identity of the PDU session; and at least one parameter indicating to include the paging cause value in the paging message for the PDU session identified by the PDU identity. According to an embodiment, the session establishment request message further may comprise at least one of: a data network name (DNN); a PDU session identity; a requested PDU session type; a requested session and service continuity mode; session management capability protocol configuration options; or number of packet filters. According to an embodiment, the DNN may indicate an internet protocol multimedia subsystem.

Figure 42:
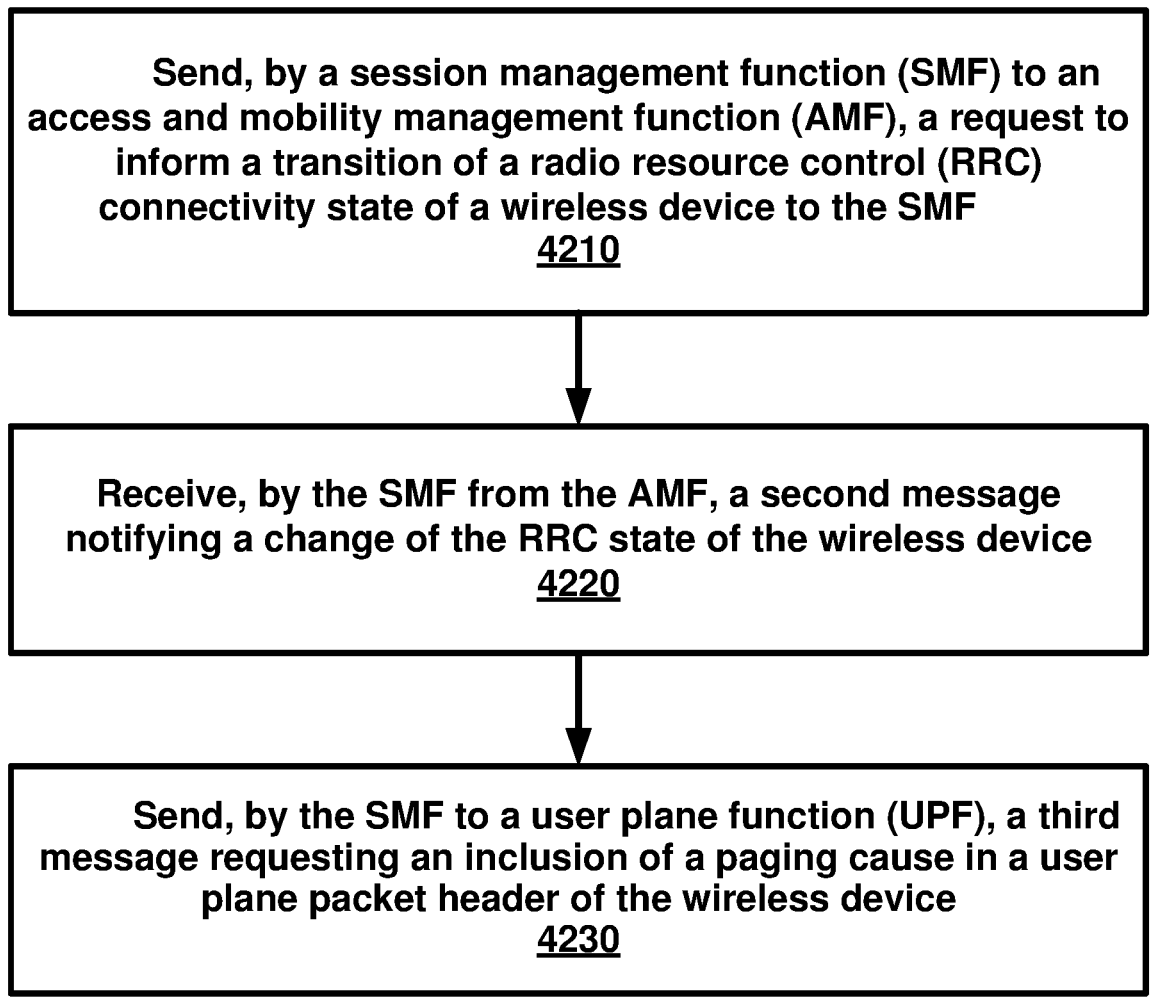
FIG. 42 is a flow diagram of an aspect of an example embodiment of the present disclosure.

FIG. 42 is a flow diagram of an aspect of an example embodiment of the present disclosure. At 4210, a session management function (SMF) may send to an access and mobility management function (AMF), a request to inform a transition of a radio resource control (RRC) connectivity state of a wireless device to the SMF. At 4220, the SMF may receive from the AMF, a second message notifying a change of the RRC state of the wireless device. At 4230, the SMF may send to a user plane function (UPF), a third message requesting an inclusion of a paging cause in a user plane packet header of the wireless device.

According to an embodiment, a session management function (SMF) may send, to an access and mobility management function (AMF), an event report request message requesting a radio resource control (RRC) connectivity state change report of a wireless device. The SMF may receive, from the AMF, a notification message indicating a transition of the wireless device from an RRC connected state to an RRC inactive state. The SMF may send, to a user plane function (UPF), a message requesting an inclusion of a paging cause into a user plane packet header of the wireless device.

Figure 43:
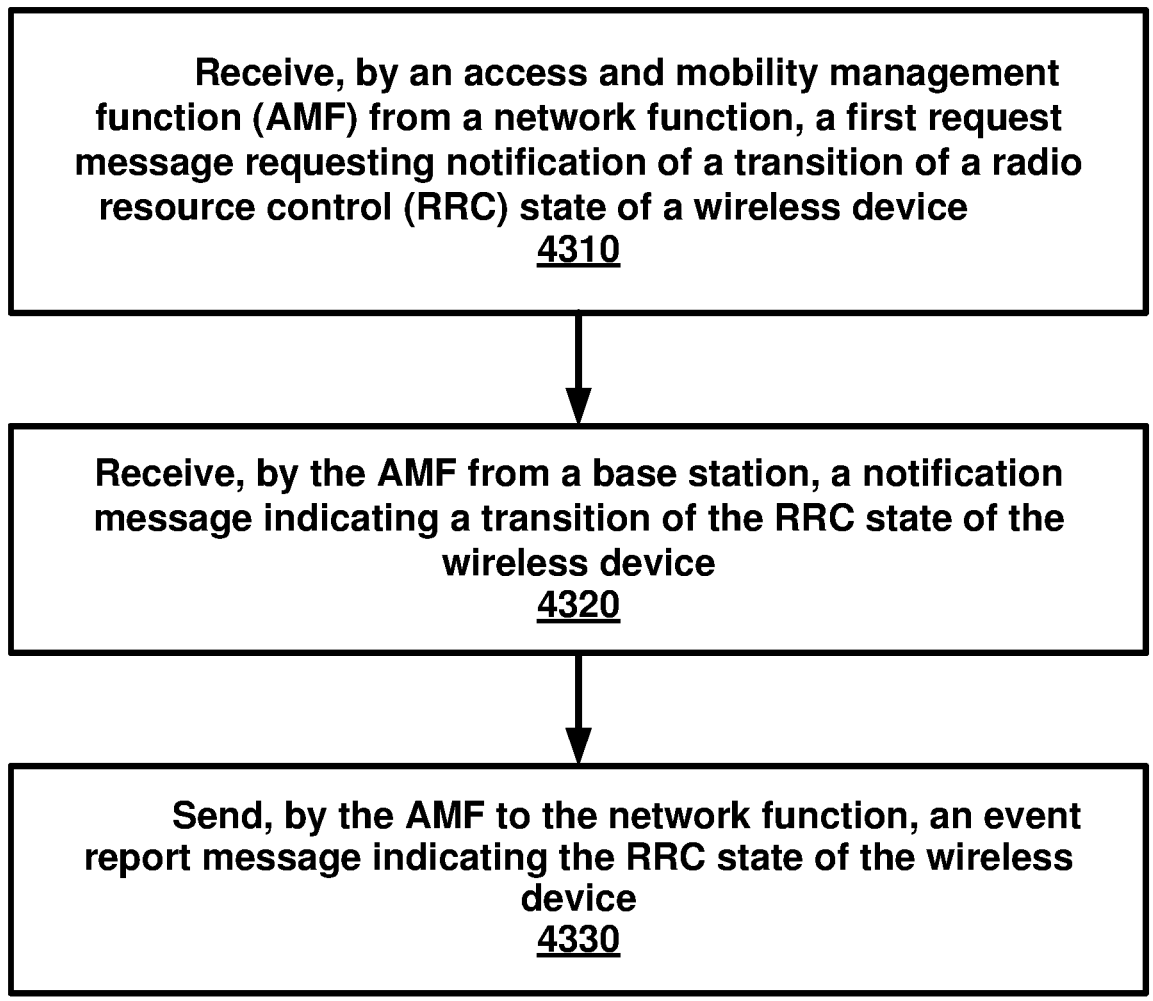
FIG. 43 is a flow diagram of an aspect of an example embodiment of the present disclosure.

FIG. 43 is a flow diagram of an aspect of an example embodiment of the present disclosure. At 4310, an access and mobility management function (AMF) may receive from a network function, a first request message requesting notification of a transition of a radio resource control (RRC) state of a wireless device. At 4320, the AMF may receive from a base station, a notification message indicating a transition of the RRC state of the wireless device. At 4330, the AMF may send to the network function, an event report message indicating the RRC state of the wireless device. According to an embodiment, the AMF may send, to the base station, a second request message requesting to inform an RRC state transition of the wireless device. According to an embodiment, the second request message may be based on the first request message. According to an embodiment, the network function may be a session management function. According to an embodiment, the first request message may be an event report request message. According to an embodiment, the first request message may comprise at least one of: an event type; a report type; or a user equipment identity. According to an embodiment, the event type may comprise at least one of: a report of an RRC connectivity state; or a report of a connectivity state. According to an embodiment, the connectivity state may indicate at least one of: an idle state; or a connected state. According to an embodiment, the transition of the RRC state may indicate at least one of: transitioning from an RRC connected state to an RRC inactive state; or transitioning from the RRC inactive state to the RRC connected state.

According to an embodiment, an access and mobility management function (AMF) may receive, from a network function, an event report request message requesting a radio resource control (RRC) connectivity state change report of a wireless device. According to an embodiment, the AMF may send, based on the event report request message, to a base station, a notification request message requesting to inform a state transition of the wireless device. According to an embodiment, may receive, the AMF from the base station, a notification response message indicating a change of an RRC state of the wireless device. According to an embodiment, the AMF may send to the network function, an event report response message indicating the change of the RRC state.

According to an embodiment, an access and mobility management function (AMF) receives, from a network function, an event report request message requesting a radio resource control (RRC) connectivity state change of a wireless device. The AMF may send, to a base station and based on the receiving, a notification request message requesting a state change of the wireless device. The AMF may receive, from the base station, a notification response message indicating a change of an RRC state of the wireless device. The change of the RRC state may comprise at least one of: transitioning from an RRC connected state to an RRC inactive state; or transitioning from an RRC inactive state to an RRC connected state. The AMF may send, to the network function, an event report response message indicating the change of the RRC state.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s)

how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
   sending, by a multiple universal subscriber identity module (multi-USIM) wireless device to a mobility management function via a base station, a registration request message comprising an indication for a paging cause indication in a paging message, wherein the paging cause indication indicates internet protocol multimedia subsystem (IMS) voice service;
   receiving a first paging message comprising a first paging cause indication indicating the IMS voice service; and
   sending, after receiving the first paging message, a radio resource control (RRC) message requesting a connection setup.

2. The method of claim 1, wherein the registration request message comprises an identifier of the wireless device.

3. The method of claim 1, wherein the RRC message is a RRC setup message.

4. The method of claim 3, wherein the RRC setup message is an RRC setup request message.

5. The method of claim 3, wherein the RRC setup message is an RRC resume request message.

6. The method of claim 1, wherein the sending the registration request message is based on the wireless device being the multi-USIM device.

7. The method of claim 1, wherein the first paging cause indication indicates that the paging message is for internet protocol multimedia subsystem (IMS) voice.

8. The method of claim 1, wherein the mobility management function is one or more of:
   a mobility management entity; and
   an access and mobility management function.

9. The method of claim 1, wherein the mobility management function is a mobility management function of a visited public land mobile network (PLMN).

10. The method of claim 9, further comprising:
    registering, by the wireless device, with a second PLMN;
    wherein the registration request message is based on the visited PLMN being a lower priority PLMN than the second PLMN.

11. A multiple universal subscriber identity module (multi-USIM) wireless device comprising: one or more processors; and memory storing instructions that, when executed by the one or more processors, cause the wireless device to:
    send, to a mobility management function via a base station, a registration request message comprising an indication for a paging cause indication in a paging message, wherein the paging cause indication indicates internet protocol multimedia subsystem (IMS) voice service;
    receive a first paging message comprising a first paging cause indication indicating the IMS voice service; and
    send, after receiving the first paging message, a radio resource control (RRC) message requesting a connection setup.

12. The wireless device of claim 11, wherein the registration request message comprises an identifier of the wireless device.

13. The wireless device of claim 11, wherein the RRC message is a RRC setup message.

14. The wireless device of claim 13, wherein the RRC setup message is an RRC setup request message.

15. The wireless device of claim 13, wherein the RRC setup message is an RRC resume request message.

16. The wireless device of claim 11, wherein the sending the registration request message is based on the wireless device being the multi-USIM device.

17. The wireless device of claim 11, wherein the first paging cause indication indicates that the paging message is for internet protocol multimedia subsystem IMS voice.

18. The wireless device of claim 11, wherein the mobility management function is one or more of:
    a mobility management entity; and
    an access and mobility management function.

19. The wireless device of claim 11, wherein the mobility management function is a mobility management function of a visited public land mobile network (PLMN).

20. A system, comprising:
    a multiple universal subscriber identity module (multi-USIM) wireless device comprising: one or more first processors and first memory storing first instructions that, when executed by the one or more first processors, cause the wireless device to:
    send, to a mobility management function via a base station, a registration request message comprising an indication for a paging cause indication in a paging message, wherein the paging cause indication indicates internet protocol multimedia subsystem (IMS) voice service;
    receive a first paging message comprising a first paging cause indication indicating the IMS voice service; and
    send, after receiving the first paging message, a radio resource control (RRC) message requesting a connection setup; and the mobility management function, wherein the mobility management function comprises: one or more second processors and second memory storing second instructions that, when executed by the one or more second processors, cause the mobility management function to:
receive the registration request message; and
send the first paging message; and
receive the RRC message.

* * * * *